(12) United States Patent
Murakami et al.

(10) Patent No.: US 7,815,823 B2
(45) Date of Patent: Oct. 19, 2010

(54) OPTICAL FILM, MANUFACTURING METHOD OF OPTICAL FILM, OPTICAL COMPENSATING FILM, MANUFACTURING METHOD OF OPTICAL COMPENSATING FILM, POLARIZING PLATE, AND LIQUID CRYSTAL DISPLAY

(75) Inventors: Takashi Murakami, Hachioji (JP); Kunio Shimizu, Otsuki (JP)

(73) Assignee: Konica Minolta Opto, Inc., Tokyo (JP)

( * ) Notice: Subject to any disclaimer, the term of this patent is extended or adjusted under 35 U.S.C. 154(b) by 283 days.

(21) Appl. No.: 11/367,674

(22) Filed: Mar. 6, 2006

(65) Prior Publication Data

US 2006/0202366 A1 Sep. 14, 2006

(30) Foreign Application Priority Data

Mar. 10, 2005 (JP) ............................. 2005-066913
Feb. 2, 2006 (JP) ............................. 2006-026237

(51) Int. Cl.
*B29D 11/00* (2006.01)
(52) U.S. Cl. ...................... 264/2.7; 264/210.6; 428/1.3; 428/1.33
(58) Field of Classification Search ................. 428/1.1, 428/1.3, 1.31, 1.33, 1.54; 264/176.1, 177.11, 264/177.17, 210.1, 210.6, 479, 2.7; 349/96, 349/117–120; 536/71, 73, 76
See application file for complete search history.

(56) References Cited

U.S. PATENT DOCUMENTS

| 3,287,289 | A | * | 11/1966 | Ream et al. | 524/24 |
|---|---|---|---|---|---|
| 3,564,076 | A | * | 2/1971 | Kauder | 525/167 |
| 4,023,977 | A | * | 5/1977 | Mercurio et al. | 523/448 |
| 4,135,009 | A | * | 1/1979 | Mercurio | 427/195 |
| 4,231,915 | A | * | 11/1980 | Kaufhold et al. | 524/294 |
| 4,839,405 | A | * | 6/1989 | Speelman et al. | 524/99 |
| 5,219,510 | A | * | 6/1993 | Machell et al. | 264/210.6 |
| 5,288,715 | A | * | 2/1994 | Machell et al. | 430/531 |
| 2002/0102369 | A1 | * | 8/2002 | Shimizu et al. | 428/1.33 |
| 2004/0161551 | A1 | * | 8/2004 | Tasaka et al. | 428/1.1 |
| 2005/0030444 | A1 | * | 2/2005 | Fujiwara et al. | 349/64 |
| 2005/0150426 | A1 | * | 7/2005 | Hashimoto et al. | 106/170.21 |
| 2005/0221023 | A1 | * | 10/2005 | Sakamoto et al. | 428/1.3 |
| 2006/0127607 | A1 | * | 6/2006 | Okubo et al. | 428/1.3 |

FOREIGN PATENT DOCUMENTS

WO WO 2004063252 A1 * 7/2004

OTHER PUBLICATIONS

Machine translation of Takada et al. JP 2001-151901.*
Machine translation of Murakami et al. JP 2000-352620.*
JPO Website Machine English Translation of JP 2002-131536, Yajima et al., May 9, 2002.*

* cited by examiner

*Primary Examiner*—Sophie Hon
(74) *Attorney, Agent, or Firm*—Finnegan, Henderson, Farabow, Garrett & Dunner, L.L.P.

(57) ABSTRACT

An object is to provide an optical film in which retardation variation is less even after a long period of duration of use, to provide an optical compensating film in which transparency and flatness are not deteriorated in a stretching process by using the foregoing film as a support, and to provide a polarizing plate and a liquid crystal display exhibiting reduced visibility variation caused by heat generation of an optical LED backlight, and excellent color reproducibility. Disclosed is a manufacturing method of an optical film formed by melt-casting a composition containing a cellulose resin and a plasticizer, wherein the cellulose resin has a residual sulfuric acid content of 0.1-50 ppm, and the composition contains a polymer having a weight average molecular weight of 500-30000 prepared via polymerization of ethylenic unsaturated monomers, or an acrylic polymer having a weight average molecular weight of 500-30000.

11 Claims, No Drawings

OPTICAL FILM, MANUFACTURING METHOD OF OPTICAL FILM, OPTICAL COMPENSATING FILM, MANUFACTURING METHOD OF OPTICAL COMPENSATING FILM, POLARIZING PLATE, AND LIQUID CRYSTAL DISPLAY

This application claims priority from Japanese Patent Application No. 2005-066913 filed on Mar. 10, 2005, and Japanese Patent Application No. 2006-026237 filed on Feb. 2, 2006, which are incorporated hereinto by reference.

TECHNICAL FIELD

The present invention relates to an optical film, a manufacturing method of the optical film, an optical compensating film, a manufacturing method of the optical compensating film, a polarizing plate and a liquid crystal display, and relates specifically to an optical film in which retardation variation is less even after a long period of duration use, and also an optical compensating film in which transparency and flatness are not deteriorated in a stretching process by using this film as a support. The present invention relates further to a polarizing plate and a liquid crystal display exhibiting not only reduced visibility variation caused by heat generation of. an optical LED backlight and environmental variations, but also excellent color reproducibility.

BACKGROUND

Liquid crystal display (LCD) is widely applied for displaying apparatus such as a word processor, personal computer, television, monitor and mobile information terminal because the display can be operated with low voltage and low electric power consumption and directly connected to an IC circuit and can be made to a thin form. The LCD is basically constituted by, for example, a liquid crystal cell having polarizing plates on both sides thereof.

The polarizing plate is a plate capable of penetrating light polarized in a certain direction. Therefore, the LCD plays an important role for visualizing the variation in the stretching direction of the liquid crystal. Consequently, the properties of the LCD are largely depending on those of the polarizing plate. The polarizing plate is generally constituted by a polarizing film such as a poly(vinyl alcohol) film, on which iodine or a dye is adsorbed in an oriented state, and a transparent resin layer is laminated on both of the surfaces of the plate. For the transparent resin layer, cellulose ester film such as triacetyl cellulose film is frequently employed since such the film has low double refractive index and suitable for the protective film.

In recent years, the liquid crystal display is developed in place of CRT for a monitor having large image size and high image. quality. Requirements for the protective film for the polarizing plate of the liquid crystal display becomes severe. Particularly, there was a problem such that properties such as visibility and the like are easily fluctuated via fluctuation of optical characteristics when a cellulose ester film is installed in a liquid crystal display, since the cellulose ester film has a water-absorbing property. It is specifically demanded to improve retardation stability with respect to environmental-variations when the cellulose ester film is a support film used as an optical compensating film for enlarging a viewing angle.

On the other hand, a solution-casting method is commonly applied for producing the cellulose ester film; in such the method cellulose ester is dissolved in a solvent such as a halogenated solvent to prepare a solution so called to as dope, and the dope is cast on a rotating endless belt or drum as a metal support to form the film. After the casting, the film is solidified on the support by evaporation of a part of the solvent and peeled off from the support. After that, the remaining solvent is removed to obtain the cellulose ester film.

In such the method, however, massive cost is required for equipment such as a drying line and apparatuses for recovering and recycling the evaporated solvent, drying energy and production since the solvent remaining in the film should be removed. Therefore, the cost reducing causes a problem.

For dissolving such the problem, the optical film described in Patent Document 1, which is cellulose ester film form by a melt-casting method. Though optical films exhibiting good optical and physical properties accompanied with dimension stability may be obtained, stability in retardation variation against the environment is further demanded.

As to an optical compensating film, disclosed is a technique to provide an optical compensating film, to which a desired phase difference is added, by stretching the whole support at high temperature after coating a polymer layer having an optical compensating function on a support employing a triacetylcellulose film prepared as a support via solution-casting (refer to Patent Document 2, for example). However, the triacetylcellulose film which is a film prepared via solution-casting, and used as a polarizing protective film causes problems such that retardation unevenness caused by stretching unevenness-is easily generated in the case of stretching at high temperature after separately providing a polymer layer having an optical compensating function without using a preparation process. For this reason, demanded is an optical film in which transparency and flatness are not deterioratedeven though a stretching process for a support is carried out in high temperature treatment, and excellent retardation uniformity is exhibited.

It is also demanded to improve heat generation caused by a direct optical LED backlight as well as visibility variation depending on environmental variations, when the optical compensating film is installed in a liquid crystal display.

[Patent Document 1] Japanese Patent O.P.I. Publication No. 2000-352620

[Patent Document 2] Japanese Patent O.P.I. Publication No. 2004-4474

SUMMARY

In view of the above description, an object of the present invention is to provide an optical film in which retardation variation is less even after a long period of duration of use, also to provide an optical compensating film in which transparency and flatness are not deteriorated in a stretching process by using the foregoing film as a support, and further to provide a polarizing plate and a liquid crystal display exhibiting not only reduced visibility variation caused by heat generation of an optical LED backlight and environmental variations, but also excellent color reproducibility.

Another object of the present invention is also to provide high performance optical and compensating optical films manufactured without using a halogenated solvent having high environmental load.

DESCRIPTION OF THE PREFERRED EMBODIMENTS

The above object of the present invention is accomplished by the following structures.

(Structure 1) A manufacturing method of an optical film formed by melt-casting a composition containing a cellulose resin and a plasticizer, wherein the cellulose resin has a residual sulfuric acid content of 0.1-50 ppm, and the composition contains a polymer having a weight average molecular weight of 500-10000 prepared via polymerization of ethylenic unsaturated monomers, or an acrylic polymer having a weight average molecular weight of 500 -10000.

(Structure 2) The manufacturing method of an optical film of Structure 1, wherein the cellulose resin is a mixed fatty acid ester having a total acyl substitution degree of 2.5 -2.9, and a number average molecular weight of 70000-200000.

(Structure 3) The manufacturing method of an optical film of Structure 1 or 2, wherein the plasticizer is at least one kind selected from the group including a polyvalent alcohol ester type plasticizer, a polyester type plasticizer, a citrate ester type plasticizer, a phthalate ester type plasticizer.

(Structure 4) The manufacturing method of an optical film of any one of structures 1-3, wherein the residual sulfuric acid content is within the range of 0.1-45 ppm.

(Structure 5) The manufacturing method of an optical film of any one of Structures 1-4, wherein the composition contains a UV absorbent, and the UV absorbent has a weight average molecular weight of 490-50000.

(Structure 6) The manufacturing method of an optical film of Structures 1-5, wherein the composition contains 0.01-5% by weight of a hindered amine compound or a hindered phenol compound.

(Structure 7) An optical film, wherein the optical film is prepared by the manufacturing method of an optical film of any one of Structures 1-6.

(Structure 8) A manufacturing method of an optical compensating film, wherein a stretching process is conducted providing a polymer layer on the optical film of Structure 7.

(Structure 9) The manufacturing method of an optical compensating film of Structure 8, wherein the polymer layer is made of at least one kind selected from the group including polyetherketone, polyamide, polyester, polyimide, polyamideimide, and polyesterimide.

(Structure 10) The manufacturing method of an optical compensating film of Structure 8 or 9, wherein stretching temperature B in the stretching process is expressed in following Formula (I). Formula (I): Melting temperature A−100° C.≦Stretching temperature B≦Melting temperature A−40° C. (where melting temperature A represents a temperature during melt-casting of an optical film.)

(Structure 11) An optical compensating film, wherein the optical compensating film is prepared by the manufacturing method of an optical compensating film of any one of Structures 8-10.

(Structure 12) A polarizing plate, wherein an optical film of Structure 7 or an optical compensating film of Structure 11 is provided on at least one surface of the polarizing plate.

(Structure 13) A liquid crystal display, wherein the polarizing plate of Structure 12 is provided on at least one surface of the liquid crystal display.

(Structure 14) The liquid crystal display of Structure 13, wherein a backlight is LED.

The preferred embodiments of the present invention will be explained below, but the present invention is not limited thereto.

The $1^{st}$ object of the present invention is to provide an optical film (in the present invention, referred to also as a cellulose ester film) in which retardation variation is less even after a long period of duration of use. The $2^{nd}$ object is to provide an optical compensating film in which transparency and flatness are not-deteriorated in a stretching process by using the foregoing film as a support. The $3^{rd}$ object is further to provide a polarizing plate and a liquid crystal display exhibiting not only reduced visibility variation caused by heat generation of an optical LED backlight and environmental variations, but also excellent color reproducibility.

After considerable effort during intensive studies, the inventor has found out that the above objects can be accomplished by the manufacturing method of an optical film formed by melt-casting a composition containing a cellulose resin and a plasticizer, wherein the cellulose resin has a residual sulfuric acid content of 0.1-50 ppm, and the composition contains a polymer having a weight average molecular weight of 500-30000 prepared via polymerization of ethylenic unsaturated monomers, or an acrylic polymer having a weight average molecular weight of 50-30000.

The inventor has also found out through intensive studies that retardation stability of an optical film is drastically improved by selecting a specific compound as a polymer contained in a specific cellulose resin or the other cellulose resin with a melt-casting method as a heat-melting method in which a halogenated solvent having high environmental load is not used, in order to obtain improved retardation stability even after a long period of duration of use accompanied with excellent optical characteristics and moisture permeability.

It is found out that an optical compensating film, in which transparency, flatness, and retardation uniformity are excellent, and retardation variation caused by environmental variations is less, has-been produced by forming an optical compensating filmprefared via stretching of the whole support after having a polymer layer provided on the above optical support, which is made of at least one kind selected from the group including polyetherketone, polyamide, polyester, polyimide, polyamideimide, and polyesterimide.

It is found out that the optical compensating film of the present invention is preferably prepared by the manufacturing method of an optical compensating film When a polymer layer, wherein stretching temperature B in the stretching process is expressed in following Formula (I), when a polymer layer is provided on the optical film formed via melt-casting, anf the whole support is stretched Formula (I): Melting temperature A−100° C.≦Stretching temperature B≦Melting temperature A−40° C. (where melting temperature A represents a temperature during melt-casting of an optical film.)

"Melt-casting", as described in the present invention, is specified to be a casting method in which without substantially using solvents, cellulose resin is heat-melted to the temperature to result in fluidity, and casting is subsequently performed employing the resulting melt containing a fluid cellulose resin. A heat melting extrusion method can be classified into a melt-extrusion method, a press formation method, an inflation method, an injection forming method, a blow forming method and a stretching forming method. Among them, the melt-extrusion method is suitable for obtaining the optical compensating film being excellent in the mechanical strength and the surface precision. A process of being cast on an endless belt or drum to form a film via extrusion as a melt-casting film preparation method after a film-constituting material is heated to generate the fluidity is included in the manufacturing method of the film in the present invention.

While the preferred embodiments of the present invention have been described using specific terms, such description is for illustrative purposes only, and it is to be understood that changes and variations may be made without departing from the spirit or scope of the appended claims.

DETAILED DESCRIPTION OF THE PRESENT INVENTION

Next, each of elements of the present invention will be explained in detail.

(Polymer)

It is a feature that the optical film of the present invention contains a cellulose resin, a plasticizer, and a polymer having a weight average molecular weight of 500-30000 prepared via polymerization of ethylenic unsaturated monomers.

It is also a feature that the optical film of the present invention contains a cellulose resin, a plasticizer, and an acrylic polymer having a weight average molecular weight of 500-30000, and is preferred that the acrylic polymer possesses an aromatic ring or a cyclohexyl group as a side chain When the polymer of the present invention has a weight average molecular weight of 500-30000, compatibility with a cellulose resin is favorable, and neither evaporation nor volatilization is generated. When an acrylic polymer possessing an aromatic ring or a cyclohexyl group as a side chain has preferably a weight average molecular weight of 500-10000, or more preferably 500-5000, exhibited are excellent properties such as transparency of a cellulose ester film and extremely low moisture permeability, and also an excellent polarizing plate protective film property.

Since a polymer of the present invention has a weight average molecular weight of 500-10000, it is considered the polymer is one having a lower weight average molecular weight than that of oligomer. To synthesize such a polymer, it is preferred to employ a method of arranging the molecular weight approximately in the same level of quantity, since the molecular weight is difficult to be controlled via common polymerization. Examples as the polymerization method include a method of employing a peroxide compound polymerization initiator such as cumene peroxide or t-butylhydroperoxide; a method of using a larger amount of a polymerization initiator in comparison to that of a regular polymerization process; a method of employing a chain transfer agent such as a mercapto compound; carbon tetrachloride, and the like; a method of employing a polymerization terminator such as benzoquinone or dinitrobenzene; and further a method of mass-polymerization employing a compound containing one thiol group and a secondary-hydroxyl group, disclosed in Japanese Patent O.P.I. Publication Nos. 2000-128911 and 2000-344823 or employing a polymerization catalyst used in combination with the foregoing compound and an organometallic compound. Though any of the methods is preferably utilized, the method described in the foregoing patent publications is particularly preferable.

Examples of monomer as a monomer unit constituting a useful polymer in the present invention will be provided, but these are not limited thereto.

Examples of vinyl ester as an ethylenic unsaturated monomer unit constituting a polymer prepared via polymerization of the ethylenic unsaturated monomer include vinyl acetate, vinyl propionate, butyric acid vinyl, valeric acid vinyl, pivalic acid vinyl, caproic acid vinyl, capric acid vinyl, lauric acid vinyl, myristic acid vinyl, Palmitic acid vinyl, stearic acid vinyl, cyclohexane carboxylic acid vinyl, octyl acid vinyl, methacrylic acid vinyl, crotonic acid vinyl, sorbic acid vinyl, benzoic acid vinyl, cinnamic acid vinyl. Examples of acrylic acid ester include acrylic acid methyl, acrylic acid ethyl, acrylic acid propyl (i-,n-), acrylic acid butyl (n-,i-,s-,t-), acrylic acid pentyl (n-,i-,s-), acrylic acid hexyl (n-,i-), acrylic acid heptyl (n-,i-), acrylicacid octyl (n-,i-), acrylic acid nonyl (n-,i-), acrylic acid myristyl (n-,i-), acrylic acid cyclohexyl, acrylic acid (2-ethylhexyl), acrylic acid benzyl, acrylic acid phenethyl, acrylic acid ($\epsilon$-caprolactone), acrylic acid (2-hydroxyethyl), acrylic acid (2-hydroxypropyl), acrylic acid (3-hydroxypropyl), Acrylic acid (4-hydroxy butyl), acrylic acid (2-hydroxy butyl), acrylic acid-p-hydroxy methylphenyl, acrylic acid-p-(2-hydroxyethyl)phenyl, and the like. Examples of methacrylic acid ester include compounds in which the above acrylic acid ester is replaced to methacrylic acid ester. Examples of unsaturation acids include acrylic acid, methacrylic acid, maleic anhydride, crotonic acid, itaconic acid, and the like. A polymer constituting the above monomer may be a copolymer or a homopolymer, and a homopolymer of vinyl ester, a copolymer of vinyl ester, or a copolymer of vinyl ester with acrylic acid or methacrylic acid ester is preferable.

In the present invention, an acrylic polymer designates a homopolymer or a copolymer of acrylic acid, or methacrylic acid alkyl ester, which does not possess a monomer unit having an aromatic ring or a cyclohexyl group. The acrylic polymer having an aromatic ring as a side chain is an acrylic polymer possessing an inevitably amomatic ring-containing acrylic acid or methacrylic acid ester monomer unit. The acrylic polymer having a cyclohexyl group as a side chain is an acrylic polymer possessing a cyclohexyl group-containing acrylic acid or methacrylic acid ester monomer unit.

Examples of the acrylic acid ester monomer which does not possess an aromatic ring or a cyclohexyl group include acrylic acid methyl, acrylic acid ethyl, acrylic acid propyl (i-,n-), acrylic acid butyl (n-,i-,s-,t-), acrylic acid pentyl (n-,i-,s-), acrylic acid hexyl (n-,i-), acrylic acid heptyl (n-,i-), acrylic acid octyl (n-,i-), acrylic acid nonyl (n-,i-), acrylic acid myristyl (n-,i-), acrylic acid (2-ethylhexyl), acrylic acid ($\epsilon$-caprolactone), acrylic acid (2-hydroxyethyl), acrylic acid (2-hydroxypropyl), acrylic acid (3-hydroxypropyl), acrylic acid (4-hydroxybutyl), acrylic acid (2-hydroxybutyl), acrylic acid (2-methoxyethyl), acrylic acid (2-ethoxyethyl), and the like, or compounds in which the above acrylic acid ester is replaced to methacrylic acid ester.

The acrylic monomer is a homopolymer or a copolymer of the above polymer, but the acrylic monomer has preferably an acrylic acid methylester monomer unit of not less than 30% by weight, preferably a methacrylic acid methylester monomer unit of not less than 40% by weight, and a homopolymer of acrylic acid methyl or of methacrylic acid methyl is particularly preferable.

Examples of the acrylic acid possessing an aromatic ring or a methacrylic acid ester monomer include acrylic acid phenyl, methacrylic acid phenyl, acrylic acid (2 or 4-chlorophenyl), methacrylic acid (2 or 4-chlorophenyl), acrylic acid (2,3, or 4-ethoxycarbonyl phenyl), methacrylic acid (2,3, or 4-ethoxycarbonyl phenyl), acrylic acid (o,m, or p-tolyl), methacrylic acid (o,m, or p-tolyl), acrylic acid-benzyl, methacrylic acid benzyl, acrylic acid phenethyl, methacrylic acid phenethyl and acrylic acid (2-naphthyl), but acrylic acid benzyl, methacrylic acid benzyl, acrylic acid phenethyl, and methacrylic acid phenethyl may preferably be used.

An aromatic ring-containing acrylic acid or methacrylic acid ester polymer unit of 20-40 by weight is contained in an acrylic polymer having an aromatic ring as a side chain, and it is preferred that the acrylic acid or methacrylic acid ester polymer unit of 50-80 by weight is contained. It is also preferred that a hydroxyl group-containing acrylic acid or methacrylic acid ester polymer unit of 2-20 by weight is contained in the polymer.

Examples of the acrylic acid ester monomer having a cyclohexyl group include acrylic acid cyclohexyl, methacrylic acid cyclohexyl, acrylic acid (4-methylcyclohexyl), methacrylic acid (4-methylcyclohexyl), acrylic acid (4-ethylcyclohexyl), methacrylic acid (4-ethylcyclohexyl), and the like. Of these, acrylic acid cyclohexyl or methacrylic acid cyclohexyl can preferably be used.

An cyclohexyl group-containing acrylic acid or methacrylic acid ester polymer unit of 20-40 by weight is contained in an acrylic polymer having a cyclohexyl group as a side chain, and preferably 50-80 by weight is contained in the polymer. It is also preferred that a hydroxyl group-containing acrylic acid or methacrylic acid ester polymer. unit of 2-20 by weight is contained in the polymer.

Any one of polymers such as a polymer prepared via polymerization of the above ethylenic unsaturated monomer, an acrylic polymer, an acrylic polymer having an aromatic ring as a side chain, and an acrylic polymer having a cyclohexyl group as a side chain exhibits excellent compatibility with a cellulose resin, excellent productibity with neither evaporation nor volatilization in a melt-casting film forming process, excellent storage ability of a polarizing plate protective film, low moisture perpeability, and excellent dimension stability.

In the case of a hydroxyl group-containing acrylic acid or methacrylic acid ester monomer, the unit is not a constituting unit of homopolymer, but that of copolymer. In this case, it is preferred that a hydroxyl group-containing acrylic acid or methacrylic acid ester monomer unit of 2-20% by weight is contained inan acrylic polymer.

In the present invention, a polymer having a hydroxyl group as a side chain may also be preferably used. Similarly to the foregoing monomer, acrylic acid or methacrylic acid ester is preferable as a monomer unit having a hydroxyl group, and examples include acrylic acid (2-hydroxyethyl), acrylic acid (2-hydroxypropyl), acrylic acid (3-hydroxypropyl), acrylic acid (4-hydroxy butyl), acrylic acid (2-hydroxy butyl), acrylic acid-p-hydroxy methylphenyl, acrylic acid-p (2-hydroxyethyl)phenyl, or compounds in which this acrylic acid is replaced to a methacrylic acid. Of these, acrylic acid-2-hydroxyethyl or methacrylic acid-2-hydroxyethyl is preferable. A hydroxyl group-containing acrylic acid ester or methacrylic acid ester monomer unit of 2-20% by weight is preferably contained in the polymer, and that of 2-10% by weight is more preferably contained.

When the foregoing polymer contains the above hydroxyl group-containing monomer unit of 2-20% by weight, exhibited are not only excellent compatibility with a cellulose resin, excellent storage ability, excellent dimension stability and low moisture perpeability, but also excellent adhesiveness to a polarizer as a polarizing plate protective film and improved polarizing plate durability.

The polymer in the present invention has preferably a hydroxyl group at least one of the polymer ends of the main chain. The methods of incorporating a hydroxyl group into the polymer ends are not specifically limited, but include a method of employing a radical polymerization initiator having a hydroxyl group such as azobis (2-hydroxyethylbutyrate) and the like; a method of employing a chain transfer agent having a hydroxyl group such as 2-mercaptoethanol and the like; a method of employing a polymerization terminator having a hydroxyl group; a method of incorporating a hydroxyl at the ends via ionic polymerization; and a method of mass-polymerization employing a catalyst as a compound having a thiol group and a secondary hydroxyl group, or employing a catalyst used in combination with the aforementioned compound and an organometallic compound, disclosed in Japanese Patent O.P.I. Publication Nos. 2000-128911 and 2000-344823. Of these, the methoddisclosed in these patent publication Nos. are particularly preferable. Such a polymer described in these patent publication Nos. is commercially available on the market, and examples thereof include Actflow produced by Soken Kagaku Co., Ltd., which is preferably used in the invention.

It is to be understood in the present invention that the above polymer having a hydroxyl group at the ends and/or a polymer having a hydroxyl group as a side chain have/has improved such the properties of compatibility of polymer and transparency.

This polymer contains preferably 1-20% by weight in an optical film, and more preferably 3-15% by weight.

(Cellulose Resin)

The cellulose resin employed in the present invention will now be detailed.

The optical film of the present invention is produced employing a melt-casting method. The melt-casting method makes it possible to significantly decrease the used amount of organic solvents during film production, whereby it is possible to produce films which are friendlier to the environment compared to the conventional solution-casting method which employs a large amount of organic solvents.

"Melt-casting", as described in the present invention, refers to a method in which without substantially using solvents, cellulose resin is heat-melted to the temperature to result in fluidity and casting is performed employing the resulting melt, via, for example, a method in which fluid cellulose resin is extruded from a die to result in casting.

Cellulose resins constituting an optical film are not particularly limited as long as they enable melt-casting, and for example, aromatic carboxylic acid esters are employed. However, in view of characteristics of film capable of achieving specified optical characteristics, it is preferable to use lower fatty acid esters of cellulose. The lower fatty acids in the lower fatty acid esters of cellulose in the present invention refer to fatty acids having at most 5 carbon atoms and examples of preferred ones include lower fatty acid esters such as cellulose acetate, cellulose propionate, cellulose butyrate, or cellulose pivarate. In order to cope with both dynamic characteristics and melt-casting properties, employed may be mixed fatty acid esters such as cellulose acetate propionate or cellulose acetate propionate. Incidentally, the decomposition temperature of triacetyl cellulose, which is the cellulose resin commonly employed in the solution-casting, is higher than its melting temperature, whereby it is not possible to apply it to melt-casting.

Consequently, the most preferable lower fatty acid esters of cellulose are those which have an acyl group having 2-4 carbon atoms as a substituent, and satisfy following Formulas (2) and (3). X represents the degree of substitution employing acetic acid, namely the degree of substitution of an acetyl group, while Y represents the degree of substitution employing an organic acid having 3-5 carbon atoms, namely the degree of substitution employing an acyl group such as a propionyl group or a butyryl group.

$2.5 \leq X+Y \leq 2.9$  Formula (2):

$0.1 \leq Y \leq 2.0$  Formula (3):

Of these, cellulose acetate propionate is particularly preferably employed. Of them, it is preferable to use cellulose esters satisfying the following formulas.

$1.5 \leq X \leq 2.5$, and $0.5 \leq Y \leq 1.0$

The portion which is not substituted with an acyl group is present as a hydroxyl group. It is possible to synthesize the above cellulose esters employing commonly known methods.

Preferably employed is a cellulose ester in which the total acyl substitution degree at the 2-, 3- and 6-position per a glucose unit of the cellulose ester is in the range of 2.0-2.9, and the average substitution degree of an acyl group at 6-position is 0.5-0.9.

The ratio of weight average molecular weight, Mw/number average molecular weight Mn, of cellulose resins employed in the present invention is commonly 1.0-5.5, is preferably 1.4-5.0, but is most preferably 2.0-3.0. Further, Mw of the cellulose resins is commonly 100,000-500,000 but is preferably 200,000-400,000.

It is possible to determine the average molecular weight and molecular weight distribution of cellulose resins employing the methods known in the art which employ high speed liquid chromatography.

Measurement conditions for the above are as follows.
Solvent: methylene chlorine
Column: SHODEX K806, K805, and K803 (produced by Showa Denko K. K., these columns were used upon being connected)
Column temperature: 25° C.
Sample concentration: 0.1% by weight
Detector: RI Model 504 (produced by GL Science Co.)
Pump: L6000 (produced by Hitachi, Ltd.)
Flow rate: 1.0 ml/minute
Calibration curve: The used calibration curve was prepared employing 13 samples of Standard Polystyrene STK, polystyrene (produced by Tosoh Corp.) of 500-1,000,000 Mw. It is preferable that the above 13 samples are selected to result in approximately equal intervals.

Raw cellulose materials of the cellulose resins employed in the present invention may be either wood pulp or cotton linter. Wood pulp may be made from either conifers or broad-leaved trees, but coniferous pulp is more preferred. However, in view of peeling properties during casting, cotton linters are preferably employed. Celluloses resins prepared employing these materials may be employed individually or in appropriate combinations.

For example, the following ratios are possible: cellulose resin derived from cotton linter: cellulose resin derived from wood pulp (conifers):cellulose resin derived from wood pulp (broad-leaved trees) is 100:0:0, 90:10:0, 85:15:0, 50:50:0, 20:80:0, 10:90:0, 0:100:0, 0:0:100, 80:10:10, 85:0:15, and 40:30:30.

It is possible to prepare cellulose resins by replacing the hydroxyl group of cellulose raw materials with an acetyl group, an propionyl group, and/or a butyl group, employing acetic anhydride, propionic anhydride, and/or butyric anhydride based on conventional methods. Synthesis methods of such cellulose resins are not particularly limited, and it is possible to synthesize them with reference to, for example, Japanese Patent O.P.I. Publication No. 10-45804 or Published Japanese translation of PCT international Publication No. 6-501040. Or, cellulose resins described in Japanese Patent O.P.I. Publication No. 2005-281645 may be used.

It is possible to determine the degree of substitution of the acetyl group, propionyl group, and butyl group based on ASTM-D817-96.

Further, cellulose resins are industrially synthesized employing sulfuric acid as a catalyst, however the above sulfuric acid is not easily completely removed. The residual sulfuric acid undergoes various types of decomposition reactions to result in adverse effects to product quality of the resulting cellulose ester films. Consequently, it is desirable to control the residual sulfuric acid in the cellulose resins employed in the present invention within the range of 0.1-50 ppm in terms of sulfur element, and preferably within the range of 0.1-45 ppm. It is assumed that these acids are incorporated in the form of salts. It is not preferable that the content of the residual sulfuric acid exceeds 45 ppm, because adhering materials on die lips decrease during heat melting in addition to the effects of the present invention. Further, it is preferable that the content is relatively small. However, it is not preferable that content is at most 0.1 ppm, because achieving at most 0.1 ppm results in excessively large load for the washing process of cellulose resins and further on the contrary, breakage tends to occur during or after heat stretching. It is assumed that an increase in washing frequency adversely affects the resins, but the reasons for this are not well understood. The content of the residual sulfuric acid is more preferably in the range of 0.1-30 ppm. It is also possible to determine the content of the residual sulfuric acid based on the following measuring method.

(Measuring Method of Residual Sulfuric Acid Content)

<Pre-Treatment>

A weighed sample of 500 mg (M) is placed in a polypropylene vessel, and ultrapure water of 10 ml is added into it.

After the above is dispersed by an ultrasonic cleaner for 30 minutes, it is filtrated with a water-based chrimatodisc (0.45 μm) to prepare a sample.

(Quantitative Determination of $SO_4$)
<Apparatus> Ionchromatography DX-120 produced by DIONEX
<Column> IonPac AG14(4 mm)+IonPac AS14(4 mm)
<Suppressor> ASRS-ULTRAII(4 mm)
<Eluting solution> 3.5 mM-$Na_2CO_3$ 1.0 mM:-$NaHCO_3$
<SRS current> 50 mA
<Flow rate> 1.0 ml/min
<Dose> 25 μm
<Conversion method> Content(ppm)=measured value (mg/l)/1000×10/M(mg)×1000000

By further sufficiently washing synthesized cellulose resin compared to the case in which the solution-casting method is employed, it is possible to achieve the desired content of residual sulfuric acid to be within the above range. Thus, during production of film employing the melt-casting method, adhesion to the lip portions is reduced to produce films of excellent flatness, whereby it is possible to produce films which exhibit excellent dimensional stability, mechanical strength, transparency, and moisture permeability resistance, as well as the desired values Rt and Ro described below.

Further, the limiting viscosity of cellulose resins is preferably 1.5-1.75 g/cm$^3$; but is more preferably 1.53-1.63.

Still further, it is preferable that when the cellulose resins employed in the present invention are converted to a film, the resulting film produces minimal foreign matter bright spots. "Foreign matter bright spots" refers to the following type of spots. A cellulose ester film is placed between two polarizing plates arranged at right angles (crossed Nicols) and light is exposed on one side while the other side is viewed. When foreign matter is present, light leaks through the film and a phenomenon occurs in which foreign matter particles are seen as bright spots. During this operation, the polarizing plate, which is employed for evaluation, is composed of a protective film without any foreign matter bright spots, whereby a glass plate is preferably employed to protect polarizers. It is assumed that one of the causes of foreign matter bright spots is the presence of cellulose which has undergone no acetylation or only a low degree of acetylation. It is necessary to employ cellulose resins (or employing cellulose resins exhibiting a degree of uniform substitution). Further, it is possible to remove foreign matter bright spots in such a manner that melted cellulose resins are filtered, or during either the latter half of the synthesis process of the cellulose resins, or during the process to form precipitates, a solution is temporarily prepared and is filtered via a filtration process. Since melted resins exhibit high viscosity, the latter method is more efficient.

It is likely that as the film thickness decreases, the number of foreign matter bright spots per unit area decreases, and similarly, as the content of cellulose resin incorporated in films decreases, foreign matter bright spots decreases. The number of at least 0.01 mm foreign matter bright spots is preferably at most 200, is more preferably at most 100, is still more preferably at most 50, is still more preferably at most 30, is yet more preferably at most 10, but is most preferably of course zero.

In cases in which bright spot foreign matter is removed via melt-filtration, it is preferable to filter the melted composition composed of cellulose resins, plasticizers, degradation resistant agents, and antioxidants, rather than to filter melted individual cellulose resin, whereby bright spot foreign matter is efficiently removed. Of course, bright spot foreign matter may be reduced in such a manner that during synthesis of cellulose resin, the resulting cellulose resin is dissolved in solvents and then filtered. It is possible to filter compositions which appropriately incorporate UV absorbents and other additives. The viscosity of the melt, incorporating cellulose resins, which is to be filtered, is preferably at most 10,000 P, is more preferably at most 5,000 P, is still more preferably at most 1,000 P, but is most preferably at most 500 P. Preferably employed as filters are those known in the art, such as glass fibers, cellulose fibers, paper filters, or fluorine resins such as tetrafluoroethylene. However, ceramic and metal filters are particularly preferably employed. The absolute filtrations accuracy of employed filters is preferably at most 50 μm, is more preferably at most 30 μm, is still more preferably at most 10 μm, but is most preferably at most 5 μm. It is possible to employ them in suitable combinations. Employed as a filter, may be either a surface type or a depth type. The depth type is more preferably employed since it is relatively more free from clogging.

In another embodiment, employed as raw cellulose resin materials may be those which are dissolved in solvents at least ounce, and then dried to remove the solvents. In this case, cellulose ester is dissolved in solvents together with at least one of a plasticizer, an UV absorbent, a degradation resistant agent, an antioxidant, and a matting agent. Thereafter, the mixture is dried and then used as a cellulose resin composition. Employed as solvents may be good solvents, such as methylene chloride, methyl acetate, dioxolan, which are employed in the solution-casting method, while poor solvents such as methanol, ethanol, or butanol may also be simultaneously employed. In the dissolving process, cooling may be performed to −20° C. or lower, or heated to 80° C. or higher. By employing such cellulose resin, it is possible to uniformly mix each of the additives in a melted state and, it is occasionally possible to make the resulting optical characteristic very uniform.

(Plasticizer)

The addition of a plasticizer in combination with the foregoing polymer to the optical film of the present invention is desired for improving the film properties such as mechanical properties, softness and anti-moisture absorbing ability. The object of the addition of the plasticizer in the melt-cascading method according to the present invention further includes to make the melting point of the film constituting materials to lower than the glass transition point of the independent cellulose and to make the viscosity of the film constituting material containing the plasticizer to lower than that of the cellulose resin at the same temperature.

In the present invention, the melting point of the film constituting material is the temperature of the heated material at the time when the fluidity of the material is appeared.

The independent cellulose resin not fluidized at a temperature lower than the glass transition point since the cellulose resin becomes film state. However, the elasticity or viscosity of the cellulose resin is lowered by heating at a temperature of higher than the glass transition point so that the cellulose resin is fluidized. It is preferable that the plasticizer to be added has a melting point or glass transition point lower than that of the cellulose resin for melting the film constituting material and satisfying the above objects.

Though the plasticizer relating to the present invention is not specifically limited, the plasticizer has a functional group capable of interacting by a hydrogen bond with the cellulose derivative or the other additives so that the haze or the bleeding out or evaporation of the plasticizer from the film does not occur.

Examples of such the functional group include a hydroxyl group, an ether group, a carbonyl group, an ester group, a residue of carboxylic acid, an amino group, an imino group, an amido group, a cyano group, a nitro group, a sulfonyl group, a residue of sulfonic acid, a phosphonyl group and a residue of phosphoric acid. The carbonyl group, ester group and phosphonyl group are preferable.

Examples of preferably usable plasticizer include a phosphate type plasticizer, a phthalate type plasticizer, a trimelitate type plasticizer, a pyromelitate type plasticizer, a polyvalent alcohol ester type plasticizer, a glycolate type plasticizer, a citrate type plasticizer, an aliphatic acid ester type plasticizer, a calboxylate type plasticizer and a polyester type plasticizer, and the polyvalent alcohol ester type plasticizer, polyester type plasticizer and citrate type plasticizer are particularly preferable. The addition of these plasticizers to the UV absorbent having a molecular weight of 490-50,000 is preferable for the compatibility.

The poly-valent alcohol ester is the ester of a di- or more-valent alcohol and a mono-carboxylic acid and preferably has an aromatic ring or a cycloalkyl ring in the molecular thereof.

The poly-valent alcohol is represented by the following Formula (1).

$$R_1—(OH)_n \quad \text{Formula (1)}$$

In the above, $R_1$ is an n-valent organic group, and n is an integer of 2 or more.

Examples of preferable poly-valent alcohol include adonitol, arabitol, ethylene glycol, Diethylene glycol, triethylene glycol, tetraethylene glycol, 1,2-propanediol, 1,3-propanediol, dipeopylene glycol, tripropylene glycol, 1,2-butnaediol, 1,3-butanediol, 1.4-butanediol, dibutylene glycol, 1,2,4-bunanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol, but the present invention is not limited to them. Particularly, triethylene glycol, tetraethylene glycol, triethylol propane and xylitol are preferred.

Among them, the poly-valent alcohol esters using a polyvalent alcohol having 5 or more, particularly 5 to 20 carbon atoms are preferable.

As the monocarboxylic acid to be used in the poly-valent alcohol ester, a known aliphatic monocarboxylic acid, alicyclic monocarboxylic acid and aromatic monocarboxylic acid can be employed though the monocarboxylic acid is not limited. The alicyclic monocarboxylic acid and aromatic monocarboxylic acid are preferable for improving the moisture permeability ability and storage ability.

Examples of the preferable monocarboxylic acid are listed below but the present invention is not limited to them.

A straight or side chain fatty monocarboxylic acid having 1-32 carbon atoms is preferably employed. The number of carbon atoms is more preferably 1-20, and particularly preferably 1-10. The addition of acetic acid is preferable for raising the compatibility with the cellulose derivative, and the mixing of acetic acid with another carboxylic acid is also preferable.

As the preferable aliphatic monocarboxylic acid, a saturated fatty acid such as acetic acid, propionic acid, butylic acid, valeric acid, caproic acid, enantic acid, caprylic acid, pelargonic acid, capric acid, 2-ethyl-hexane carboxylic acid, undecylic acid, lauric acid, dodecylic acid, myristic acid, pentadecylic acid, palmitic acid, heptadecylic acid, stearic acid, nonadecanic acid, arachic acid, behenic acid, lignocelic acid, cerotic acid, heptacosanic acid, montanic acid, melisic acid and lacceric acid, and a unsaturated fatty acid such as undecylenic acid, oleic acid, sorbic acid, linolic acid, linolenic acid and arachidonic acid can be exemplified.

Examples of preferable alicyclic carboxylic acid include cyclopentene carboxylic acid, cyclohexane carboxylic acid, cyclooctane carboxylic acid and derivatives thereof.

Examples of preferable aromatic carboxylic acid include ones formed by introducing an alkyl group onto the benzene ring of benzoic acid such as benzoic acid and toluic acid, an aromatic monocarboxylic acid having two or more benzene rings such as biphenylcarboxylic acid, naphthalene carboxylic acid and tetralin carboxylic acid and derivatives of them, and benzoic acid is particularly preferable.

The molecular weight of the poly-valent alcohol is preferably 300-3,000, and more preferably 350-1,500 though the molecular weight is not specifically limited. Larger molecular weight is preferable for low volatility and smaller molecular weight is preferable for the moisture permeability and the compatibility with the cellulose derivative.

The carboxylic acid to be employed in the poly-valent alcohol ester may be one kind or mixture of two or more kinds of them. The hydroxyl group in the polyvalent alcohol may be entirely esterified or partially leaved.

Concrete compounds of the poly-valent alcohol are listed below.

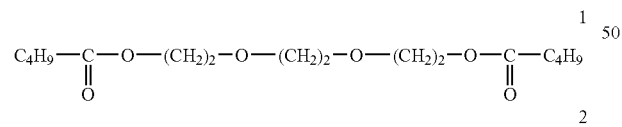

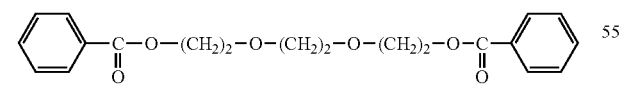

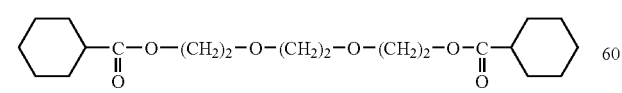

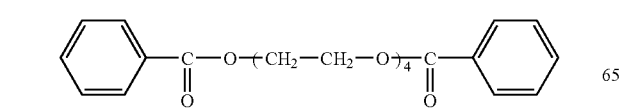

-continued

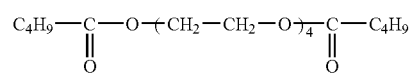

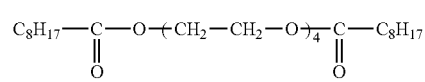

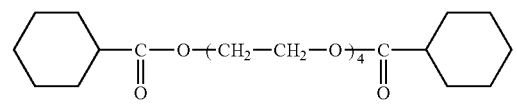

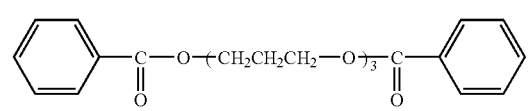

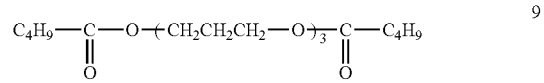

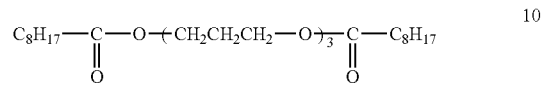

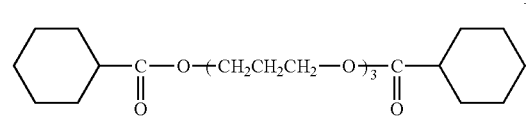

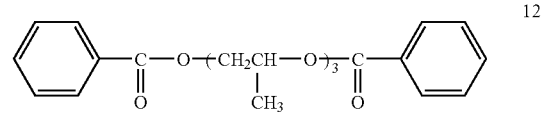

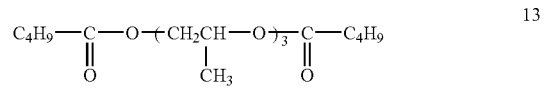

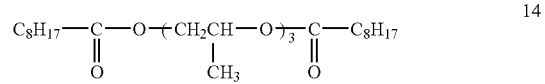

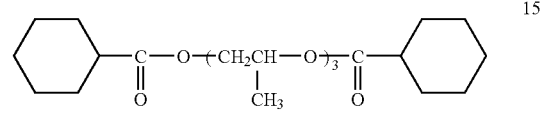

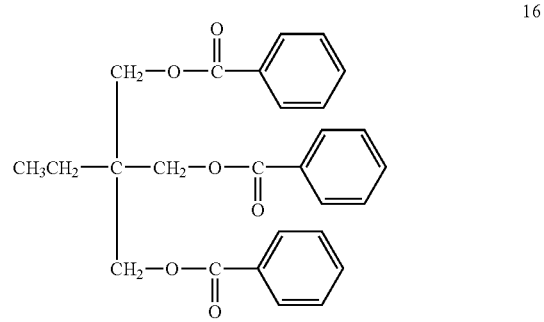

17
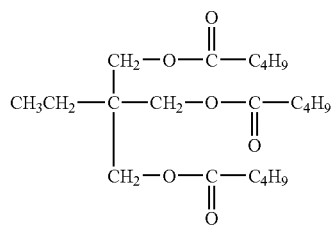
18
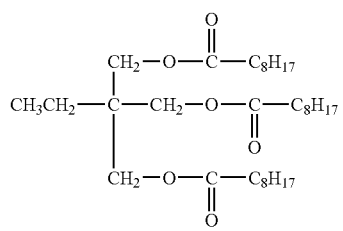
19
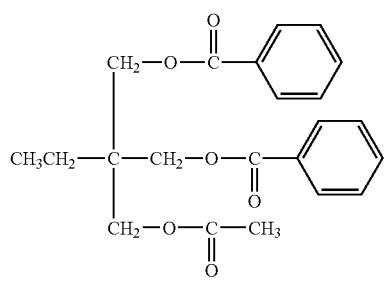
20
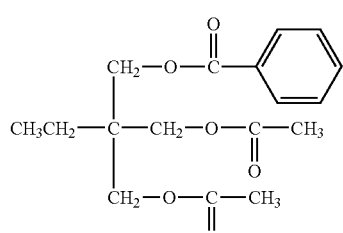
21
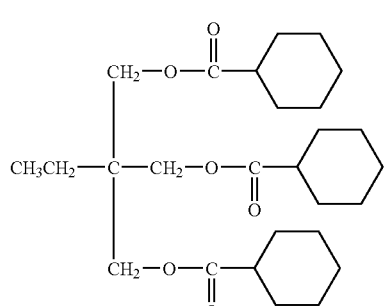
22
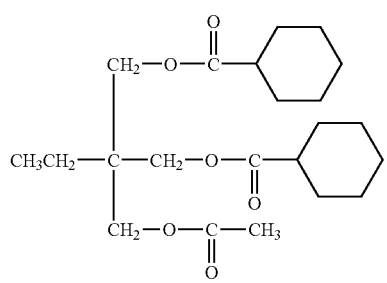
23
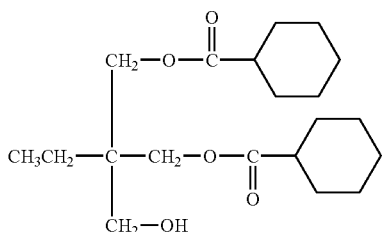
24
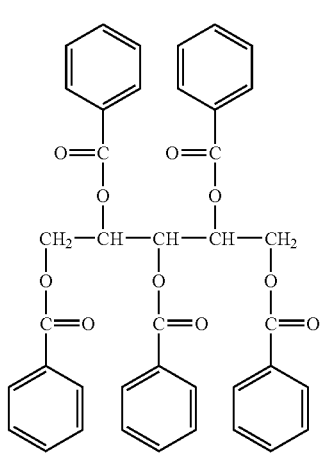
25
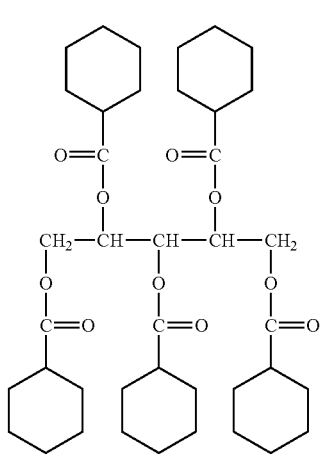
26
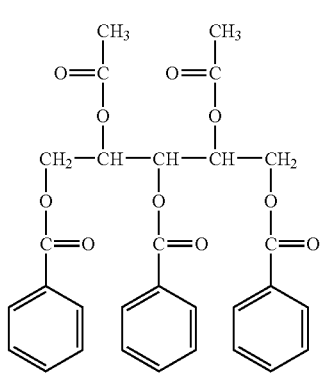

27

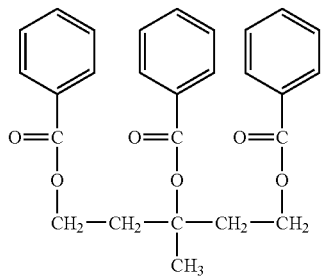

28

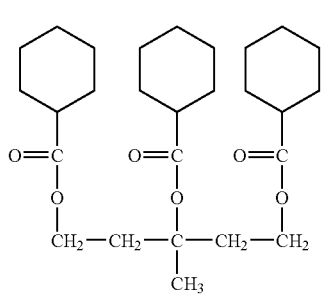

29 30

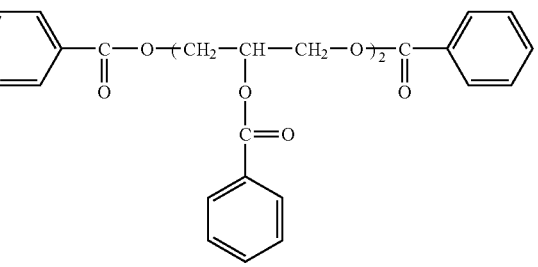

31

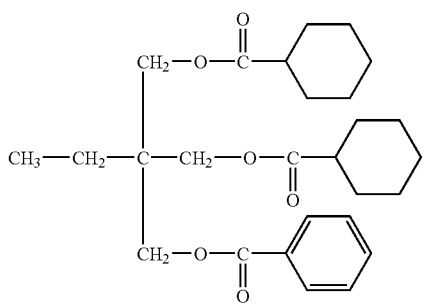

32

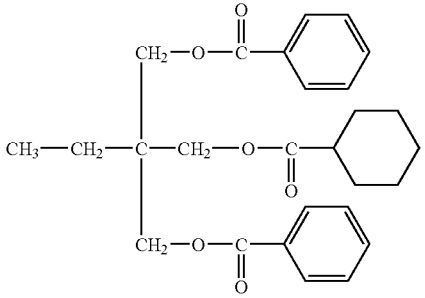

33

34

35

Moreover, a polyester type plasticizer having a cycloalkyl group in the molecule thereof is preferably employed. For example, compounds represented by the following Formula (2) are preferable though the polyester type plasticizer is not specifically limited.

B-(G-A)$_n$-G-B     Formula (2)

In the above formula, B is a benzene monocarboxylic acid residue, G is an alkylene glycol residue having 2-12 carbon atoms, an aryl glycol residue having 6-12 carbon atoms or an oxyalkylene glycol residue having 4-12 carbon atoms, A is an alkylenecarboxylic acid residue having 4-12 carbon atoms or an aryldicarboxylic acid residue having 6-12 carbon atoms, and n is an integer of 0 or more.

The polyester type plasticizer is constituted by the benzene monocarboxylic acid residue represented by B, the alkylene glycol residue, the aryl glycol residue or the oxyalkylene glycol residue represented by G, and an alkylenecarboxylic acid residue or an aryldicarboxylic acid residue represented by A; the plasticizer can be obtained by a reaction similar to that for obtaining usual polyester type, plasticizer.

As the benzene monocarboxylic acid component of the polyester type plasticizer employed in the present invention, for example, benzoic acid, p-tert-butylbenzoic acid, o-toluic acid, m-toluic acid, p-toluic acid, dimethylbenzoic acid, ethylbenzoic acid, n-propylbenzoic acid, aminobenzoic acid and acetoxybenzoic acid are applicable. They can be employed solely or in combination.

Examples of the alkylene glycol with 2-12 carbon atoms as the component of the polyester type plasticizer of the present invention include ethylene glycol, 1,2 propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol(neopentyl glycol), 2,2-diethyl-1,3-propanediol(3,3-dimethylolpentane), 2-n-butyl-2-ethyl-1,3-propanediol(3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol and 1,12-octadecanediol. These glycols are employed solely or in mixture of two or more kinds thereof.

Examples of the oxyalkylene glycol component with 4-12 carbon atoms forming the terminal aromatic ester structure include Diethylene glycol, triethylene glycol, tetraethylene glycol, dipropylene glycol and tripropylene glycol. These glycols can be employed solely or in combination of two or more kinds.

Examples of the alkylenedicarboxylic acid component with 4-12 carbon atoms forming the terminal aromatic ester structure include succinic acid, maleic acid, fumaric acid, glutaric acid, adipic acid, azelaic acid, sebacic acid and dodecanedicarboxylic acid. These acids can be employed solely or in a combination of two or more kinds. The examples of the arylenedicarboxylic acid component having 6 to 12 carbon atoms include phthalic acid, tetraphthalic acid, 1,5-naphthalenedicarboxylic acid and 1,4-naphthalenedicarboxylic acid.

The suitable number average molecular weight of the polyester type plasticizer to be employed in the present invention is preferably 250-2,000, and more preferably 300-1,500. The acid value of that is 0.5-25 mg KOH/g, and one having an acid value of not more than 0.3 mg KOH/g and a hydroxyl group value of not more than 15 mg KOH/g is more suitable.

Examples of synthesizing of the aromatic terminal ester type plasticizer are described below.

Sample No. 1 (Sample of Aromatic Terminal Ester)

In a reaction vessel, 365 parts (2.5 moles) of adipic acid, 418 parts (5.5 moles) of 1,2-propylene glycol, 610 parts of (5 moles) of benzoic acid and 0.30 parts of tetraisopropyl titanate as a catalyst were charged at once and stirred in nitrogen gas stream, and heated at a temperature of 130-250° C. until the acid value becomes not more than 2 while formed water was continuously removed and excessive mono-valent alcohol was refluxed by a reflux condenser. After that, distillate was removed under a reduced pressure of not more than $1.33 \times 10^4$ Pa, finally not more than $4 \times 10^2$ Pa at a temperature of 200-230° C., and then the content of the vessel was filtered to obtain an aromatic terminal ester having the following properties.

Viscosity (mPa·s at 25° C.): 815
Acid value: 0.4

Sample No. 2 (Sample of Aromatic Terminal Ester)

An aromatic terminal ester having the following properties was obtained in the same manner as in Sample 1 except that 365 parts (2.5 moles) of adipic acid, 610 parts (5 moles) of benzoic acid, 583 parts (5.5 moles) of diethylene glycol and 0.45 parts of tetraisopropyl titanate as a catalyst were employed.

Viscosity (mPa·s at 25° C.): 90
Acid value: 0.05

Sample No. 3 (Sample of Aromatic Terminal Ester)

An aromatic terminal ester having the following properties was obtained in the same manner as in Sample 1 except that 410 parts (2.5 moles) of phthalic acid, 610 parts (5 moles) of benzoic acid, 737 parts (5.5 moles) of dipropylene glycol and 0.40 parts of tetraisopropyl titanate as a catalyst were employed.

Viscosity (mPa·s at 25° C.): 43,400
Acid value: 0.2

Concrete compounds of the aromatic terminal ester type plasticizer are listed below; the present invention is not limited to the listed compounds.

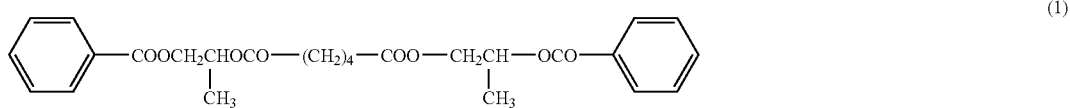

(1)

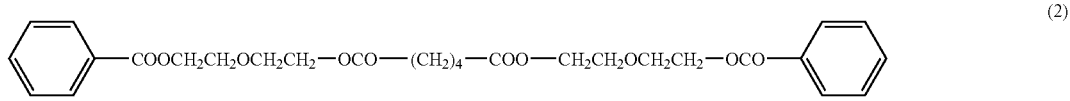

(2)

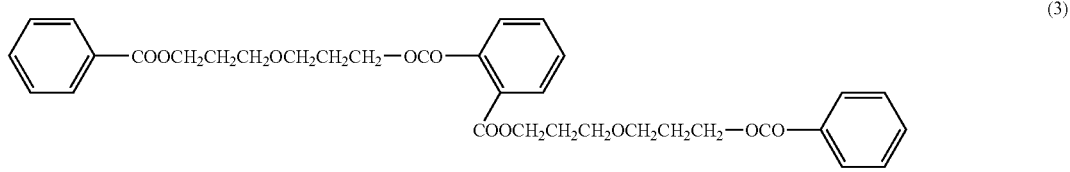

(3)

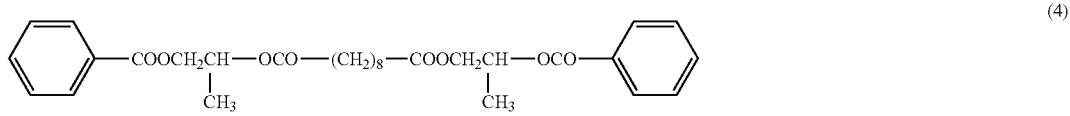

(4)

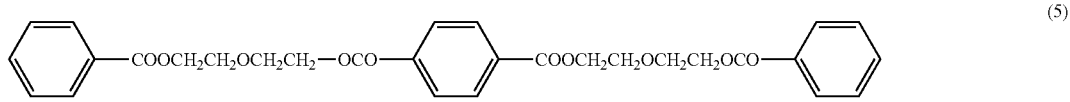

(5)

-continued (6)
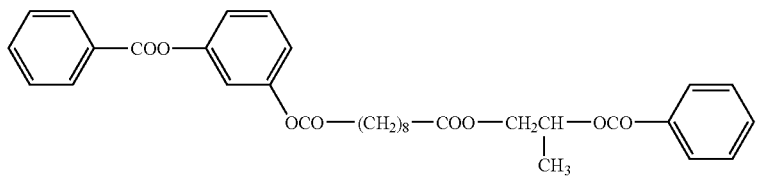

(7)
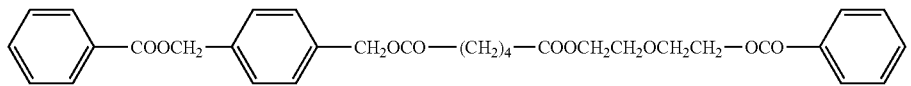

(8)
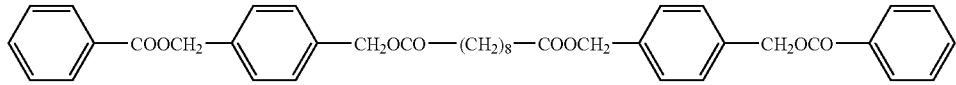

(9)
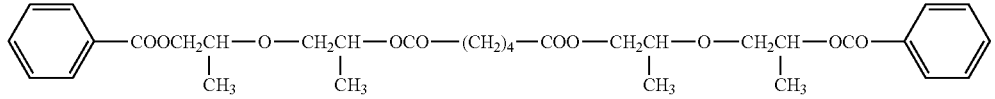

(10)
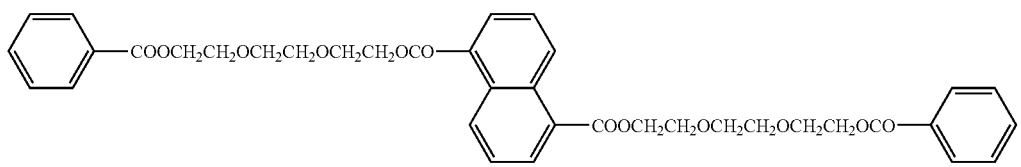

The content of the polyester type plasticizer in the optical film is preferably 1-20%, and particularly preferably 3-11%, by weight.

The optical film of the present invention preferably contains also a plasticizer other than the above-described plasticizer.

The dissolving out of the plasticizer can be reduced by containing two or more kinds of the plasticizer. Tough the reason of such the effect is not cleared; it is supposed that the dissolving out is inhibited by the interaction between the two kinds of the plasticizer and the cellulose resin.

Examples of phthalate type plasticizer include diethyl phthalate, dimethoxethyl phthalate, dimethyl phthalate, dioctyl phthalate, dibutyl phthalate, di-2-ethylhexyl phthalate, dioctyl phthalate, dicyclohexyl phthalate and dicyclohexyl terephthalate. Moreover, a phthalate dimer represented by Formula (1) described in Japanese Patent O.P.I. Publication No. 11-349537 is preferably employed. In concrete, Compound-1 and Compound-2 described in paragraphs 23 and 26 of the patent document are preferably employable.

Formula (1)
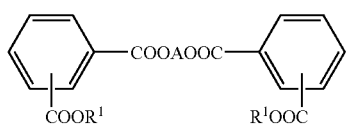

A: —(CH$_2$)$_n$— or —(CH$_2$CH$_2$O)$_n$—
n: Integer of 1-10
R$^1$ An alkyl group having the number of carbon atoms of 1-12, which may be substituted by an alkoxycarbbnyl group Compound-1
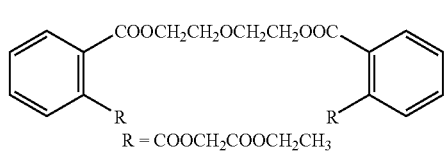
R = COOCH$_2$COOCH$_2$CH$_3$ Compound-2
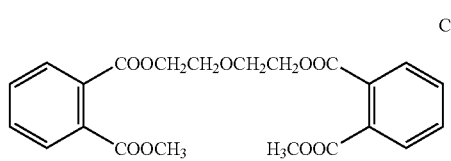

The phthalate type dimer compound is a compound represented by Formula (1), which can be obtained by dehydrating esterification reaction by heating a mixture of two phthalic acids and a di-valent alcohol. The average molecular weight of the phthalate type dimer or the bisphenol type compound having a hydroxyl group at the terminal thereof is preferably 250-3,000, and particularly preferably 300-1,000. When the molecular weight is less than 250, problems are caused in the thermal stability and the volatility and the mobility of the plasticizer. When the molecular weight exceeds 3,000, the compatibility and the plasticizing ability of the plasticizer are lowered and the processing suitability, transparency and the mechanical property of the aliphatic cellulose ester type resin are received bad influences.

As the citrate type plasticizer, acetyltrimethyl citrate, acetyltriethyl citrate and acetyltributyl acetate can be exemplified without any limitation, and the citrate compounds represented by Formula (3) are preferred.

Formula(3)

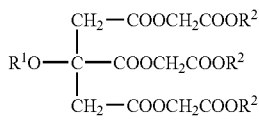

[Where $R^1$ is a hydrogen atom or an aliphatic acyl group, and $R^2$ is an alkyl group.]

In Formula (3), the aliphatic acyl group represented by $R^1$ is preferably one having 1-12, particularly 1-5, carbon atoms though the acyl group is not specifically limited. In concrete, a formyl group, an acetyl group, a propionyl group, a butylyl group, a varelyl group, a parmitoyl group and oleyl group can be exemplified. The alkyl group represented by $R^2$ is not specifically limited and may be one having a straight chain or a branched chain. The alkyl group is preferably one having 1-24, and particularly 1-4, carbon atoms. In concrete, a methyl group, an ethyl group, an n-propyl group, an isopropyl group, an n-butyl group, an isobutyl group, a sec-butyl group and a t-butyl group are exemplified. Particularly, one in which $R^1$ is a hydrogen atom, $R^2$ is a methyl group or an ethyl group, and one in which $R^1$ is an acetylgroup and $R^2$ is a methyl group or an ethyl group are preferable as the plasticizer for the cellulose ester type resin.

<Production of Citrate Compound in which $R^1$ is a Hydrogen Atom>

Among the citrate compounds usable in the present invention, ones in which $R^1$ is a hydrogen atom can be produced by known methods. As the known method, for example, a method described in British Patent No. 931,781 is applicable, in which phthalyl glycdlate is produced from a halfester of phallic acid and an alkyl α-halogenized acetate. In concrete, an amount of larger than the stoichiometric amount, preferably 1-10 moles, and more preferably 2-5 moles of an alkyl monohalogenized acetate corresponding to $R^2$ such as a methyl monochloroacetate trisodium citrate or ethyl monochloroacetate reacts with tripotassium acetate or citric acid, hereinafter referred to as citric acid raw material, preferably 1 mole of trisodium citrate. The presence of water in the reaction system lowers the yield of the objective compound. Therefore, dehydrated material is employed as long as possible. For the reaction, a chain or a cyclic aliphatic tertiary amine such as trimethylamine, triethylamine, tri-n-propylamine, triisopropylamine, tri-n-butylamine and dimethylcyclo-hexylamine can be employed as a catalyst. Among them, triethylamine is preferred. The using amount of the catalyst is 0.01-1.0 moles, preferably 0.2-0.5 moles, per mole of the raw material citric acid. The reaction is performed at a temperature of 60-150° C. for a time of 1-24 hours. A solvent such as toluene, benzene xylene and methylethyl ketone may be employed, though it is not essential. After the reaction, for example, byproducts and the catalyst are removed by adding water, and the oil layer is washed by water. And then the leaving raw compounds are separated by distillation to isolate the objective compound.

<Production of Citrate Compound in which $R^1$ is an Aliphatic Acyl Group>

The citrate compounds of the present invention in which $R^1$ is an aliphatic acyl group and $R^2$ is an alkyl group can be produced by employing the foregoing compound in which $R^1$ is a hydrogen atom. Namely, 1 mole of the citrate compound reacts with 1-10 moles a halogenized acyl compound corresponding to the aliphatic acyi group represented by $R^1$ such as formyl chloride or an acetyl chloride. As a catalyst, 0.1-2 moles of a basic compound such as pyridine can be employed per moles of the citrate compound. The reaction can be performed without any solvent for a time of 1-5 hours at a temperature of 80-100° C. After the reaction, water and a water insoluble organic solvent such as toluene are added to the reacting mixture so that the objective compound is dissolved in the organic solvent, and then the organic solvent layer is separated from the aqueous layer and the organic solvent layer is washed. Thereafter, the objective compound can be isolated by a usual method such as distillation.

The citrate compound employed in the present invention is particularly preferable because occurrences of the chalking and the line-shaped defects in the active radiation hardenable resin layer are inhibited when it is employed in the combinationwith the UV absorbent having a weight average molecular weight of 490-50,000.

The adding amount of the citrate compound to be added to the cellulose resin is preferably 5-200; particularly 10-200, parts by weight per 100 parts by weight of the cellulose resin.

The content of the citrate compound in the film is preferably 1-30%, and particularly 2-20%, by weight.

A glycolate type plasticizer having an aromatic ring or a cycloalkyl ring is employed even though there is no specific limitation on the glycolate type plasticizer. Provided as glycolate type plasticizers are, for example, butylphthalyl glycolate, ethylphthalylethyl glycolate, and methylphthalylethyl glycolate.

As the phosphate type plasticizer, for example, triphenyl phosphate, tricresyl phosphate, cresyl diphenyl phosphate, octyl diphenyl phosphate, diphenyl biphenyl phosphate, trioctyl phosphate and tributyl phosphate are employable, and as the phthalate type plasticizer, for example, diethyl phthalate, dimethoxyethyl phthalate, dimethyl phthalate, dioctyl phthalate, dibutyl phthalate, di-2-ethylhexyl phthalate and dicyclohexyl phthalate are employable. In the present invention, it ispreferable that the content of the phosphate type plasticizer is not more than 40%, and more preferably not more than 1%, by weight of the entire amount of plasticizer. No addition of the phosphate type plasticizer is further preferable.

Ethylene glycol ester type plasticizer: In concrete, this type of plasticizer includes an ethylene glycol ester type plasticizer such as ethylene glycol diacetate and ethylene glycol dibutylate, a ethylene glycol cycloalkyl ester type plasticizer such as ethylene glycol dicyclopropylcarboxylate, ethylene glycol dicyclohexyl-carboxylate, and an ethylene glycol aryl ester plasticizer such as ethylene glycol dibenzoate and ethylene glycol 4-methylbenzoate. In the above compounds, the alkylate group, the cycloalkylate group and the allylate grqup may be the same or different, and may further have a substituent. A mixed ester of the alkylate group, the cycloalkylate group and the allylate group is allowed. These substituents may be bonded with together by a covalent bond. The ethylene glycol moiety may have a substituent, and may be partially or regularly bonded with a polymer in a form of pendant. Moreover, the plasticizer may be included as a partial structure of an additive such as an antioxidant, an acid scavenger and a UV absorbent.

Glycerol ester type plasticizer: In concrete, this type of plasticizer includes a glycerol alkyl ester such as triacetine, tributine, glycerol diacetate caprylate and glycerol oleate propionate, aglycerol cycloalkyl ester such as glycerol tricycropropylpropionate and glycerol tricyclohexylcarboxylate, a glycerol aryl ester such as glycerol tribenzoate and glycerol 4-methylbenzoate, a diglycerol alkyl ester such as diglycerol tetraacetylate, diglycerol tetrapropionate, diglycerol acetate tricaprylate and diglycerol tetralaurate, diglycerol tetracyclobutylcarboxylate and diglycerol tetrapentylcarboxylate, and a diglycerol aryl ester such as diglycerol tetrabenzoate and diglycerol 3-methylbenzoate. In the above compounds, the alkylate group, the cycloalkycarboxylate group and the allylate group may be the same or different, and may further have a substituent. A mixed ester of the alkylate group, the cycloalkylcarboxylate group and the allylate group is allowed. These substituents may be bonded with together by a covalent bond. The ethylene glycol moiety may have a substituent, and may be partially or regularly bonded with a polymer in a form of pendant. Moreover, the plasticizer may be included as a partial structure of an additive such as an antioxidant, an acid scavenger and a UV absorbent.

Dicarboxylate type plasticizer: In concrete, this type of plasticizer includes an alkyl alkyldicarboxylate type plasticizer such as dodecyl marinate (C1), dioctyl adipate (C4) and dibutyl sebacate (C8), a cycloalkyl alkyldicarboxylate type plasticizer such as dicyclopentyl succinate and cyclohexyl adipate, an aryl alkyldicarboxylate plasticizer such as diphenyl succinate and di-4-methylphenyl glutamate, an alkyl cycloalkyldicarboxylate such as Dihexyl 1,4-cyclohexanedicarboxylate and decyl bicyclo[2.2.1]heptane-2,3-dicarboxylate, a cycloalkyl cycloalkyldicarboxylate type plasticizer such as dicyclohexyl 1,2-cyclobutanedicarboxylate and dicyclopropyl 1,2-cyclohexyldicarboxylate, an aryl cycloalkyldicarboxylate type plasticizer such as diphenyl 1,1-cyclopropyl-dicarboxylate and di-2-naphthyl 1,4-cyclohexanedicarboxylate, an alkyl aryldicarboxylate type plasticizer such as diethyl phthalate, dimethyl phthalate, dioctyl phthalate, dibutyl phthalate and di-2-ethylhexyl phthalate, a cycloalkyl aryldicarboxylate type plasticizer such as dicyclopropyl phthalate and dicyclohexyl phthalate, and an aryl aryldicarboxylate type plasticizer such as diphenyl phthalate and di-4-methylphenyl phthalate. In the above compounds, the alkoxy group and the cycloalkoxy group may be the same or different, and may have a substituent and the substituent may further have a substituent. A mixed ester of the alkoxy group and the cycloalkoxy group is allowed. These substituents may be bonded with together by a covalent bond. The aromatic ring of phthalic acid may have a substituent, and may be a polymer such as a dimer, trimer and a tetramer. A part of the phthalate may be partially or regularly bonded with a polymer in a form of pendant. Moreover, the phthalate may be included as a partial structure of an additive such as an antioxidant, an acid scavenger and a UV absorbent.

Polyvalent-carboxylate type plasticizer: In concrete, this type of plasticizer includes an alkyl alkylpolycarboxylate type plasticizer such as tridodecyl tricabalate and tributyl meso-butane-1,2,3,4-tetre carboxylate, a cycloalkyl alkylpolycarboxylate type plasticizer such as tricyclohexyl tricarbalate, tricyclopropyl 2-hydroxy-1,2,3-propane-tricarboxylate, an aryl alkylpolycarboxylate type plasticizer such as triphenyl 2-hydroxy-1,2,3-propanetricarboxylate and tetra-3-methylphenyl tetrahydrofuran-2,3,4,5-tetracarboxylate, an alkyl cycloalkylpolycarboxylate type plasticizer such as tetrahexyl 1,2,3,4-cyclobutane-teracarboxylate and tetrabutyl 1,2,3,4-cyclopentane-tetracarboxylate, a cycloalkyl cycloalkylpolycarboxylate type plasticizer such as tetracyclopropyl 1,2,3,4-cyclobutane-tetracarboxylate and tricyclohexyl 1,3,5-cyclohexyl-tricarboxylate, an aryl cycloalkylpolycarboxylate and hexa-4-methylphenyl 1,2,3,4,5,6-cyclohexylhexacarboxylate, an alkyl arylpolycarboxylate type plasticizer such as tridodecyl benznene-1,2,4-tricarboxylate and tetraoctyl benzene-1,2,4,5-tetracarboxylate, a cycloalkyl arylpolycarboxylate type plasticizer such as tricyclopentyl benzne-1,3,50tricarboxylate and tetracyclohexyl benzene-1,2,3,5-tetracarboxylate, and a aryl arylpolycarboxylate type plasticizer such as triphenyl benzene-1,3,5-tetracarboxylate and hexa-4-methylphenyl benzene 1,2,3,4,5,6-hexacarboxylate. In the above compounds, the alkoxy group and the cycloalkoxy group may be the same or different, and may have a substituent and the substituent may further have a substituent. A mixed ester of the alkoxy group and the cycloalkoxy group is allowed. These substituents may be bonded with together by a covalent bond. The aromatic ring of phthalic acid may have a substituent, and may be a polymer such as a dimer, trimer and a tetramer. A part of the phthalate may be partially or regularly bonded with a polymer in a form of pendant. Moreover, the phthalate may be included as a partial structure of an additive such as an antioxidant, an acid scavenger and a UV absorbent.

Polymer plasticizer: In concrete, this type of plasticizer includes an aliphatic hydrocarbon type polymer, an alicyclic hydrocarbon type polymer, an acryl type polymer such as poly(ethyl acrylate) and poly(methyl methacrylate), a vinyl type polymer such as poly(vinyl isobutyl ether) and poly(N-vinylpyrrolidone), a styrene type polymer such as polystyrene and poly(4-hydroxystyrene), a polyeater such as poly(butylene succinate), poly(ethylene terephthalate) and poly(ethylene naphthalate), a polyether such as poly(ethylene oxide) and poly(propylene oxide), polyamide, polyurethane and polyurea. The preferable number average molecular weight of these compounds is approximately from 1,000 to 500,000, and particularly from 5,000 to 200,000. The molecular weight of less than 1,000 causes a problem in the volatility, and that of more than 500,000 causes degradation in the plasticizing ability and bad influences are appeared in the mechanical properties of the cellulose ester derivative composition. These polymer plasticizers may be either a homopolymer composed of one kind of repeating unit or a copolymer having plural kinds of repeating unit. Two or more kinds of the polymer may be employed in combination and another additive such as another plasticizer, an antioxidant, an acid scavenger, a UV absorbent, a slipping agent and a matting agent may be contained.

These plasticizers may be employed solely or in combination of two or more kinds thereof. The total content of the plasticizer in the film of less than 1% by weight is not preferable because the moisture permeability lowering effect becomes insufficient, and that of more than 30% by weight tends to cause problems in the compatibility and the bleeding out and the degradation in the physical property of the film. Therefore, the content is preferably 1-30%, more preferably 3-25%, and particularly preferably 5-20%, by weight. However, the addition amount is the total amount of an acrylic polymer and a polymer obtained via polymerization of an ethylenic unsaturated monomer in the present invention, and the amount is appropriately determined from the aspect of the effects of the present invention.

(UV Absorbent)

The UV absorbent relating to the present invention is a UV absorbent having a weight average molecular weight of 490-50,000, and preferably a compound having at least two benzotriazole skeletons as the UV absorbing skeleton. It is preferable that the UV absorbent contains a compound having a weight average molecular weight of 490-2,000 and a compound having a weight average molecular weight of 2,000-50,000.

The UV absorbent relating to the present invention is described in detail below.

As the UV absorbent, ones excellent in the absorbing ability for UV rays of wavelength of less than 370 nm and having low absorption for visible rays of not less than 400 nm are preferable from the viewpoint of the degradation prevention of the polarizing plate and the displaying apparatus caused by UV rays, and from the viewpoint of displaying ability of the liquid crystal. For example, an oxybenzophenone type compound, a benzotriazole type compound, a salicylate type compound, a benzophenone type compound, a cyanoactylate type compound, a triazine type compound and a nickel complex type compound are employable. The UV absorbents described in Japanese Patent O.P.I. Publication No. 10-182621 and Japanese Patent O.P.I. Publication No. 8-337574 and the polymer UV absorbents described in Japanese Patent O.P.I. Publication No. 6-148430 are also employable.

Among these UV absorbents, ones having a weight average molecular weight within the range of 490-50,000 is necessary for displaying the effects of the present invention. When the weight average molecular weight is less than 490, the UV absorbent tend to be oozed out from the film surface and the film tends to be colored accompanied with aging, though the UV absorbent of the molecular weight of not more than 490 is usually employed. When the weight average molecular weight exceeds 50,000, the compatibility of the UV absorbent with the resin of the film tends to be considerably lowered.

It is also preferable embodiment that the UV absorbent relating to the present invention contains UV absorbent (A) having a weight average molecular weight of from 490 to 2,00 and UV absorbent (B) having a weight average molecular weight of from 2,000 to 50,000. The mixing ratio of UV absorbent (A) to (B) is suitably selected from the range of from 1:99 to 99:1.

Example of the UV absorbent having a weight average molecular weight being within the range of the present invention and having at least two benzotriazole skeletons is preferably a benzotriazolephenol compound represented by the following Formula (4).

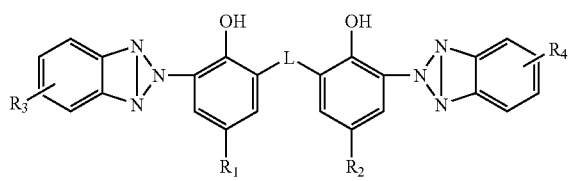

Formula (4)

In Formula (4), $R_1$ and $R_2$ are each a hydrogen atom or a substituted or unsubstituted alkyl group having 1 to 20 carbon atoms, and $R_3$ and $R_4$ are each a hydrogen atom, a halogen atom or an alkylene group having 1 to 4 carbon atoms. Examples of the atom or group of the substituent of the alkyl group include a halogen atom such as a chlorine atom, a bromine atom and a fluorine atom, a hydroxyl group, a phenyl group which may be substituted with an alkyl group of a halogen atom.

Concrete examples of the bisbenzotriazolephenol compound represented by Formula (4) are as follows, but the compound is not limited to the followings.

1) RUVA-100/110 manufactured by Ootsuka Kagaku Co., Ltd.
2.) RUVA-206 manufactured by Ootsuka Kagaku Co., Ltd.
3) Tinuvin-360 manufactured by Ciba Specialty Chemicals Co., Ltd.
4) Adecastab LA-31 manufactured by Asahi Denka Co., Ltd.
5) Adecastab LA-31RG manufactured by Asahi Denka Co., Ltd.

Moreover, it is preferable that at least one of the UV absorbents is a copolymer of a UV absorbing monomer having a molar absorption coefficient of not less than 4,000 at 380 nm and an ethylenic unsaturated monomer, and the ethylenic unsaturated monomer having a hydrophilic group.

According to the present invention, the optical film, in which the foregoing problems are solved, can be obtained by that the film contains the UV absorbing copolymer which is the copolymer of the UV absorbing monomer having a molar absorption coefficient of not less than 4,000 at 380 nm and the ethylenic unsaturated monomer and has a weight average molecular weight of 490-50,000.

When the molar absorption coefficient is not less than 4,000, the UV absorbing ability is suitable and satisfactory UV cutting effect can be obtained. Therefore, the problem of yellow coloring of the optical compensating film itself is solved and the transparency of the film is improved.

The monomer to be employed for the UV absorbing copolymer in the present invention preferably has a molar absorption coefficient at 380 nm of not less than 4,000, more preferably not less than 8,000, and further preferably not less than 10,000. When the molar absorption coefficient at 380 nm is less than 4,000, a large adding amount of the UV absorbent is necessary for obtaining the desired UV absorbing ability so that the transparency of the film is considerably lowered by increasing in the haze or precipitation of the UV absorbent and the strength of the film is lowered.

The ratio of the absorbing coefficient at 380 nm to that at 400 nm of the UV absorbing monomer to be employed for the UV absorbing copolymer is preferably not less than 20.

In the present invention, it is preferable that the monomer having the UV absorbing ability as higher as possible is contained in the UV absorbing copolymer for inhibiting the light absorption at 400 nm near the visible region and obtaining the required UV absorbing ability.

a. UV Absorbing Monomer

The UV absorbing monomer (UV absorbent) preferably has a molar absorption coefficient at 380 nm of less than 4,000, and a ratio of the absorption coefficient at 380 nm to that at 400 nm is not less than 20.

As the UV absorbing monomer, the following compounds have been known, for example, a salicylic acid type UV absorbent such as phenyl salicylate and p-tert-butyl salicylate, a benzophenone type UV absorbent such as 2,4-dihydroxybenzophenone and 2,2'-dihydroxy-4,4'-dimethoxybenzophenone, a benzotriazole type UV absorbent such as 2-(2'-hydroxy-3'-tert-butyo-5'-methylphenyl)-5-chlorobenzotriazole, 2-(2'-hydroxy-3',5'-di-tert-butylphenyl-5-chlorobenzotriazole and 2-(2'-hydroxy-3',5'-di-tert-amylphenyl-benzotriazole, a dicyanoacrylate type UV absorbent such as 2'-ethylhexyl-2-cyano-3,3-diphenyl acrylate and ethyl-2-cyano-3-(3',4'-methylenedioxyphenyl)acrylate, a triazine type UV absorbent such as 2-(2'-hydroxy-4'-hexyloxyphenyl)-4,6-diphenyltriazine and the compounds described in Japanese Patent O.P.I. Publication Nos. 58-185677 and 59-149350.

It is preferable in the present invention that basic skeletons are suitable selected from the foregoing various types of UV absorbent, and a substituent having an ethylenic unsaturated bond is introduced in each of the skeletons for forming polymerizable compounds, and then ones having a absorption coefficient of not less than 4,000 at 380 nm are selected from the resultant compounds. In the present invention, the benzotriazole type compounds are preferable for the UV absorbing monomer from the viewpoint of the storage stability. Particularly preferable UV absorbing monomer is ones represented by the following Formula (5).

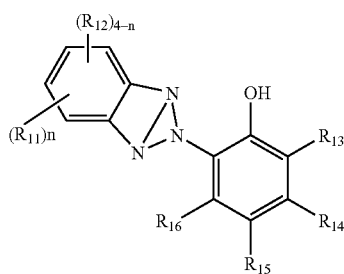

Formula (5)

In Formula (5), the substituents represented by $R_{11}$ through $R_{16}$ each may have a substituent except that a specific limitation is applied.

In Formula (5), one of groups represented by $R_{11}$ through $R_{16}$ has the above-described polymerizable group as a partial structure.

In the above formula, L is a di-valent bonding group or a simple bonding hand, and $R_1$ a hydrogen atom or an alkyl group. $R_1$ is preferably a hydrogen atom or an alkyl group having 1 to 4 carbon atoms. Though the group containing the foregoing polymerizable group may be any one of the groups represented by $R_{11}$ through $R_{16}$, the group represented-by $R_{11}$, $R_{13}$, $R_{14}$ or $R_{15}$ is preferable, and the group represented by $R_{14}$ is particularly preferable.

In Formula (5), $R_{11}$ is a halogen atom, an oxygen atom, a nitrogen atom or a group substituting on the benzene ring through a sulfur atom. As the halogen atom, a fluorine atom, a chlorine atom and a bromine atom are applicable, and the chlorine atom is preferable.

Examples of the group substituting on the benzene ring through an oxygen atom include a hydroxyl group, an alkoxy group such as a methoxy group, an ethoxy group, a t-butoxy group and a 2-ethoxyethoxy group, an aryloxy group such as a phenoxy group, a 2,4-di-t-amylphenoxy group and a 4-(4-hydroxyphenyl-sulfonyl)phenoxy group, a heterocycloxy group such as a 4-pyridyloxy group and 2-hexahydropyrranyloxy group, a carbonyloxy group, for example, an alkylcarbonyloxy group such as an acetyloxy group, a trifluoroacetyloxy group and a pivaloyloxy group, and an arylcarbonyloxy group such as a benzoyloxy group and a pentafluorobenzoyloxy group, a urethane group, for example, an alkylurethane group such as an N-dimethyluretane, and an arylurethane group such as an N-phenylurethane and an N-(p-cyanophenyl)urethane group, a sulfoxy group, for example, an alkylsulfoxy group such as a methanesulfonyloxy group, a trifluoromethanesulfonyloxy group an n-dodecanesulfonyloxy group, and an arylsulfonyloxy group such as a bebzenesulfonyloxy group and a p-toluenesulfonyloxy group. An alkoxy group having 1-6 carbon atoms is preferable and an alkyl group having 2-4 carbon atoms is particularly preferable.

Examples of the group substituting on the benzene ring through a nitrogen atom include a nitro group, an amino group, for example, an alkylamino group such as a dimethylamino group, a cyclohexylamino group and an n-dodecylamino group, and an arylamino group such as an anilino group and p-t-octylanilino group, a sulfonylamino group, for example, an alkylsuofonylamino group such as a methanesulfonylamino group, a heptafluoropropanesulfonylamino group and a hexadecylsulfonylamino group, and an arylsulfonylamino group such as a p-toluenesulfonylamino group and a pentafluorobenzenesulfonylamino group, a sulfamoylamino group, for example, an alkylsulfamoylamino group such as an N,N-dimethylsulfamoylamino group, and an arylsulfamoylamino group such as an N-phenylsulfamoylamino group, anacylamino group, for example, an alkylcarbonylamino group such as an acetylamino group and a myristoylamino group, and an arylcarbonylamino group such as a benzoylamino group, and a ureido group, for example, an alkylureido group such as an N,N-dimethylaminoureido group, and an arylureido group such as an N-phenylureido group and an N-(p-cyanophenyl)ureido cyanophenyl)ureido group. Among them, the aminoacyl group is preferable.

Examples of the group substituting on the benzene ring through a sulfur atom include an alkylthio group such as a methylthio group and t-octylthio group, an arylthio group such as a phenylthio group, a heterocyclic-thio group such as a 1-phenylterazole-5-thio group and a 5-methyl-1,3,4-oxadiazole-2-thio group, a sulfinyl group, for example, an alkylsulfinyl group such as a methanesulfinyl group and a trifludromethanesulfinyl group, and an arylsulfinyl group such as a p-toluenesulfinyl group, a sulfamoyl group, for example, an alkylsulfamoyl group such as a dimethylsulfamoyl group and a 4-(2,4-di-t-amylphenoxy)butylaminosulfamoyl group, and an arylsulfamoyl group such as a phenylsulfamoyl group. The sulfinyl group is preferable and an alkylsulfinyl group having 4 to 12 carbon atoms is particularly preferable.

In Formula (5), n is an integer of 1-4, and preferably 1 or 2. When n is 2 or more, plural groups represented by $R_{11}$ may be the same as or different from each other. Though the substituting position of the substituent represented by $R_{11}$ is not specifically limited, 4- or 5-position is preferable.

In Formula (5), $R_{12}$ is a hydrogen atom or an aliphatic group such as an alkyl group, an alkenyl group and an alkynyl group, an aromatic group such as a phenyl group and a p-chlorophenyl group, or a heterocyclic group such as a 2-tetrahydrofuryl group, a 2-thiophenyl group, a 4-imidazolyl group, an indoline-1-yl group and a 2-pyridyl group. $R_{12}$ is preferably a hydrogen atom or an alkyl group.

In Formula (5), $R_{13}$ is a hydrogen atom, an aliphatic group, an aromatic group or a heterocyclic group. $R_{13}$ is preferably a hydrogen atom or an alkyl group having 1 to 12 carbon atoms, or a branched alkyl group such as an i-propyl group, a t-butyl group and a t-amyl group is preferable, which is excellent in the durability.

In Formula (5), $R_{14}$ is an oxygen atom or a group substituting on the benzene ring through an oxygen atom or a nitrogen atom, concretely a group the same as that the group substituting on the benzene ring through an oxygen atom or a nitrogen atom represented by $R_{11}$. $R_{14}$ is preferably an acylamino group or an alkoxy group.

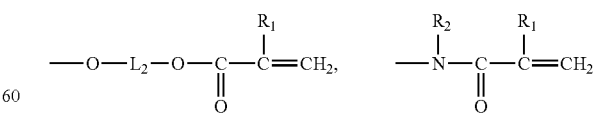

When the polymerizable group is contained in $R_{14}$ as a partial structure, $R_{14}$ is preferably the above.

In the above formula, $L_2$ is an alkylene group having 1-12 carbon atoms, and preferably a strait-chain alkylene group having 3-6 carbon atoms, branched-chain or cyclic alkylene group. $R_1$ is a hydrogen atom or a methyl group, $R_2$ is an alkyl group having 1-12, preferably 2-6, carbon atoms.

In Formula (5), $R_{15}$ is a hydrogen atom, an aliphatic group, an aromatic group or a heterocyclic group. $R_{15}$ is preferably a hydrogen atom or an alkyl group having 1 to 12 carbon atoms, and particularly preferably a branched-chain alkyl group such as an i-propyl group, a t-butyl group and a t-amyl group.

In formula (5), $R_{16}$ is a hydrogen atom, an aliphatic group, an aromatic group or a heterocyclic group, and preferably a hydrogen atom.

Examples of UV absorbing monomer preferably employable in the present invention are listed below, but the monomer is not limited to the examples.

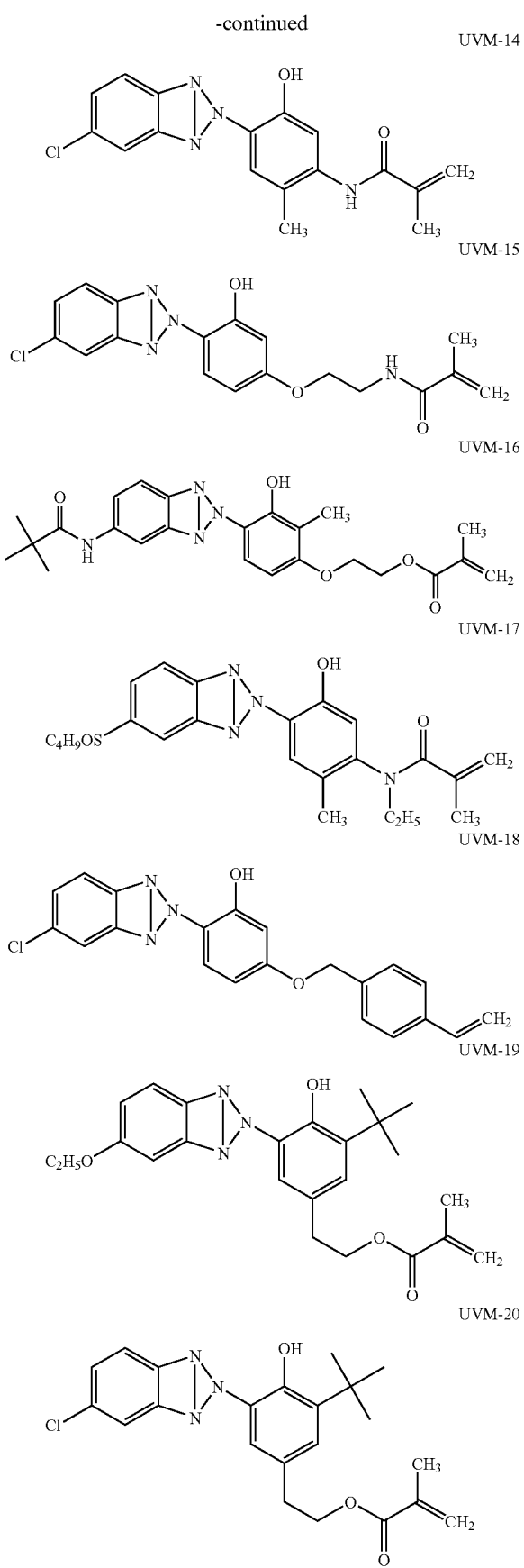

b. Description of Polymner

The UV absorbing polymer to be employed in the present invention is a copolymer of the UV absorbing monomer and the ethylenic unsaturated monomer, which is characterized in that the weight average molecular weight is within the range of 490-50,000.

The haze is reduced by the use of the UV absorbent in the state of copolymer and the optical film excellent in the transparency can be obtained. In the present invention, the weight average molecular weight of the copolymer is within the range of 490-50,000, preferably 2,000-20,000, and more preferably 7,000-15,000. When the weight average molecular weight is less than 940, the copolymer tends to be oozed out on the film surface and colored during the passing of time. When the weight average molecular weight is more than 50,000, the compatibility of the copolymer with the resin tends to be lowered.

Examples of the ethylenic unsaturated monomer capable of copolymerizing with the UV absorbing monomer include methacrylic acid and a ester thereof such as methyl methacrylate, ethyl methacrylate, propyl methacrylate, butyl methacrylate, i-butyl methacrylate, t-butyl methacrylate, octyl methacrylate, cyclohexyl methacrylate, 2-hydroxyhexyl methacrylate, 2-hydroxypropyl methacrylate, tetrahydroxyfurfuryl methacrylate, benzyl methacrylate, dimethylaminoethyl methacrylate and diethylaminoethyl methacrylate, and acrylic acid and an ester thereof such as methyl acrylate, ethyl acrylate, propyl acrylate, butyl acrylate, i-butyl acrylate, t-butyl acrylate, octyl acrylate, cyclohexyl acrylate, 2-hydroxyethyl acrylate, 2-hydroxypropyl acrylate, tetrahydrofurfuryl acrylate, 2-ethoxyethyl acrylate, Diethylene glycol ethoxylate acrylate, 3-methoxybutyl acrylate, benzyl acrylate and dimethylaminoethyl acrylate, an alkyl vinyl ether such as methyl vinyl ether, ethyl vinyl ether and butyl vinyl ether, an alkyl vinyl ester such as vinyl formate, vinyl butylate, vinyl capronate and vinyl stearate, acrylonitrile, vinyl chloride and styrene.

Among the ethylenic unsaturated monomers, an acrylate and a methacrylat& each having a hydroxyl group or an ether bond such as 2-hydroxyethyl methacrylate, 2-hydroxypropyl methacrylate, tetrahydrofurfuryl methacrylate, 2-hydroxyethyl acrylate, 2-hydroxypropyl acrylate, tetrahydrofurfuryl acrylate, 2-ethoxyethyl acrylate, diethylene glycol ethoxylate acrylate and 3-methoxybutyl acrylate are preferable. These monomers can be copolymerized solely or in combination with the UV absorbing monomer.

The ratio of the UV absorbing monomer to the copolymerizable ethylenic unsaturated monomer is determined considering the compatibility of the formed copolymer with the transparent resin, the influence on the transparency and the mechanical strength of the optical film. It is preferably to combine them so that the copolymer contains 20-70%, more preferably 30-60%, by weight of the UV absorbent monomer. When the content of the UV absorbing monomer is less than 20% by weight, a large adding amount of the UV absorbent is necessary for obtaining desired UV absorbing ability so that the transparency of the film is considerably lowered by increasing in the haze or precipitation pf the UV absorbent and the strength of the filmtends to be lowered. When the content of the UV absorbing monomer is more than 70% by weight, the compatibility with the transparent resin tends to lowered and the production efficiency of the film is degraded.

c. Description of Polymerization Method

In the present invention, the method for polymerizing the UV absorbing copolymer is not specifically limited and known methods such as radical polymerization, anion polymerization and cation polymerization can be widely applied. As the initiator for the radical polymerization, an azo compound and a peroxide compound such as azobisisobutylnitrile (AIBN), a diester of azobisisobutylic acid and benzoyl peroxide, are employable. The solvent for polymerization is not specifically limited, and examples of usable solvent include an aromatic hydrocarbon type solvent such as toluene and chlorobenzene, a halogenized hydrocarbon type solvent such as dichloroethane and chloroform, a an ether type solvent such as tetrahydrofuran and dioxane, an amide type solvent such as dimethylformamide, an alcohol type solvent such as methanol, an ester type solvent such as methyl acetate and ethyl acetate, a ketone type solvent such as acetone, cyclohexanone and methyl ethyl ketone, and an aqueous solvent. Solution polymerization in which the polymerization is carried out in a uniform system, precipitation polymerization in which the formed polymer is precipitated and emulsion polymerization in which the polymerization is carried out in a micelle state are also performed according to selection of the solvent.

The weight average molecular weight of the UV absorbing copolymer can be controlled by known molecular weight controlling methods. For controlling the molecular weight, for example, a method can be applied in which adding a chain transfer agent such as carbon terachloride, laurylmercptane and octyl thioglycolate is employed. The polymerization is usually performed at a temperature of from a room temperature to 130° C., and preferably 50-100° C.

The UV absorbing copolymer is mixed with the transparence resin constituting the optical film preferably in a ratio of 0.01-20%, more preferably 0.1-10%, by weight. On this occasion, the mixing ratio is not limited when the haze is not more than 0.5; the haze is preferably not more than 0.2. It is more preferable that formed optical film has a haze of not more than 0.2 the transparency at 380 nm of not more than 10%.

Moreover, it is also preferable that at least one of the UV absorbents contains a polymer derived from a UV absorbing monomer represented by Formula (6).

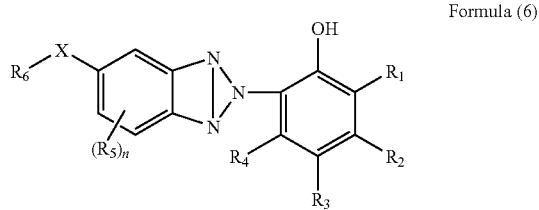

Formula (6)

In the above formula, n is an integer of 0-3, $R_1$ through $R_5$ are each a hydrogen atom, a halogen atom or a substituent, X is a —COO— group, a —CONR$_7$— group or an —NR$_7$CO— group, $R_6$ is a hydrogen atom, an alkyl group or an aryl group, and $R_7$ is a hydrogen atom, an alkyl group or an aryl group, provided that the group represented by $R_6$ has a polymerizable group as a partial structure. In Formula (6), when n is 2 or more, plural groups represented by $R_5$ may be the same as or different from each other and may be bonded together with to form a 5- through 7-member ring.

$R_1$ through $R_5$ are each a hydrogen atom, a halogen atom or a substituent. Examples of the halogen atom include a fluorine atom, a chlorine atom, a bromine atom and an iodine atom, and preferably the fluorine atom and the chlorine atom. Examples of the substituent include an alkyl group such as a methyl group, an ethyl group, an isopropyl group, a hydroxyethyl group, a methoxymethyl group, a trifluoromethyl group and a t-butyl group, an alkenyl group such as a vinyl group, an allyl group and a 3-butene-1-yl group, an aryl group such as a phenyl group, a naphthyl group, a p-tolyl group and a p-chlorophenyl group, a heterocyclic group such as a pyridyl group, a benzimidazolyl group, a benzothiazolyl group and a benzoxazolyl group, an alkoxy group such as a methoxy group, an ethoxy group, an isopropoxy group and an n-butoxy group, an aryloxy group such as a phenoxy group, a heteocycloky group such as a 1-phenyltetrazole-5-oxy group, a 2-tetrahydropyranyloxy group, an acyloxy group such as an acetoxy group, pivaloyloxy group and a benzoyloxy group, an acyl group such as an acetyl group, an isopropanoyl group and a butyloyl group, an alkoxycarbonyl group such as a methoxycarbonyl group and an ethoxycarbonyl group, an aryloxycarbonyl group such as a phenoxycarbonyl group, a carbamoyl group such as a methylcarbamoyl group, an ethylcarbamoyl group and a dimethylcarbamoyl group, an amino group, an alkylamino group such as a methylamino group, an ethylamino group and a diethylamino group, an anilino group such as an anilino group and an N-methylanilino group, an acylamino group such as an acetylamino group and a propionylamino group, a hydroxyl group, a cyano group, a nitro group, a sulfonamido group such as a methanesulfonamido group and a benzenesulfonamido group, a sulfamoylamino group such as a dimethylsulfamoylamino group, a sulfonyl group such as a methanesulfonyl group, a butanesulfonyl group and a phenylsulfonyl group, a sulfamoyl group such as an ethylsulfamoyl group and dimethylsulfamoyl group, a sulfonylamino group such as a methanesulfonylamino group and a benzenesulfonylamino group, a ureido group such as a 3-methylureido group, a 3,3-dimethylureido group and a 1,3-dimethylureido, an imido group such as a phthalimido group, a silyl group such as a trimethylsilyl group, a triethylsilyl group and t-butyldimethylsilyl group, an alkylthio group such as a methylthio group, an ethylthio group and an n-butylthio group, an arylthio group such as a phenylthio group, and the alkyl group andaryl group are preferable.

In Formula (6), the.groups represented by $R_1$ through $R_5$ each may have a substituent when the group can be substituted, and adjacent $R_1$ through $R_4$ may be bonded to for a 5- to 7-member ring.

$R_6$ is a hydrogen atom, an alkyl group, an alkenyl group, an alkynyl group, an aryl group.or a heterocyclic group. The alkyl group is, for example, a methyl group, an ethyl group, a propyl group, an isopropyl group, an n-butyl group, an isobutyl group, a t-butyl group, an amyl group, an isoamyl group and a hexyl group. The alkyl group may further have a halogen atom or a substituent. The halogen atom is, for example, a fluorine atom, a chlorine atom, a bromine atom and an iodine atom. Examples of the substituent include an aryl group such as a phenyl group, a naphthyl group, a p-tolyl group and a p-chlorophenyl group, an acyl group such as an acetyl group, a propanoyl group and butyloyl group, an alkoxy group such as a methoxy group, an ethoxy group, an isopropoxy group and an n-butoxy group, an aryloxy group such as a phenoxy group, an amino group, an alkylamino group such as a methylamino group, an ethylamino group and a diethylamino group, an anilino group such as an anilino group and an N-methylanilino group, an acylamino group such as an acetylamino group and a propionylamino group, a hydroxyl group, a cyano group, a carbamoyl group such as a methylcarbamoyl group, an ethylcarbamoyl group and a dimethylcarbamoyl group, an acyloxy group such as an acetoxy group, a pivaloyloxy group and a benzoyloxy group, an alkoxycarbonyl group such as a methoxycarbamoyl group and ethoxycarbonyl group, and an aryloxycarbonyl group such as phenoxycarbonyl group.

As the cycloalkyl group, a saturated cyclic hydrocarbon group such as a cyclopentyl group, a cyclohexyl group, a norbornyl group and adamantyl group can be exemplified. Such the groups may be unsubstituted or substituted.

Examples of the alkenyl group include a.vinyl group, an allyl group, a 1-methyl-2-propenyl group, a 3-butenyl group, a 2-butenyl group, a 3-methyl-2-butenyl group and an oreyl group, and the vinyl group, and the 1-methyl-2-propenyl group is preferable.

Examples of the alkynyl group include an ethynyl group, a butynyl group, a phenylethynyl group, a propalgyl group, a 1-methyl-2-propynyl group, a 2-butynyl group and a 1,1-dimethyl-2-propynyl group, and the ethynyl group and the propalgyl group are preferable.

Examples of the aryl group include a phenyl group, a naphthyl group and an anthranyl group. The aryl group may have a halogen atom or a substituent. As the halogen atom, a fluorine atom, a chlorine atom, a bromine atom and an iodine atom can be exemplified. Examples of the substituent include an alkyl group such as a methyl group, an ethyl group, an isopropyl group, a hydroxyethyl group, a methoxymethyl group, a trifluoromethyl group and a t-butyl group, an acyl group such as an acetyl group, a propanoyl group and a butyloyl group, an alkoxy group such as a methoxy group, an ethoxy group, an isopropoxy group and an n-butoxy group, an aryloxy group such as a phenoxy group, an amino group, an alkylamino group such as a methylamino group, an ethylamiho group and a diethylamino group, an anilino group such as an anilino group and an N-methylamino group, an acylamino group such as an acetylamino group and a propionyl amino group, a hydroxyl group, a cyano group, a carbamoyl group such as a methylcarbamoyl group, an ethylcarbamoyl group and a dimethylcarbamoyl group, an acyloxy group such as an acetoxy group, a pivaloyloxy group and a benzoyloxy group, an alkoxycarbonyl group such as a methoxycarbonyl group and an ethoxycarbonyl group, and an aryloxycarbonyl group such as a phenoxycarbonyl group.

As the heterocyclic group, a pyridyl group, a benzimidazolyl group, a benzothiazolyl group and a benzoxazolyl group can be exemplified. $R_6$ is preferably the alkyl group.

In Formula (6), X is a —COO— group, a —CONR$_7$— group, a —OCO— group or an —NR$_7$CO— group.

$R_7$ is a hydrogen atom, an alkyl group, a cycloalkyl group an aryl group or a heterocyclic group. The alkyl group is, for example, a methyl group, an ethyl group, a propyl group, an isopropyl group, an n-butyl group, an isobutyl group, a t-butyl group, an amyl group, an isoamyl group or a hexyl group. The alkyl group may further have a halogen atom or a substituent. The halogen atom is, for example, a fluorine atom, a chlorine atom, a bromine atom or an iodine atom. Examples of the substituent include an aryl group such as a phenyl group, a naphthyl group, a p-tolyl group and a p-chlorophenyl group, an acyl group such as an acetyl group, a propanoyl group and butyloyl group, an alkoxy group such as a methoxy group, an ethoxy group, an isopropoxy group and an n-butoxy group, an aryloxy group such as a phenoxy group, an amino group, an alkylamino group such as a methylamino group, an ethylamino group and a diethylamino group, an anilino group such as an anilino group and an N-methylanilino group, an acylamino group such as an acetylamino group and a propionylamino group, a hydroxyl group, a cyano group, a carbamoyl group such as a methylcarbamoyl group, an ethylcarbamoyl group and a dimethylcarbamoyl group, an acyloxy group suchas an acetoxy group, a pivaloyloxy group and a benzoyloxy group, an alkoxycarbonyl group such as a methoxycarbamoyl group and ethoxycarbonyl group, and an aryloxycarbonyl group such as phenoxycarbonyl group.

As the cycloalkyl group, a saturated cyclic hydrocarbon group such as a cyclopentyl group, a cyclohexyl group, a norbornyl group and adamantyl group can be exemplified. Such the groups may be unsubstituted or substituted.

Examples of the aryl group include a phenyl group, a naphthyl group and an anthranyl group. The aryl group may further have a halogen atom or a substituent. As the halogen atom, a fluorine atom, a chlorine atom, a bromine atom and an iodine atom can be exemplified. Examples of the substituent include an alkyl group such as a methyl group, an ethyl group, an isopropyl group, a hydroxyethyl group, a methoxymethyl group, a trifluoromethyl group and a t-butyl group, an acyl group such as an acetyl group, a propanoyl group and a butyloyl group, an alkoxy group such as a methoxy group, an ethoxy group, an isopropoxy group and an n-butoxy group, an aryloxy group such as a phenoxy group, an amino group, an alkylamino group such as a methylamino group, an ethylamino group and adiethylamino group, an anilino group such as an anilino group and an N-methylamino group, an acylamino group such as an acetylamino group and a propionylamino group, a hydroxyl group, a cyano group, a carbamoyl group such as a methylcarbamoyl group, an ethylcarbamoyl group and a dimethylcarbamoyl group, an acyloxy group such as an acetoxy group, a pivaloyloxy group and a benzoyloxy group, an alkoxycarbonyl group such as a methoxycarbonyl group and an ethoxycarbonyl group, and an aryloxycarbonyl group such as a phenoxycarbonyl group.

As the heterocyclic group, a pyridyl group, a benzimidazolyl group, a benzothiazolyl group and a benzoxazolyl group can be exemplified. $R_7$ is preferably the hydrogen atom.

In the present invention, the polymerizable group is a unsaturated ethylenic polymerizable group or a di-functional condensation-polymerizable group, and preferably the unsaturated ethylenic polymerizable group. Concrete examples of the unsaturated ethylenic polymerizable group include a vinyl group, an allyl group, an acryloyl group, a methacryloyl group, a styryl group, an acrylamido group, a methacrylamido group, a vinyl cyanide group, a 2-cyanoacryloxy group, a 1,2-epoxy group, a vinylbenzyl group and a vinyl ether group and preferably the vinyl group, the acryloyl group, the methacryloyl group, the acrylamido group and the methacrylamido group. The UV absorbing monomer having the polymerizable group as the partial structure thereof is the monomer in which the polymerizable group is bonded directly or through two or more bonding groups to the UV absorbent, for example an alkylene group such as a methylene group, a 1,2-ethylene group, a 1,3-propylene group, a 1,4-butylene group and a cyclohexane-1,4-diyl group, an alkenylene group such as an ethane-1,2-diyl group and a butadiene-1,4-diyl group, an alkynylene group such as a etyne-1,2-diyl group, a butane-1,3-diine-1,4-diyl, a bonding group derived from a compound including an aromatic group such as a substituted or unsubstituted benzene, a condensed polycyclic hydrocarbon, an aromatic heterocyclic rings, a combination of aromatic hydrocarbon rings and a combination of aromatic heterocyclic rings, and bonding by a hetero atom such as an oxygen atom, a sulfur atom, a nitrogen atom, a silicon atom and a phosphor atom. The bonding group is preferably the alkylene group and the bonding by the hetero atom. These bonding groups may be combined for forming a composite bonding group. The weight average molecular weight of the polymer derived from the UV absorbing monomer is 2,000-30,000, and preferably 5,000-20,000.

The weight average molecular weight of the UV absorbing copolymer can be controlled by known molecular weight controlling methods. For controlling the molecular weight, for example, a method can be applied in which a chain transfer agent such as carbon terachloride, laurylmercptane and octyl thioglycolate is employed. The polymerization is usually performed at a temperature of from a room temperature to 130° C., and preferably 50-100° C.

The UV absorbing polymer to be employed in the present invention is preferably a copolymer of the UV absorbing monomer and another polymerizable monomer. Examples of the other monomer capable of polymerizing include a unsaturated compound, for example, a styrene derivative such as styrene, α-methylstyrene, o-methylstyrene, m-methylstyrene, p-methylstyrene and vinylnephthalene, an acrylate derivative such as methyl acrylate, ethyl acrylate, propyl acrylate, butyl acrylate, i-butyl acrylate, t-butyl acrylate, octyl acrylate, cyclohexyl acrylate and benzyl acrylate, a methacrylate derivative such as methyl methacrylate, ethyl methacrylate, propyl methacrylate, butyl methacrylate, i-butyl methacrylate, t-butyl methacrylate, octyl methacrylate, cyclohexyl methacrylate and benzyl methacrylate, an alkyl vinyl ether such as methyl vinyl ether, ethyl vinyl ether and butyl vinyl ether, an alkyl vinyl ester such as vinyl formate, vinyl acetate, vinyl butylate, vinyl capronate and vinyl stearate, crotonic acid, maleic acid, fumaric acid, itaconic acid, acrylonitrile, methacrylonitrile, vinyl chloride, vinylidene chloride, acrylamide and methacrylamide. Methyl acrylate, methyl methacrylate and vinyl acetate are preferred.

It is also preferable that the component other than the UV absorbing monomer in the polymer derived from the UV absorbing monomer contains a hydrophilic ethylenic unsaturated monomer.

As the hydrophilic ethylenic unsaturated monomer, a hydrophilic compound having a polymerizable unsaturated double bond in the molecular thereof is employable without any limitation. For example, a unsaturated carboxylic acid such as acrylic acid and methacrylic acid, an acrylate and methacrylate each having a hydroxyl group or an ether bond such as 2-hydroxyethyl methaceylate, 2-hydroxypropyl methacrylate, tetrahydrfurfuryl methacrylate, 2-hydroxyethyl acrylate, 2-ydroxypropyl acrylate, 2,3-dihydroxy-2-methylpropyl methacrylate, tetrahydrofurfuryl acrylate, 2-ethoxyethyl acrylate, diethylene glycol ethoxylate acrylate and 3-methoxybutylbutyl acrylate, acrylamide,an N-substituted (meth)acrylamido such as N,N-dimethyl(meth)acrylate, N-vinylpyrrolidone and N-vinyloxazolidone are employable.

As the hydrophilic ethylenic unsaturated monomer, a (meth)acrylate having a hydroxyl group or a carboxyl group in the molecule thereof is preferable, and 2-hydroxyethyl methacrylate, 20hydroxypropyl methacrylate, 2-hydroxyethyl acrylate and 2-hydroxypropyl acrylate are particularly preferable.

These polymerizable monomers can be copolymerized solely or in combination of two or more kinds together with the UV absorbing monomer.

In the present invention, the method for polymerizing the UV absorbing copolymer is not specifically limited and known methods such as radical polymerization, anion polymerization and cation polymerization can be widely applied. As the initiator for the radical polymerization, an azo compound and a peroxide compound such as azobisisobutylnitrile (AIBN), a diester of azobisisobutylic acid, benzoyl peroxide and hydrogen peroxide are employable. The solvent for polymerization is not specifically limited, and examples of usable solvent include an aromatic hydrocarbon type solvent such as toluene and chlorobenzene, a halogenized hydrocarbon type solvent such as dichloroethane and chloroform, a an ether type solvent such as tetrahydrofuran and dioxane, an amide type solvent such as dimethylformamide, an alcohol type solvent such as methanol, an ester type solvent such as methyl acetate and ethyl acetate, a ketone type solvent such as acetone, cyclohexanone and methyl ethyl ketone, and an aqueous solvent. Solution polymerization in which the polymerization is carried out in a uniform system, precipitation polymerization in which the formed polymer is precipitated, emulsion polymerization in which the polymerization is carried out in a micelle state and suspension polymerization carried out in a suspended state can be performed according to selection of the solvent.

The using ratio of the UV absorbing monomer, the polymerizable monomer capable of polymerizing with the UV absorbing monomer and the hydrophilic unsaturated monomer is suitably determined considering the compatibility of the obtained UV absorbing copolymer with the other transparent polymer and the influence on the transparency and the mechanical strength of the optical compensating film.

The content of the UV absorbing monomer in the polymer derived from the UV absorbing monomeris preferably 1-70%, and more preferably 5-60%, by weight. When the content of the UV absorbent monomer in the UV absorbing polymer is less than 1%, addition of a large amount of the UV absorbing polymer is necessary for satisfying the desired UV absorbing ability so that increasing in the haze or lowering in the transparency and the mechanical strength by the precipitation is caused. On the other hand, when the content of the UV absorbing monomer in the UV absorbing polymer exceeds 70% by weight, the transparent optical compensating film is difficultly obtained sometimes since the compatibility of the polymer with another polymer is lowered.

The hydrophilic ethylenic unsaturated monomer is preferably contained in the UV absorbing copolymer in a ratio of from 0.1 to 50% by weight. When the content is less than 0.1%, the improvement effect on the compatibility of the hydrophilic ethylenic unsaturated monomer cannot be obtained and when the content is more than 50% by weight, the isolation and purification of the copolymer becomes impossible. More preferable content of the hydrophilic ethylenic unsaturated monomer is from 0.5 to 20% by weight. When the hydrophilic group is substituted to the UV absorbing monomer itself, it is preferable that the total content of the hydrophilic UV absorbing monomer and the hydrophilic ethylenic unsaturated monomer is within the above-mentioned range.

For satisfying the content of the UV absorbing monomer and thehydrophilic monomer, it is preferable that the an ethylenic unsatured monomer having no hydrophilicity is further copolymerized additionally to the above two monomers.

Two or more kinds of each of the UV absorbing monomer and hydrophilic or non-hydrophilic ethylenic unsaturated monomer may be mixed and copolymerized.

Typical examples of the UV absorbing monomer to be preferably employed in the present invention are listed below, but the monomer is not limited to these samples.

MUV-1

-continued
MUV-2
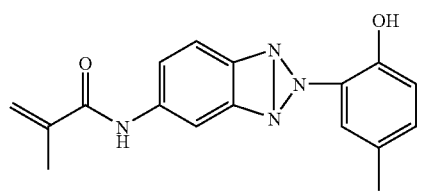
MUV-3
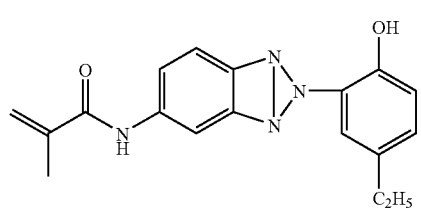
MUV-4
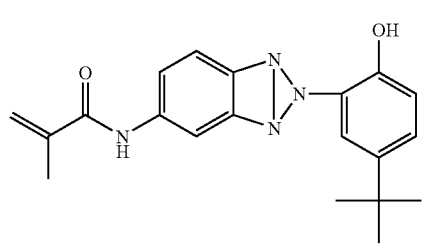
MUV-5
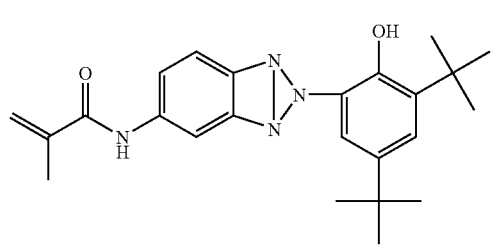
MUV-6
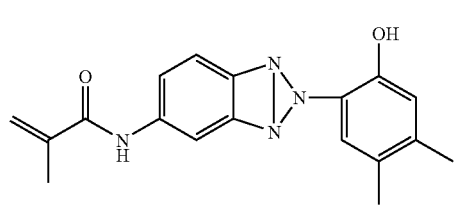
MUV-7
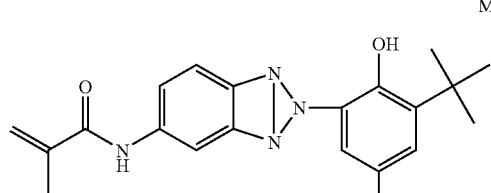
MUV-8
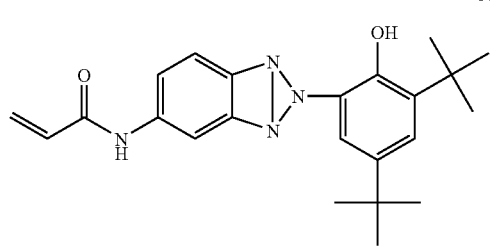
-continued
MUV-9
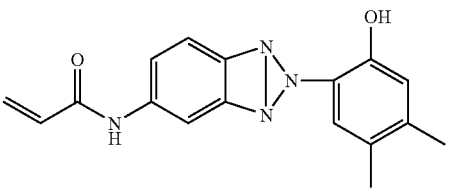
MUV-10
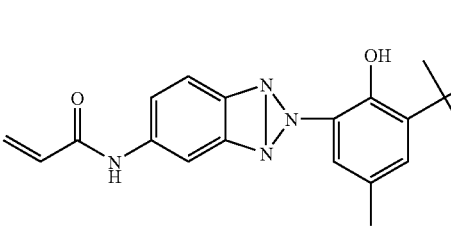
MUV-11
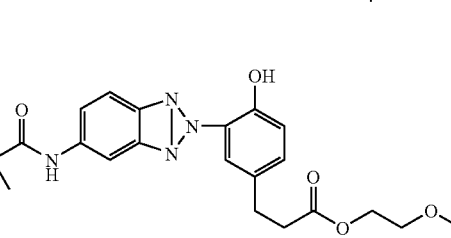
MUV-12
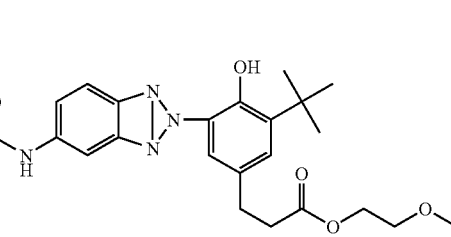
MUV-13
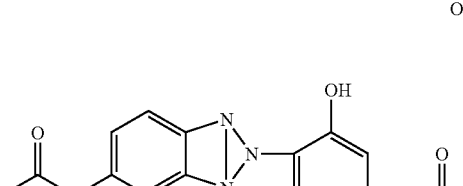
MUV-14
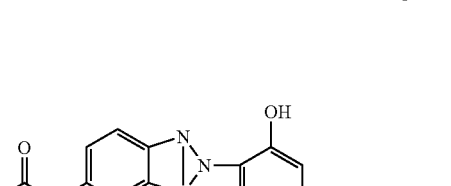
MUV-15
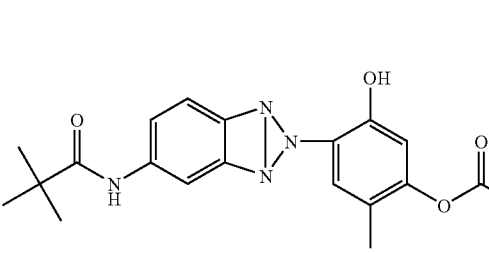

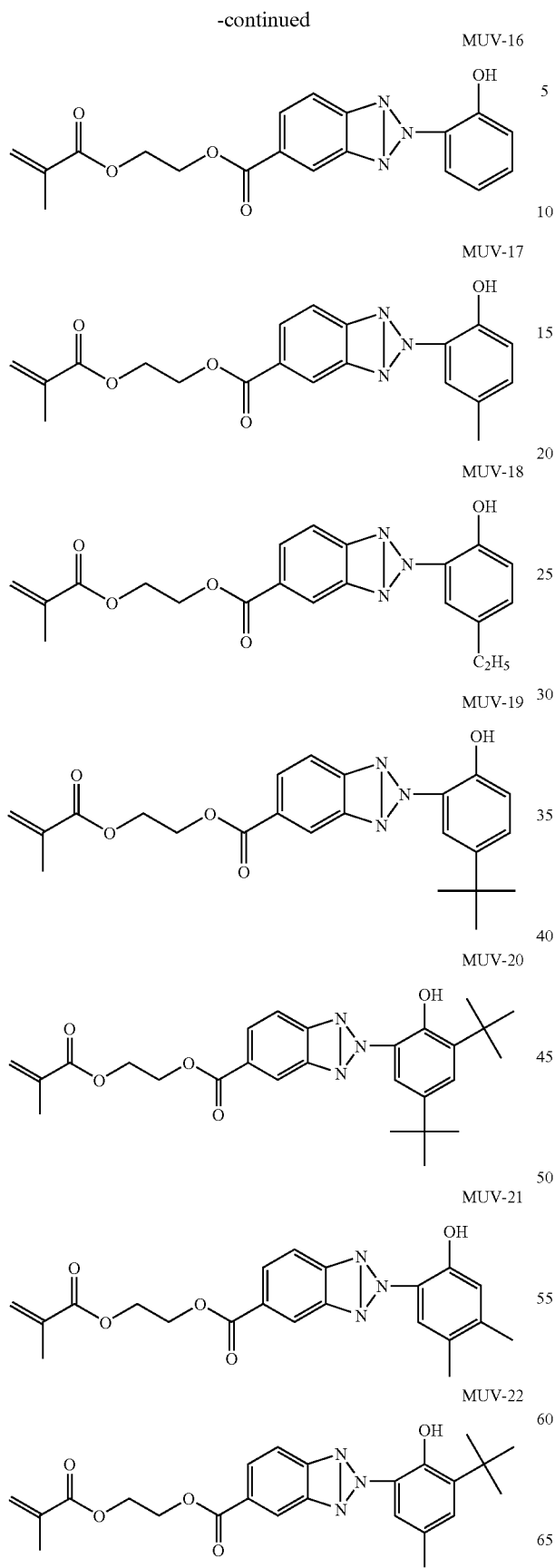
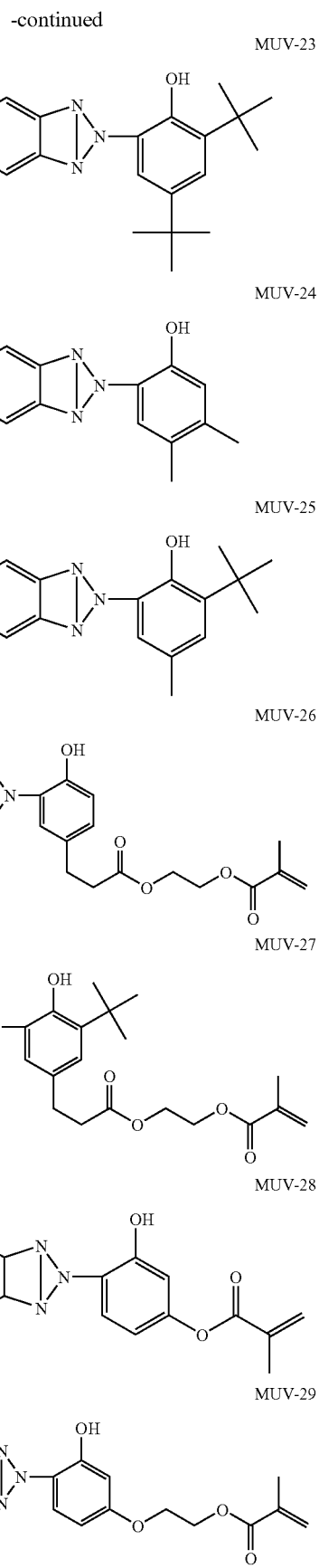

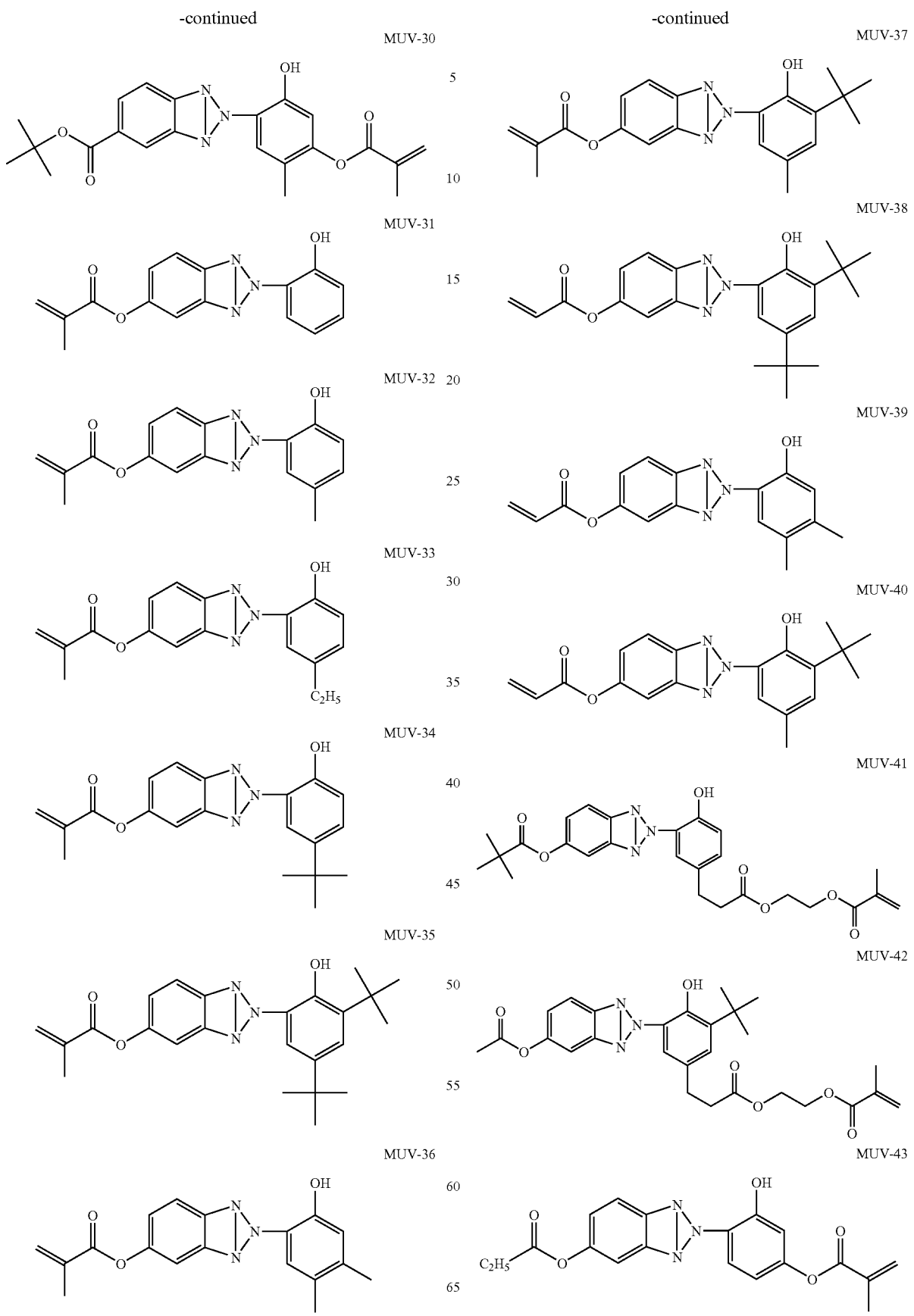

MUV-44
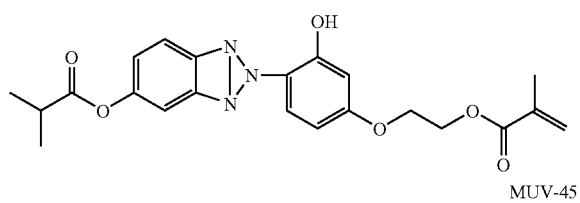

MUV-45
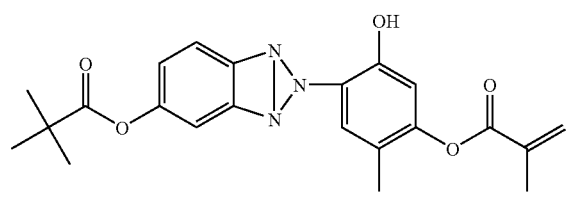

MUV-46
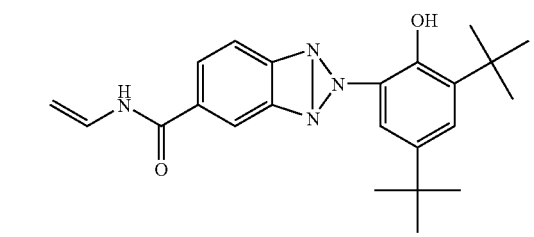

MUV-47
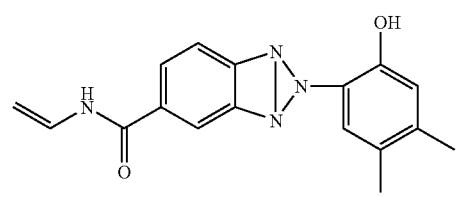

MUV-48
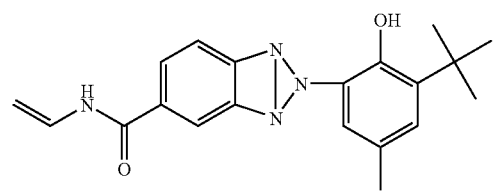

MUV-49
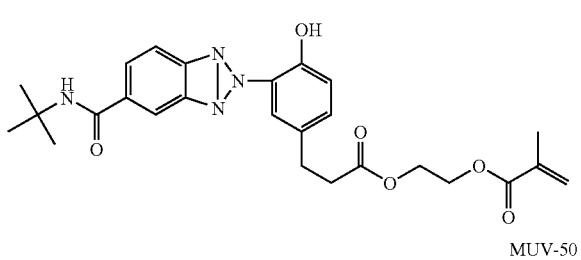

MUV-50
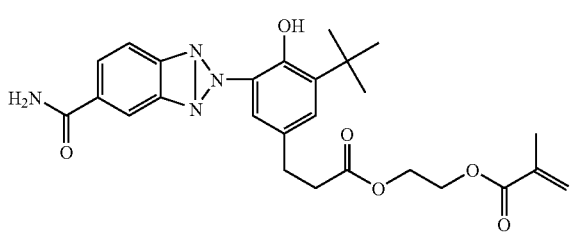

MUV-51
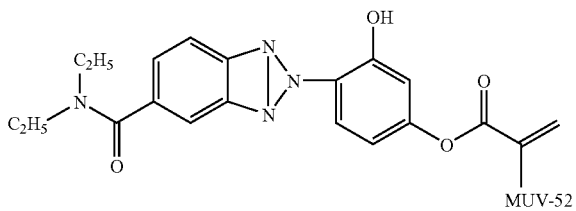

MUV-52
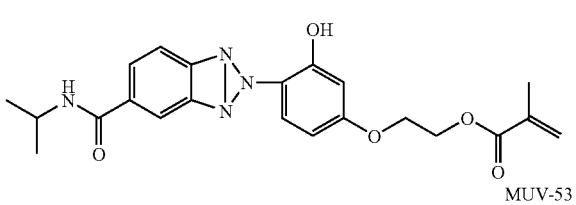

MUV-53
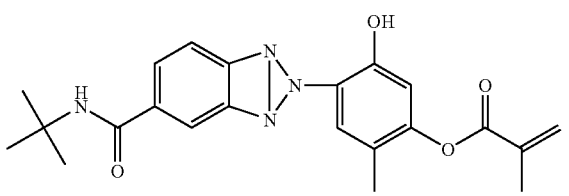

The UV absorbents, Uv absorbing monomers and their intermediates to be employed in the present invention can be synthesized by referring published documents. For example U.S. Pat. Nos. 3,072,585, 3,159,646, 3,399,173, 3,761,373, 4,028,331 and 5,683,861, European Patent No. 86,300,416, Japanese Patent O.P.I. Publication Nos. 63-227575 and 63-185969, "Polymer Bulletin" V. 20 (2), 169-176, and "Chemical Abstracts V. 109, No. 191389 can be referred for synthesizing.

The UV absorbent and the UV absorbing polymer to be used in the present invention canbe employed together with a low or high molecular weight compound or an inorganic compound according to necessityon the occasionof mixing with the other transparent polymer. For example, it is one of preferable embodiments that the UV absorbent polymer and another relatively low molecular weight UV absorbent are simultaneously mixed with the other transparent polymer. Moreover, simultaneously mixing of an additive such as an antioxidant, a plasticizer and a flame retardant is also one of preferable embodiments.

The UV absorbent or the UV absorbing polymer to be employed in the present invention may be added in a state of kneaded with the rein or a solidified state by drying a solution of that together with the resin, though the adding method is not specifically limited.

Though the using amount of the UV absorbent and the UV absorbing polymer is varied depending on the kind of compound and the employing conditions, the amount of the UV absorbent is preferably 0.1-5.0 g, more preferably 0.1-3.0 g, further preferably 0.4-2.0 g, and particularly preferably 0.5-1.5 g, per square meter of the optical film. In the case of the UV polymer, the adding amount is preferably 0.1-10 g, more preferably 0.6-9.0 g, further preferably 1.2-6.0 g, and particularly preferably 1.5-3.0 g, per square meter of the optical film.

As described above, ones are preferable, which have superior absorbing ability to UV rays of not more than 380 nm for preventing degradation of the liquid crystal and low absorbing ability to visible light of not less than 400 nm for displaying ability of the liquid crystal display. In the present invention, the transparency at a wavelength of 380 nm is preferably not more than 8%, more preferably not more than 4%, and particularly preferably not more than 1%.

As UV absorbent monomers available on the market, 1-(2-bezotriazole)-2-hydroxy-5-(vinyloxycarbonylethyl)-benzene UVM-1 and a reactive type UV absorbent 1-(2-benzotriazole)-2-hydroxy-5-(2-methacryloyloxyethyl)-benzene UVA 93, each manufactured by Ootsuka Kagaku Co., Ltd., and similar compounds are employable in the present invention. They are preferably employed solely or in a state of polymeror copolymer butnot limited to them. For example, a polymer UV absorbent available on the market PUVA-30M, manufactured by Ootsuka Kagaku Co., Ltd., is preferably employed. The UV absorbent may be used in combination of two or more kinds thereof.

(Mixing of Cellulose Resin and Additive)

It is preferable that the cellulose ester is blended with the additives such as the plasticizer and the UV absorbent before melting by heat.

For mixing the additives with the cellulose resin, a method is applicable, in which the cellulose resin is dissolved in a solvent and the additives are dissolved or finely dispersed in the resultant solution, and then the solvent is removed. For removing the solvent, known methods can be applied. For example, a drying in liquid method, a drying in gas method, a solvent co-precipitation method, a freeze drying method and a solution cascading method are applicable. The mixture of the cellulose resin and the additives can be made in a state of powder, granules, pellets and film.

As described above, the mixing of the additives is performed in the solution of the cellulose resin, and the mixing may be performed simultaneously with the precipitation and solidification of the cellulose resin in the course of the production thereof.

In the drying in liquid method, a solution of the cellulose resin and the additives is dispersed into an emulsion state by addition of an aqueous solution of a surfactant such as sodium laurate. And then the solvent is removed under an ordinal or reduced pressure so that a dispersion of the cellulose resin mixed with the additives can be obtained. Moreover, centrifugal separation or decantation is preferably applied for removing the solvent. For the emulsification, various methods can be applied and the useof a emulsifying apparatus by ultrasonic waves, high speed rotation sharing.force or high pressure is preferable.

In the emulsifying dispersion by the ultrasonic waves, a batch process and a continuous process can be applied. The batch process is useful for preparing relatively small amount of sample, and the continuous process is suitable for preparing a large amount of sample. In the continuous process, for example, an apparatus such as UH-600SR, manufactured by SMT Co., Ltd., can be employed. In the case of the continuous process, the applying time of the ultrasonic waves can be calculated by (dispersing chamber volume)/(flowing rate)× (numberof cycling times). When plural ultrasonic wave sources are employed, the applying time is the sum of the applying times of each of the sources. The applying time of the ultrasonic waves is practically not more than 10,000 seconds. When the applying time is over 10,000 seconds, the load on the production process becomes too large and the emulsification time should be shortened by selection of the emulsifying agent in practice. Therefore, the application for longer than 10,000 seconds is unnecessary. The application time of the ultrasonic waves is preferably 10-2,000 seconds.

As the emulsifying apparatus by high speed shearing force, for example, Dispermixer, Homomier and Ultramixer are employable. The type of such the mixer can be selected depending on the viscosity of the liquid to be dispersed.

For the emulsifying by high pressure, for example, LAB2000, manufactured by SMT Co., Ltd., is employable. The emulsifying and dispersing ability of that is depending on the pressure applied to the sample. The pressure is preferably within the range of $10^4$-$5 \times 10^5$ kPa.

An anionic surfactant, a cationic surfactant, an amphoteric surfactant and a polymer surfactant can be used as the surfactant, which are selected depending on the kind of solvent or the diameter of the objective emulsion.

In the drying in gas method, the solution containing the cellulose resin and the additives is splayed and dried by using a splay dryer such as GS310, Yamato Kagaku Co., Ltd.

In the solvent co-precipitation method, the solution containing the cellulose resin and the additives is poured into a poor solvent to precipitate the cellulose resin and the additives. The poor solvent is one capable of arbitrarily mixing with the solvent for the cellulose resin. The poor solvent may be a mixed solvent. It is also allowed that the poor solvent is added into the solution of the cellulose resin and the additives.

The precipitated mixture of the cellulose resin and the additives can be separated by filtering and drying.

In the mixture of the cellulose resin and the additives, the particular diameter of the additives is preferably not more than 1 μm, more preferably not more than 500 nm, and particularly preferably not less than 200 μm. Smaller diameter is preferable since the distribution of the mechanical and optical properties of the molten composition can be made uniform.

The mixture of the cellulose resin and the additives and the additive to be added on the occasion of melting by heat is preferably dried before or during the melting by heat. The drying means removing of the moisture absorbed by any raw materials, water or the solvent used for preparing the mixture of the cellulose resin and the additives and a solvent mixed in the additives on the occasion synthesizing thereof.

For removing the water and the solvent, known drying methods such as a heating method, a pressure reducing method, a method by heating under reduced pressure can be applied, and the process can be.performed under atmosphere of air or nitrogen as an inactive gas. The drying by the known methods is preferably performed at a temperature range in which the materials are not-decomposed for holding the quality of the film.

The amount of remaining water or solvent after the drying process is not less than 10%, preferably. not less than 5%, more preferably not less than 1%, and further preferably not less than 0.1%, by weight of the total weight of the materials for constituting the film. The drying temperature is preferably a temperature of not less than 100 ° C. and less than the Tg of the material to be dried. For avoiding fusion of the material, it is preferably that the drying temperature is within the range of from 100° C. to (Tg−5)° C., and more preferably from 110° C. to (Tg−20)° C. The drying time is preferably 0.5-24 hours, more preferably 1-18 hours, and further preferably 1.5-12 hours. When the time is smaller than the above range, the drying degree is tends to be low or too long time is required. When the material to be dried has a Tg, the material is made to difficultly handle by the fusion thereof if the material is heated at the drying temperature higher than the Tg thereof.

The drying process may be separated into two steps, for example, a step of storing the material in a preliminary drying process and a step of drying just before melting which is performed within the period from just before to one week before melting for forming the film.

(Other Additives)

As other additives, an antioxidant, an acid capturing agent, a photo-stabilizer, a peroxide substance decomposing agent, a radical capturing agent, a metal inactivator, a metal compound such as a matting agent, a retardation controlling agent, a dye and a pigment may be employed additionally to the foregoing polymer, plasticizer and the UV absorbent. Other than the above, an additive which cannot be classified into the above additives may be employed when it has the above function.

The additives are employed for preventing oxidation of the film constituting material, capturing an acid formed by decomposition of the material and inhibiting or preventing the decomposition reaction caused by the radical species so as to inhibiting the deterioration of the material such as the coloring, decreasing in the molecular weight including a not cleared decomposing reaction and occurrence of volatile component, and for giving a function such as moisture permeability ability and a slipping ability.

Besides, the decomposition reaction in the film constituting materials is considerably progressed when the material is molten by heating, and the decomposition reaction some times causes coloring or degradation in the strength of the film constituting material. Moreover, undesirable volatile component tends to occur by the decomposition reaction of the film constituting materials.

The film constituting material preferably contains the above additives on the occasion of melting by heat, such the material is superior in the inhibition of the lowering in the strength caused by the degradation and decomposition of the material and in the keeping of the specific strength of the material.

The presence of the additives is effective to inhibit coloring, and to maintain high transparency and low haze value. The decreasing in the oxygen concentration can be performed by know methods, for example, the use of inactive gas such as nitrogen and argon, the air exhaustion operation for making reduced pressure to vacuum, and the processing in a closed environment. At least one of the above three methods can be applied together with the use of the foregoing additives. The degradation of the materials can be inhibited by reducing the probability of contacting the materials with oxygen in the air, such the process is preferable for in object of the present invention.

The presence of the additives in the film constituting material is preferable for using the optical film or the optical compensating film as the polarizing plate protective film from the viewpoint of the improving of the storage durability of the polarizing plate or the polarizing element constituting the polarizing plate.

In the display employing the polarizing plate of the present invention, the variation and degradation of the optical film can be inhibited by the presence of the additives so that the durability during the storage can be improved, and the function of the optical compensation design of the optical film or the optical compensating film is maintained for a long period of time.

The additives are further described in detail.

(Antioxidant)

The antioxidant to be employed in the present invention is described below.

As the antioxidant, a phenol type antioxidant, a phosphoric acid type antioxidant, a sulfur type antioxidant, a stabilizer against heat processing and an oxygen scavenger are employable, and among them the phenol type antioxidant, and particularly an alkyl-substituted phenol type antioxidant are preferable. The coloring and the lowering in the strength of the formed product caused by the heating and the oxidation on the occasion of the formation can be prevented without any decreasing in the transparence and the anti-heating ability. These antioxidants may be employed solely or in combination of two or more kinds thereof. The adding amount can be optionally determined within the range in which the object of the present invention is not disturbed, and is preferably from 0.001 to 5, and more preferably from 0.01 to 1, parts by weight per 100 parts by weight of the polymer relating to the present invention.

As the antioxidant, a hindered phenol antioxidant is preferred, which includes 2,6-dialkylphenol derivatives described in U.S. Pat. No. 4,839,405, columns 12 to 14. Such the compounds include ones represented by Formula (7).

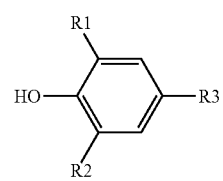

Formula (7)

In the above formula, R1, R2 and R3 are each a substituted or unsubstituted alkyl group. Concrete examples of the hindered phenol compound include n-octadecyl 3-(3,5-di-t-butyl-4-hydroxyphenyl)propionate, n-octadecyl 3-(3,5-di t-butyl-4-hydroxyphenyl)acetate, n-octadecyl 3,5-di t-butyl-4-hydroxybenzoate, n-hexyl 3,5-di-t-butyl-4-hydroxyphenylbenzoate, n-dodecyl 3,5-di-t-butyl-4-hydroxyphenylbenzoate, neododecyl 3-(dodecyl β-(3,5-di-t-butyl-4-hydroxyphenyl)propionate, ethyl α-(4-hydroxy-3,5-di-t-butylphenyl)isobutylate, octadecyl α-(4-hydroxy-3,5-di-t-butylphenyl)isobutylate, octadecyl α-(4-hydroxy-3,5-di-t-butyl-4-hydroxyphenyl)propionate, 2-(n-octyl)ethyl 3,5-di-t-butyl-e-hydroxybenzoate, 2-(n-octyl)ethyl 3,5-di-t-butyl-4-hydroxyphenylacetate, 2-(n-octadecylthio)ethyl 3,5-di-t-butyl-4-hydroxyphenyl-acetate, 2-(n-octadecylthio) ethyl 3,5-di-t-butyl-4-hydroxybenzoate, 2-(2-hydroxyethylthio)ethyl 3,5-di-t-butyl-4-hydroxybenzoate, diethylglycol bis-(3,5-di-t-butyl-4-hydroxyphenyl)propionate, 2-(n-octadecylthio)ethyl 3-(3,5-di-t-butyl-4-hydroxyphenyl)propionate, stearylamido N,N-bis[ethylene 3-(3,5-di-t-butyl-4-hydroxyphenyl)-propionate], n-butylimino N,N-bis-[ethylene 3-(3,5-di-t-butyl-4-hydroxyphenyl)propionate], 2-(2-stearoylo-xyethylthio)ethyl 3,5-di-t-butyl-4-hydroxybenzoate, 2-(2-stearoylo-xyethylthio)ethyl 7-(3-methyl-5-t-butyl-4-hydroxyphenyl)heptanoate, 1,2-propylene glycol bis-[3-(3,5-di-t-butyl-4-hydroxyphenyl)propionate], ethylene glycol bis-[3-(3,5-di-t-butyl-4-hydroxyphenyl)-propionate], neopentyl glycol bis-[3-(3,5-di-t-butyl-4-hydroxyphenyl)propionate], ethylene glycol bis-(3,5-di-t-butyl-4-hydroxyphenylacetate), glycerol 1-n-octadecanoate-2, 3-bis-(3,5-di-t-butyl-4-hdyroxyphenylacetate), pentaerythrytol tetrakis[3-(3,5-di-t-butyl-4'-hydroxyphenyl)propionate], 1,1,1-trimethylolethane tris[3-(3,5-di-t-butyl-hydroxyphenyl)propionatel, sorbitol hexa-[3-(3,5-di-t-butyl-hydroxyphenyl)propionate], 2-hydroxyethyl 7-(3,5-di-t-butyl-hydroxyphenyl)propionate, 2-stearoyloxyethyl 7-(3,5-di-t-butyl-hydroxyphenyl)-heptanoate, 1,6-n-hexanediol bis-[(3,5-di-t-butyl-4-hydroxyphenyl)propionate] and pentaerythrytol tetrakis(3,5-di-t-butyl-4-hydroxycinnamate). The above-described type hindered phenol antioxidant is, for example, available on the market under the commercial name of Irganox 1076 and Irganox 1010 of Ciba Specialty Chemicals.

Concrete examples of another antioxidant include a phosphor type antioxidant such as trisnonylphenyl phosphite and tris(2,4-di-tert-butylphenyl)phosphite, a sulfur type antioxidant such as dilauryl 3,3'-thiopropionate, dimyristyl 3,3'-thiopropionate, distearyl 3,3'-thiopropionate and pentaerythrytyl tetrakis(3-laurylthiopropionate), an antiheating stabilizer such as 2-tert-butyl-6-(3-tert-butyl-2-hydroxy-5-methylbenzyl)-4-methylphenyl-acrylate and 2-[1-(2-hydroxy-3,5-di-tert-pentylphenyl-acrylate, a 3,4-dihydro-2H-1-benzopurane type compound described in Japanese Patent Examined Publication No. 8-27508, a 3,3'-spyrodichroman type-compound, a 1,1-spyroindan type compound, morpholine, thiomorpholine, thiomorpholine oxide, thiomorpholine dioxide, a compound having piperazine skeleton as a partial structure thereof, and an oxygen scavenger such as a dialkoxybe.nzene type compound described in Japanese Patent O.P.I. Publication No. 3-174150. A part of each of these antioxidants may be partially or regularly bonded with a polymer in a form of pendant. Moreover, the plasticizer may be included as a partial structure of an additive such as an antioxidant, an acid scavenger and a UV absorbent.

(Acid Capturing Agent)

As the acid capturing agent, ones-containing an acid capturing epoxy compound described in U.S. Pat. No. 4,137,201 are preferable. Such the epoxy compounds as the acid capturing agent have been known in the field of the art, and examples thereof include glycidyl ether of various polyethylene glycols, particularly a polyglycol driven by condensation of approximately 8 to 40 moles of ethylene glycol per mole of the polyglycol, diglycidyl ether of glycerol, an metal epoxy compound, for example, ones usually used in a vinyl polymer composition, an epoxide ether condensate, diglycidyl ether of bisphenol A namely 4,4'-dihydroxydiphenyldimethylmthane, an epoxide unsaturated fatty acid ester, particularly an ester of alkyl having 2-4 carbon atoms of a fatty acid having 2-22 carbon atoms such as butyl epoxystearate, and a triglyceride of one of various epoxide long chain fatty acids, for example, an epoxide soybean oil composition. The examples further include an epoxide of plant oil or another unsaturated natural oil. The epoxide oils are sometimes called as epoxide of natural glyceride or epoxide of unsaturated fatty acid and these fatty acids are each contains 12-22 carbon atoms. An epoxy group-containing epoxide resin compound available on the market EPON815c, manufacture by Miller-Stephenson Chemical Co., Ltd., and an epoxide ether oligomer condensation product represented by Formula (8) are particularly preferable.

includes a 2,2,6,6-tetra-alkylpiperidine compound and its acid addition salt and a metal complex thereof, as described in U.S. Pat. No. 4,619,956, columns 5 to 11 and U.S. Pat. No. 4,839,504, columns 3 to 5. Such the compounds include a compound represented by Formula (9).

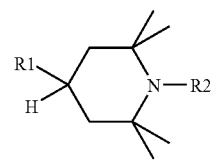

Formula (9)

In the above formula, R1 and R2 are each a hydrogen atom or a substituent. Concrete examples of the hindered amine photo-stabilizer include 4-hydroxy-2,2,6,6-tetramethyl-piperidine, a allyl-4-hydroxy-2,2,6,6-tetramethyl-piperidine, 1-benzyl-4-hydroxy-2,2,6,6-tetramethyl-piperidine, 1-(4-t-butyl-2-butenyl)-4-hydroxy-2,2,6,6-tetramethylpiperidine, 4-stearoyloxy-2,2,6,6-tetramethylpiperidine, 1-ethyl-4-saliciloyloxy-2,2,6,6-tetramethylpiperidine, 4-methacryloyloxy-1,2,2,6,6-pentamethylpiperidine, 1,2,2,6,6-pentamethylpiperidine-4-yl-β(3,5-di-t-butyl-4-hydroxyphenyl)-propionate, 1-benzyl-2,2,6,6-tetramethyl-4-piperidinylamleinate, (di-2,2,6,6-tetramethylpiperidine-4-yl)-adipate, (di-2,2,6,6-tetramethylpiperidine-4-yl)-sebacate, (di-1,2,3,6-tetramethyl-2,6-diethyl-piperidine-4-yl)-sebacate, (di-1-allyl-2,2,6,6-tetramethylpiperidine-4-yl)-phthalate, 1-acetyl-2,2,6,6-tetramethylpiperidine-4-yl)-acetate, trimellitic acid ester of tri-(2,2,6,-tetramethyl-piperidine-4-yl), 1-acryloyl-4-benzyloxy-2,2,6,6-tetramthyl-piperidine, di-(1,2,2,6,6-pentamethyl-piperidine-4-yl)dibutylmalonate, di-(1,2,3,6-tetramethyl-2,6-diethylpiperidine-4-yl)dibenzylmlonate, dimethyl-bis-(2,2,6,6-tetramethylpieridine-4-oxy)-silane, tris-(1-propyl-2,2,6,6-tetramethylpieridine-4-yl)phosphite, tris-(1-propyl-2,2,6,6-tetramethylpieridine-4-yl)phosphate, N,N'-bis-(2,2,6,6-tetramethylpieridine-4-yl)-hexamethylene-1,6-di-acetoamide, 1-acetyl-4-(N-cyclohexylacetamido)-2,2,6,6-tetramethylpieridine, 4-benzylamino-2,2,6,6-tetramethyl-pieridine, N,N'-bis-(2,2,6,6-tetramethyl-pieridine-4-yl)-N,N'-dibutyl-adipamide, N,N'-bis-(2,2,6,6-tetramethylpieridine-4-yl)-N,N'-dicyclohexyl-(2-

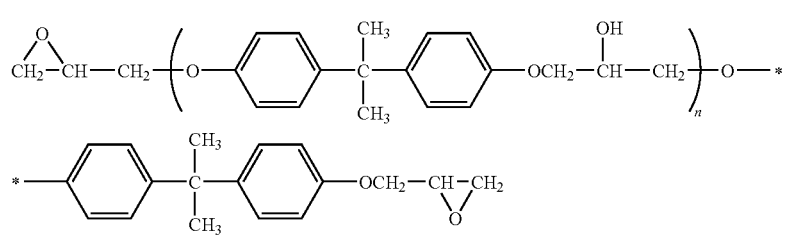

Formula (8)

In the above formula, n is an integer of 0-12. Further employable acid capturing agent includes those described in Japanese Patent O.P.I. Publication No. 5-194788, paragraphs 87 to 105.

(Photo-Stabilizer)

As the photo-stabilizer, a hindered amine photo-stabilizer (HALS) is employable, which is known compound and hydroxypropylene), N,N'-bis-(2,2,6,6-tetramethyl-pieridine-4-yl)-p-xylenediamine, 4-(bis-2-hydroxyethyl)-amino-1,2,2,6,6-pentamethylpiperidine, 4-methacrylamido-1,2,2,6,6-pentamethylpiperidine and methyl α-cyano-β-methyl-β-[N-2,2,6,6-tetramethylpieridine-4-yl])-amino-acrylate.

Preferable hindered amine photo-stabilizer includes the following HALS-1 and HALS-2.

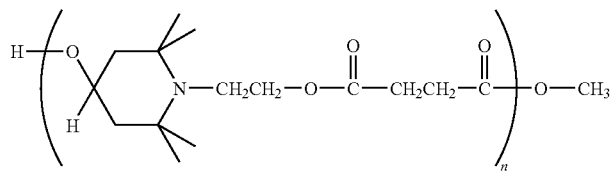

HALS-1

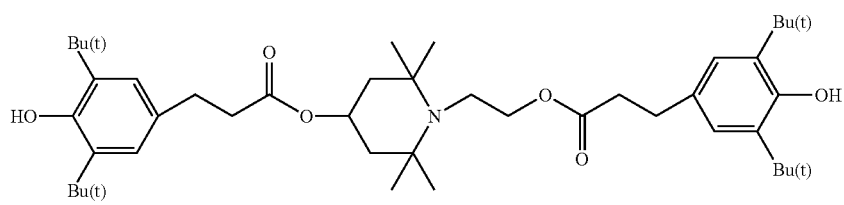

HALS-2

These hindered amine photo-stabilizers may be employed solely or in combination of two or more kinds thereof. The hindered amine photo-stabilizer may be employed together with the additives such as the plasticizer, acid scavenger and UV absorbent, and may be introduced into a part of the structure of the additive. Though the adding amount of the photo-stabilizer is suitably determined within the range in which the object of the present invention is not disturbed, and is preferably from 0.01 to 106, more preferably 0.01-5%, and particularly preferably 0.05-1%, by weight.

(Retardation Controlling Agent)

Optical compensation function can be given particularly to the optical compensating film of the present invention for improving the quality of displayed image by adding a retardation controlling agent or providing a liquid crystal layer by forming a stretched layer for combining the retardation caused by the liquid crystal layer to the optical compensating film. Coloring of films and reduction in haze can be expected with a retardation controlling agent, since a desired phase difference can be given without stretching excessively As the compound to be added for controlling the retardation, an aromatic compound having two or more aromatic rings such as that described in European Patent No. 911, 656A2 may be employed. For example, the following rod-shaped compounds are applicable. Two or more kinds of the aromatic compound may be employed with together. The aromatic ring of the aromatic compound includes an aromatic heterocycle additionally to an aromatic hydrocarbon ring. The aromatic heterocycle is particularly preferable, and the heterocycle is usually unsaturated heterocycles. Among them, a 1,3,5-triazine ring is preferred.

(Rod-Shaped Compound)

The optical film or the optical compensating film according to the present invention preferably contains a rod-shaped compound which has the maximum absorption wavelength ($\lambda_{max}$) in UV absorption spectrum at a wavelength of not longer than 250 nm.

The rod-shaped compound preferably has one or more, and preferably two or more, aromatic rings from the viewpoint of the retardation controlling function. The rod-shaped compound preferably has a linear molecular structure. The linear molecular structure means that the molecular structure of the rod-shaped compound is linear in the thermodynamically most stable structure state. The thermodynamically most stable structure can be determined by crystal structure analyzing or molecular orbital calculation. The molecular structure, by which the heat of formation is made minimum, can be determined on the calculation by, for example, a software for molecular orbital calculation WinMOPAC2000, manufactured by Fujitsu Co., Ltd. The linear molecular structure means that the angle of the molecular structure is not less than 140° in the thermodynamically most stable structure calculated as the above. The rod-shaped compound is preferably one displaying a liquid crystal property. The rod-shaped compound more preferably displays a crystal liquid property by heating (thermotropic liquid crystal property). The phase of the liquid crystal is preferably a nematic phase or a smectic phase.

As the rod-shaped compound, trans-1,4-cyclohexane-dicarboxylic acid esters represented by the following Formula (10) are preferable.

Formula (10)

In Formula 10, $Ar^1$ and $R^2$ are each independently an aromatic group. The aromatic group includes an aryl group (an aromatic hydrocarbon group), a substituted aryl group, an aromatic heterocyclic group and a substituted heterocyclic group. The aryl group and the substituted alkyl group are more preferable than the aromatic heterocyclic group and the substituted aromatic heterocyclic group. The heterocycle of the aromatic heterocyclic group is usually unsaturated. The aromatic heterocyclic group is preferably a 5-, 6- or 7-member ring, and more preferably a 5- or 6-member ring. The heterocyclic ring usually has the largest number of double bond. The hetero atom is preferably a nitrogen atom, an oxygen atom or a sulfur atom and the nitrogen atom or the oxygen atom is more preferable. Examples of the aromatic heterocyclic ring include a furan ring, a thiophene ring, a pyrrole ring, an oxazole ring, in isoxazble ring, a thiazole ring, an isothiazole ring, an imidazole ring, a pyrazole ring, a furazane ring, a triazole ring, a pyrane ring, a pyridine ring, a pyridazine ring, a pyrimidine ring, a pyrazine ring and a 1,3,5-triazine ring. As the aromatic ring of the aromatic group, a benzene ring, a furan ring, a thiophene ring, a pyrrole ring, an oxazole ring, a thiazole ring, a thiazole ring, an imidazole ring, a triazole ring, a pyridine ring, a pyrimidine ring and pyrazine ring are preferable and the benzene ring is particularly preferable.

Examples of the substituent of the substituted aryl group and the substituted aromatic heterocyclic group include a halogen atom such as a fluorine chlorine atom, a chlorine atom, a bromine atom and an iodine atom, a hydroxyl group, a carboxyl group, a cyano group, an amino group, an alkylamino group such as a methylamino group, an ethylamino group, a utylamno group and a dimethylamino group, a nitro group, a suifo group, a carbamoyl group, an alkylcarbamoyl group such as an N-methylcarbaamoyl group and an N,N-dimethylcarbamoyl group, a sulfamoyl group, an alkylsulfamoyl group such as an N-methylsulfamoyl group, an N-ethylsulfamoyl group and an N,N-dimethylsulfamoyl group, a ureido group, an alkylureido group such as an N-methylureido group, an N,N-dimethylureido group and N,N,N-trimethylureido group, an alkyl group such as a methyl group, an ethyl group, a propyl group, a butyl group, a pentyl group, a heptyl group, an octyl group, an isopropyl group, an s-butyl group, a t-amyl group, a cyclohexyl group and a cyclopentyl group, an alkenyl group such as a vinyl group, an allyl group and a hexenyl group, an alkynyl group such as an ethynyl group and a butynyl group, an acyl group such as a formyl group, an acetyl group, a butylyl group, a hexanoyl group and a lauryl group, an acyloxy group such as an acetoxy group, a butylyloxy group, a hexanoyloxy group and lauryloxy group, an alkoxy group such as a methoxy group, an ethoxy group, a propoxy group, a butoxy group, a pentyloxy group, a heptyloxy group and an octyloxy group, an aryloxy group such as a phenoxy group, an alkoxycarbonyl group such as a methoxycarbonyl group, an ethoxycarbonyl group, a propoxycarbonyl group, a butoxycarbonyl group, a pentyloxycarbonyl group and a heptyloxycarbonyl group, an aryloxycarbonyl group such as a phenoxycarbonyl group, a an alkoxycarbonylamino group such as a butoxycarbonylamino group and a hexyloxycarbonylamino group, an alkylthio group such as a methylthio group, an ethylthio group, a propylthio group, butylthio group, a pentylthio group, a heptylthio group and an octylthio group, an arylthio group such as a thiophenyl group, an alkylsulfonyl group such as a methylsulfonyl group, an ethylsulfonyl group, a propylsulfonyl group, a butylsulfonyl group, a pentylsulfonyl group, a heptylsulfonyl group and an octylsulfonyl group, an amido group such as an acetoamido group, a butylamido group, a hexylamido group and an. octylamido group, and a non-aromatic heterocyclic group such as a morpholyl group and a pyradinyl group.

As the substituent of the substituted aryl group and the substituted aromatic heterocyclic group, a halogen atom, a cyano group, a carboxyl group, a hydroxyl group, an amino group, an alkyl-substituted amino group, an acyl group, an acyloxy group, an amido group, an alkoxycarbonyl group, an alkoxy group, an alkylthio group and an alkyl group are preferable. The alkyl moiety of the alkylamino group, the alkoxycarbonyl group, the alkoxy group and the alkylthio group, and the alkyl group each may further have a substituent. Examples of the substituent of the alkyl moiety or the alkyl group include a halogen atom, a hydroxyl group, a carboxyl group, a cyano group, an amino group, an alkylamino group, a nitro group, a sulfo group, a carbamoyl group, an alkylcarbamoyl group, a sulfamoyl group, an alkylsulfamoyl group, a ureido group, an alkylureido group, an alkenyl group, an alkynyl group, an acyl group, an acyloxy group, an alkoxy group, an aryloxy group, an alkoxycarbonyl group, an aryloxycarbonyl group, an alkoxycarbonylamino group, an alkylthio group, an arylthio group, an alkylsulfonyl group, an amido group and a non-aromatic heterocyclic group. The halogen atom, the hydroxyl group, an amino group, an alkylamino group, an acyl group, an acyloxy group, an acylamino group, an alkoxycarbonyl group and an alkoxy group are preferable as the substituent of the alkyl moiety or the alkyl group.

In Formula (10), $L^1$ is a di-valent bonding group selected from the group consisting of an alkylene group, an alkenylene group, an alkynylene group, a di-valent saturated heterocyclic group, an —O— atom, a —CO— group and a combination of them. The alkylene group may have a cyclic structure. As the cyclic alkylene group, a cyclohexylene group is preferable, and 1,4-cyclohexylene group is more preferable. As the chain-shaped alkylene group, a straight-chain alkylene group is more preferable than a branched-chain alkylene group. The number of carbon atoms of the alkylene group is preferably 1-20, more preferably 1-15, further preferably 1-10, further more preferably 1-8, and most preferably 1-6.

The alkenylene group and the alkynylene group each having a cyclic structure are more preferable than those having a chain structure, and a straight-chain structure is more preferably to a branched-chain structure. The number.of carbon atom of the alkenylene group and the alkynylene group is preferably 2-10, more preferably 2-8, further. preferably 2-6, and further more preferably 2-4; and most preferably 2, namely a vinylene or an ethynylene group. The di-valent saturated heterocyclic group is preferably from a 3- to 9-member heterocyclic ring. The hetero atom of the heterocyclic ring is preferably an oxygen atom, a nitrogen atom, a boron atom, a sulfur atom, a silicon atom, a phosphor atom or a germanium atom. Examples of the saturated heterocyclic ring include a piperidine ring, a piperazine ring, a morpholine ring, a pyrrolidine ring, an imidazolidine ring, a tetrahydrofuran ring, a tetrahydropyrane ring, a 1-3-dioxane ring, a 1,4-dioxane ring, a terahydrothiophene ring, a 1,3-thiazolidine ring, a 1,3-oxazolidine ring, a 1,3-dioxoran ring, a 1,3-dithiosilane ring and a 1,3,2-dioxoboran ring. Particularly preferable di-valent saturated heterocyclic group is a piperazine-1,4-diylene group, a 1,3-dioxane-2,5-diylene group and a 1,3,2-dioxobororane-2,5-diylene group.

Examples of divalent bonding group composed of a combination of groups are listed as follows.

L-1: —O—CO-alkylene-CO—O—
L-2: —CO—O-alkylene-O—CO—
L-3: —O—CO-alkenylene-CO—O—
L-4: —CO—O-alkenylene-O—CO—
L-5: —O—CO-alkynylene-CO—O—
L-6: —CO—O-alkynylene-O—CO—
L-7: —O—CO— divalent saturated heterocyclic group —CO—O—
L-8: —CO—O— divalent saturated heterocyclic group —O—CO—

In the structure of Formula (10), the angle formed by $Ar^1$ and $Ar^2$ through $L^1$ is preferably not less than 140°. Compounds represented by Formula 11 are further preferable as the rod-shaped compound.

$$Ar^1\text{-}L^2\text{-}X\text{-}L^3\text{-}Ar^2 \qquad \text{Formula (11)}$$

In Formula (11), $Ar^1$ and $Ar^2$ are each independently an aromatic group. The definition and the example are the same as $Ar^1$ and $Ar^2$ in Formula (10).

In Formula (11), $L^2$ and $L^3$ are each independently a di-valent bonding group selected from the group consisting of an alkylene group, an —O— atom, a —CO— group and a combination of them. The alkylene group having a chain structured is preferably to that having a cyclic structure, and a straight-chain structure is more preferably to a branched-chain structure. The number of carbon atoms in the alkylene group is preferably 1-10, more preferably from 1 to 8, further preferably from 1 to 6, further more preferably 1-4, and most preferably 1 or 2, namely a methylene group or an ethylene group. $L^2$ and $L^3$ are particularly preferably an —O—CO— group or a —CO—O— group.

In Formula (11), X is 1,4-cyclohexylene group, a vinylene group or a ethynylene group. Concrete examples of the compound represented by Formula (10) are listed below.

(1)
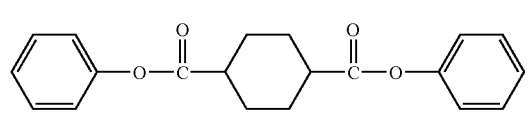
(2)
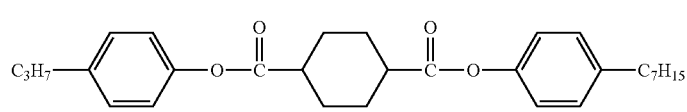
(3)
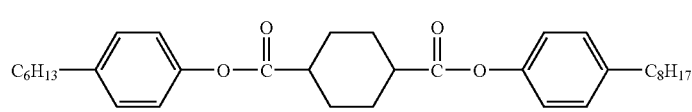
(4)
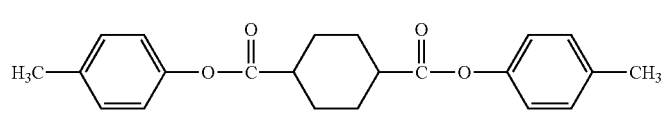
(5)
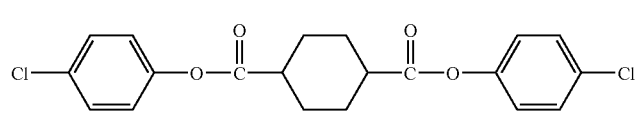
(6)
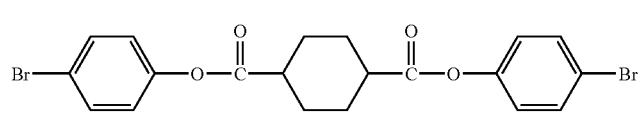
(7)
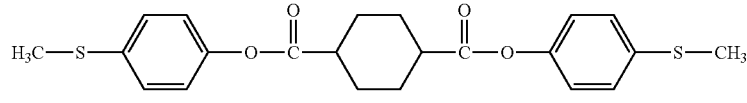
(8)
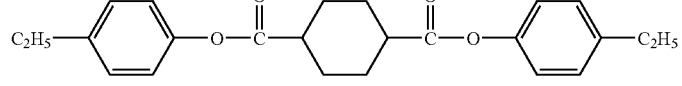
(9)
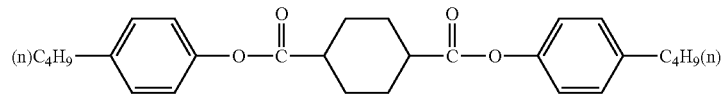
(10)
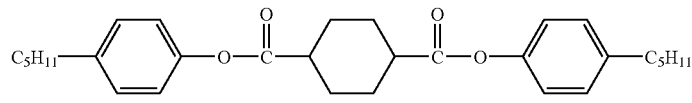
(11)
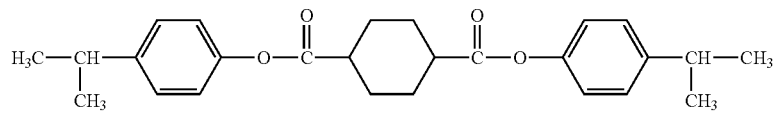
(12) (13)
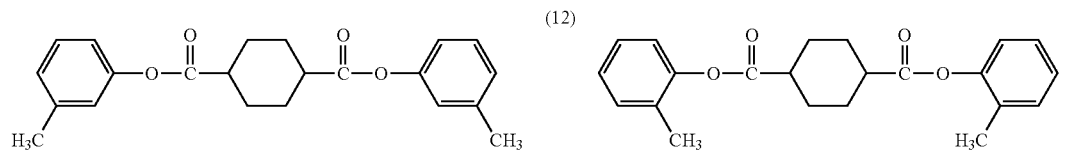
(14)
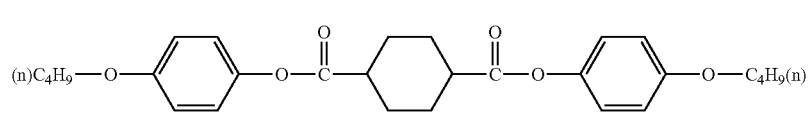
(15)
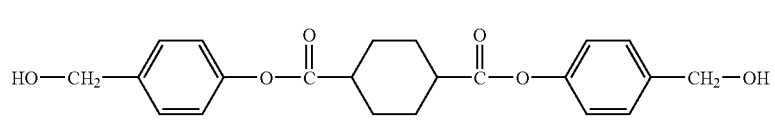

-continued
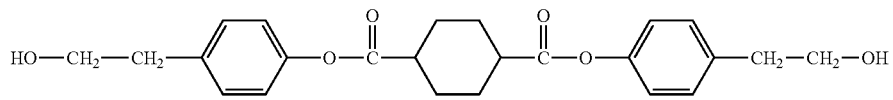
(16)
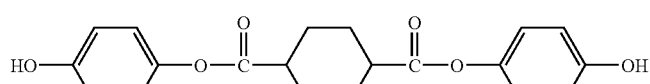
(17)
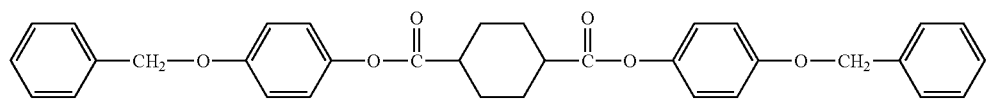
(18)
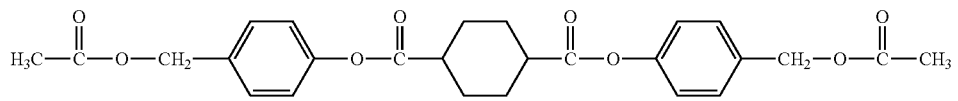
(19)
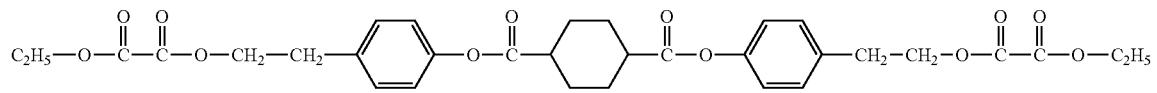
(20)
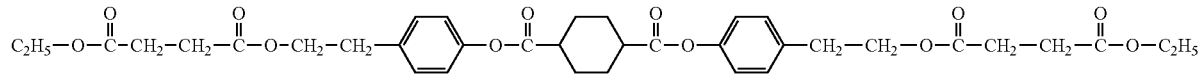
(21)
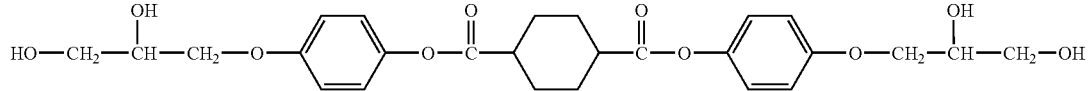
(22)
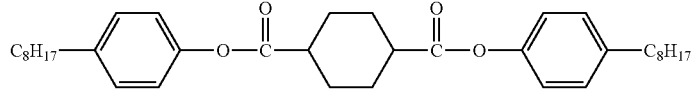
(23)
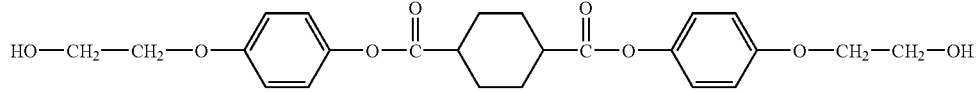
(24)
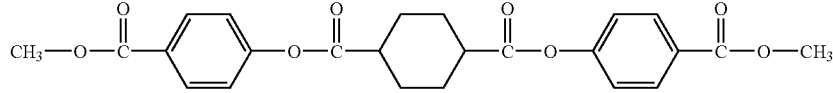
(25)
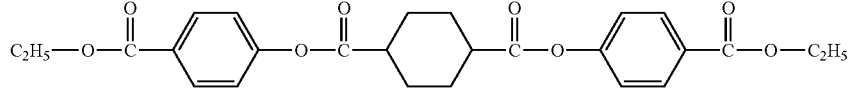
(26)
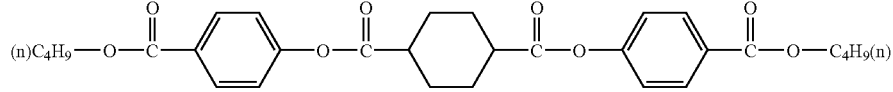
(27)
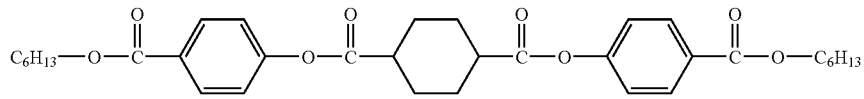
(28)
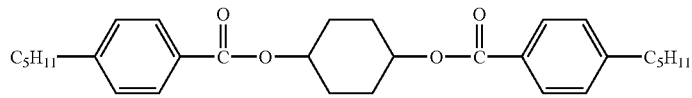
(29)
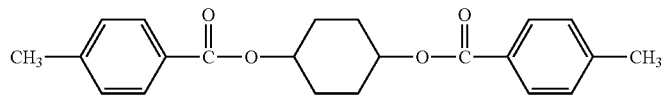
(30)

-continued
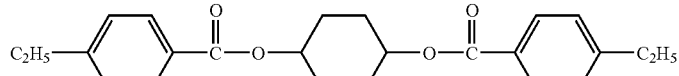 (31)
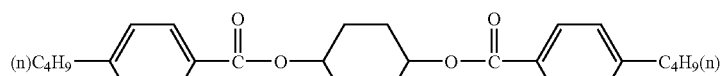 (32)
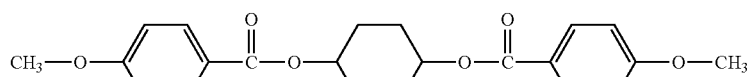 (33)
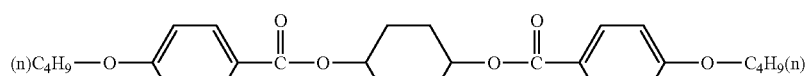 (34)
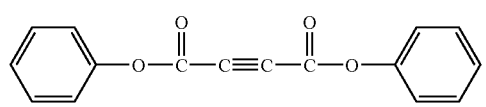 (35)
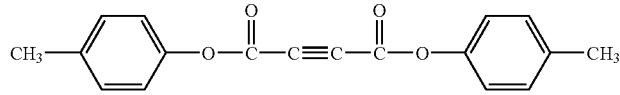 (36)
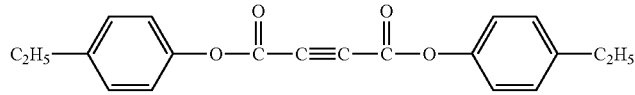 (37)
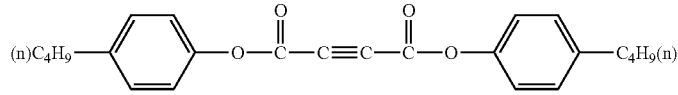 (38)
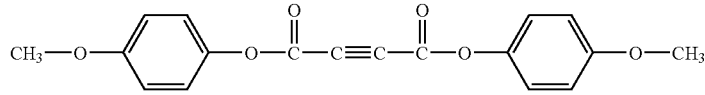 (39)
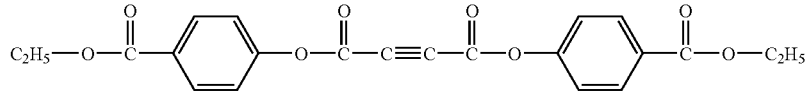 (40)
 (41)
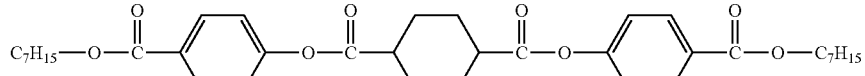 (42)
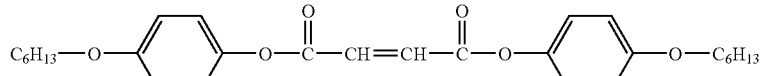 (43)
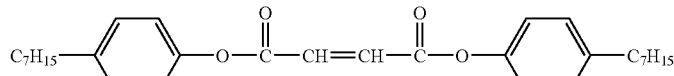 (44)
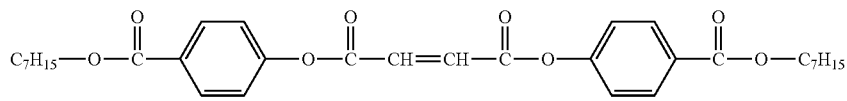 (45)

-continued

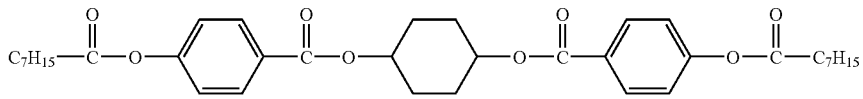

(46)

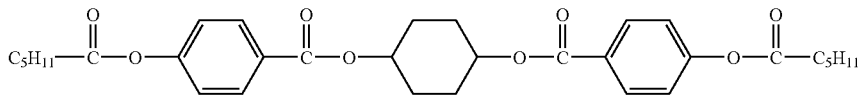

(47)

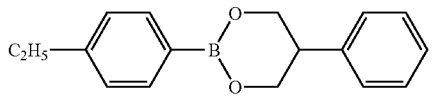

(48)

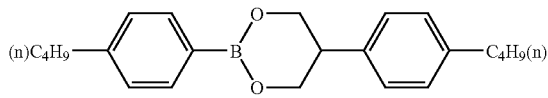

(49)

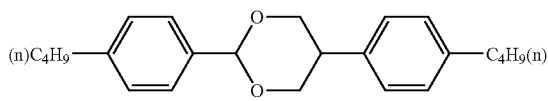

(50)

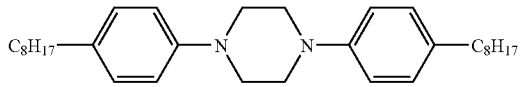

(51)

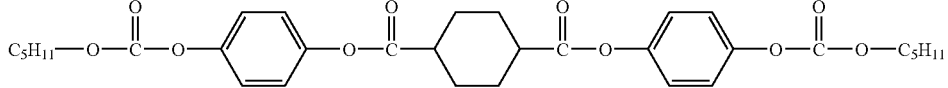

(52)

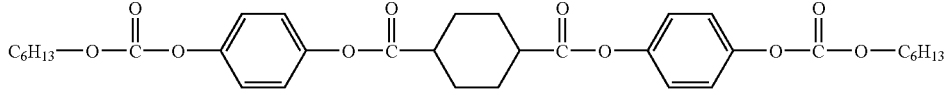

(53)

Exemplified compounds (1)-(34), (41), (42), (46), (47), (52) and (53) each has two asymmetric carbon atoms at 1- and 4-positions of the cyclohexane ring. However, Exemplified compounds (1), (4)-(34), (41), (42), (46), (47), (52) and (53) have no optical isomerism (optical activity) since they have symmetrical meso form molecular structure, and there are only geometric isomers thereof. Exemplified compound 1 in trans-form (1-trans) and that in cis-form (1-cis) are shown below.

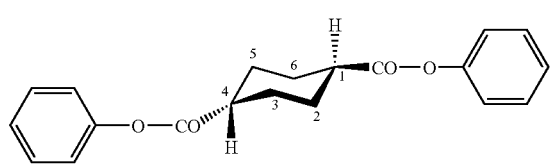
(1-trans)

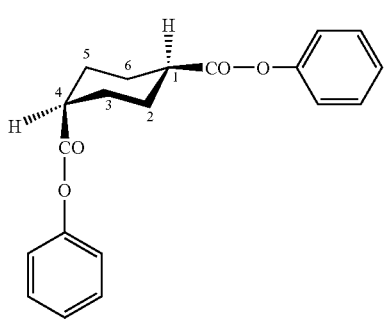
(1-cis)

As above-mentioned, the rod-shaped compound preferably has a linear molecular structure. Therefore, the trans form is preferably to the cis-form. Exemplified compounds (2) and (3) have optical isomers additionally to the geometric isomers (four isomers in total). Regarding the geometric isomers, the trans-form is more preferable than the cis-form. There is no difference between the optical isomers and D-, L- and racemic-body are all employable. In Exemplified compounds (43)-(45), cis-form and transform are formed at the vinylene bond. The trans-form is preferable than the cis-form by the above-described reason.

Two kinds of the rod-shaped compounds each having the maximum absorption at a wavelength shorter than 250 nm may be employed in combination. "Mol. Cryst. Liq. Cryst." vol. 53, p. 229, 1979, ibid. vol. 89, p. 93, 1982, ibid. vol. 145, p. 111, 1987, and ibid. vol. 170, p. 43, 1989, "J. Am. Chem. Soc." Vol. 113, p. 1349, 1991, ibid. vol. 118, p. 5346, 1996, and ibid. vol. 92, p. 1582, 1970, "J. Org. Chem." Vol. 40, p. 420, 1975, and "Tetrahedron" vol. 48, No. 16, p. 3437, 1992 can be cited as relating documents.

As a disc-shaped compound relating to the present invention, a compound having a 1,3,5-triazine ring can be preferably employed.

Among compounds having the 1,3,5-triazine ring, compounds represented by the following Formula (12) are preferable.

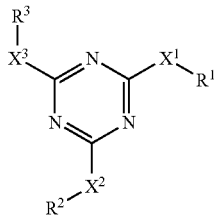

Formula (12)

In Formula (12), $X^1$ is a single bond, an —$NR_4$— group, an —O— atom or an —S— atom; $X^2$ is a single bond, an —$NR_5$— group, an —O— atom or an —S— atom; $X^3$ is a single bond, an —$NR_6$— group, an —O— atom or an —S— atom; $R^1$, $R^2$ and $R^3$ are each an alkyl group, an alkenyl group, an aryl group or a heterocyclic group; and $R_4$, $R_5$ and $R_6$ are each a hydrogen atom, an alkyl group, an alkenyl group, an aryl group or a heterocyclic group. The compound represented by Formula (12) is particularly preferably a melamine compound.

In the melamine compound of Formula (12), it is preferable that the $X^1$, $X^2$ and $X^3$ are each the —$NR_4$—, —$NR_5$— and —$HR_6$—, respectively, or the $X^1$, $X^2$ and $X^3$ are each a single bond and the $R^1$, $R^2$ and $R^3$ are each a heterocyclic group having a free valency at the nitrogen atom thereof. The —$X^1$—$R^1$, —$X^2$—$R^2$ and —$X^3$—$R^3$ are preferably the same substituting group. The $R^1$, $R^2$ and $R^3$ are particularly preferably an aryl group. The $R_4$, $R_5$ and $R_6$ are each particularly preferably a hydrogen atom.

The above alkyl group is more preferably a chain alkyl group than a cyclic alkyl group. A straight-chain alkyl group is more preferably to a branched-chain alkyl group.

The number of carbon atom of the alkyl group is preferably 1-30, more preferably 1-20, further preferably 1-10, further more preferably 1-8, and most preferably 1-6. The alkyl group may have a substituent.

Concrete examples of the substituent include a halogen atom, an alkoxy group such as a methoxy group, an ethoxy group and.an epoxyethyloxy-group, and a acyloxy group such as an acryloyl group and a methacryloyl group. The alkenyl group is more preferably a chain alkenyl group than a cyclic alkenyl group. A straight-chain alkenyl group is preferably to a branched-chain alkenyl group. The number of carbon atom of the alkenyl group is preferably 2-30, more preferably 2-20, further preferably 2-10, further more preferably 2-8, and most preferably 2-6. The alkyl group may have a substituent.

Concrete examples of the substituent include a halogen atom, an alkoxy group such as a methoxy group, an ethoxy group and an epoxyethyloxy group, and an acyloxy group such as an acryloyl group and a methacryloyl group.

The aryl group is preferably a phenyl group or a naphthyl group, and the phenyl group is particularly preferable. The aryl group may have a substituent.

Concrete examples of the substituent include a halogen atom, a hydroxyl group, a cyano group, a nitro group, a carboxyl group, an alkyl group, an alkenyl group, an aryl group, an alkoxy group, an alkenyloxy group, an aryloxy group, an acyloxy group, an alkoxycarbonyl group, an aryloxycarbonyl group, a sulfamoyl group, an alkyl-substituted sulfamoyl group, an alkenyl-substituted sulfamoyl group, an aryl-substituted sulfamoyl group, a sulfonamido group, a carbamoyl group, an alkyl-substituted carbamoyl group, an alkenyl-substituted carbamoyl group, an aryl-substituted carbamoyl group, an amido group, an alkylthio group, an alkenylthio group, an arylthio group and an acyl group. The above alkyl group is the same as the foregoing alkyl group.

The alkyl moiety of the alkoxyl group, acyloxy group, alkoxycarbonyl group, alkyl-substituted sulfamoyl group, sulfonamido group, alkyl-substituted carbamoyl group, amido group, alkylthio group and acyl group is the same as the foregoing alkyl group.

The above alkenyl group is the same as the forgoing alkenyl group.

The alkenyl moiety of the alkenyloxy group, acyloxy group, alkenyloxycarbonyl group, alkenyl-substituted sulfamoyl group, sulfonamido group, alkenyl-substituted carbamoyl group, amido group, alkenylthio group and acyl group is the same as the foregoing alkenyl group.

Concrete examples of the.aryl group include a phenyl group, an α-naphthyl group, a β-naphthyl group, a 4-methoxyphenyl group, a 3,4-diethoxyphenyl group, a 4-octyloxyphenyl group and a 4-dodecyloxyphenyl group.

The aryl moiety of the aryloxy group, acyloxy group, aryloxycarbonyl group, aryl-substituted sulfamoyl group, sulfonamido group, arylsubstituted carbamoyl group, amido group, arylthio group and acyl group is the same as the foregoing aryl group.

The heterocyclic group is preferably has aromaticity, when the $X^1$, $X^2$ and $X^3$ are an —NR— group, an —O— atom or an —S— group.

The heterocycle in the heterocyclic group having aromaticity is usually an unsaturated heterocycle, preferably a heterocycle having highest number of double bond. The heterocycle is preferably a 5-, 6- or 7-member ring, more preferably the 5- or 6-member ring and most preferably the 6-member ring.

The heteroatom in the heterocycle is preferably a nitrogen atom, a sulfur atom or an oxygen atom, and the nitrogen atom is particularly preferable.

As the heterocycle having aromaticity, a pyridine ring such as a 2-pyridyl group and a 4-pyridyl group is particularly preferable. The heterocyclic group may have a substituent. Examples of the substituent are the same as the substituent of the foregoing aryl moiety.

When $X^1$, $X^2$ and $X^3$ are each the single bond, the heterocyclic group preferably has a free valency at the nitrogen atom. The heterocyclic group having the free valency at the nitrogen atom is preferably 5-, 6- or 7-member ring, more preferably the 5- or 6-member ring, and most preferably the 5-member ring. The heterocyclic group may have plural nitrogen atoms.

The heterocyclic group may have a hetero-atom other than the nitrogen atom such as an oxygen atom and a sulfur atom. The heterocyclic group may have a substituent. Concrete examples of the heterocyclic group are the same as those of the aryl moiety.

Examples of the heterocyclic group having the free valency at the nitrogen atom are listed below.

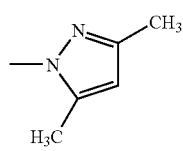 (Hc-1)

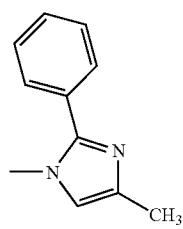 (Hc-2)

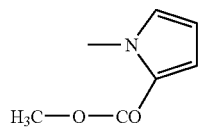 (Hc-3)

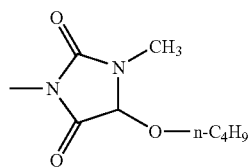 (Hc-4)

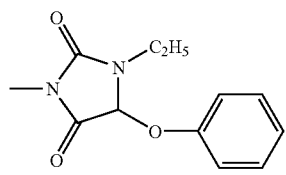 (Hc-5)

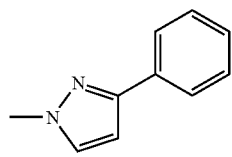 (Hc-6)

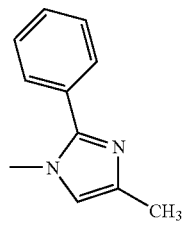 (Hc-7)

-continued

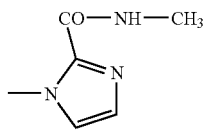 (Hc-8)

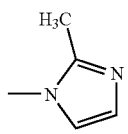 (Hc-9)

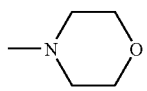 (Hc-10)

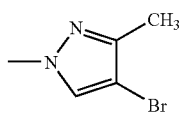 (Hc-11)

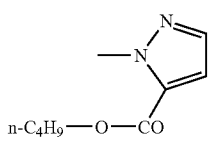 (Hc-12)

The molecular weight of the compound having a 1.3.5-triazine ring is preferably 300-2,000. The boiling point of these compounds is preferably not less than 260° C. The boiling point can be measured by a measuring apparatus available on the market such as TG/DTA100, manufactured by Seiko Denshi Kogyo Co., Ltd.

Concrete examples of the compound having the 1,3,5-triazine ring are shown below.

In the following, plural Rs each represent the same group.

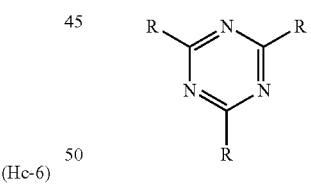 (1)~(12)

(1) Butyl
(2) 2-mthoxy-2-ethoxyethyl
(3) Undecenyl
(4) Phenyl
(5) 4-ethoxycarbonylphenyl
(6) 4-butozyphenyl
(7) p-biphenylyl
(8) 4-pyridyl
(9) 2-naphthyl
(10) 2-methylphenyl
(11) 3,4-dimethoxyphenyl
(12) 2-furyl

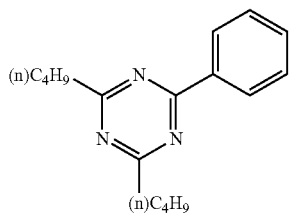

(13)

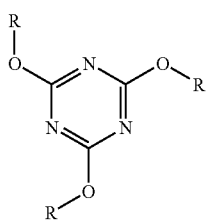

(14)~(79)

(14) phenyl
(15) 3-ethoxycarbonylphenyl
(16) 3-butoxyphenyl
(17) m-biphenyryl
(18) 3-phenylthiophenyl
(19) 3-chlorophenyl
(20) 3-benzoylphenyl
(21) 3-acetoxyphenyl
(22) 3-benzoyloxyphenyl
(23) 3-phenoxycarbonylphenol
(24) 3-methoxyphenyl
(25) 3-anilinophenyl
(26) 3-isobutyrylaminophenyl
(27) 3-phenoxycarbonylaminophenyl
(28) 3-(3-ethylureido)phenyl
(29) 3-(3,3-diethylureido)phenyl
(30) 3-methylphenyl
(31) 3-phenoxyphenyl
(32) 3-hydroxyphenyl
(33) 4-ethoxycarbonylphenyl
(34) 4-butoxyphenyl
(35) p-biphenyryl
(36) 4-phenylthiophenyl
(37) 4-chlorophenyl
(38) 4-benzoylphenyl
(39) 4-actoxyphenyl
(40) 4-benzoyloxyphenyl
(41) 4-phenoxycarbonylphenyl
(42) 4-methoxyphenyl
(43) 4-anilinophenyl
(44) 4-isobutyrylaminophenyl
(45) 4-phenoxycarbonylaminophenyl
(46) 4-(3-ethylureido)phenyl
(47) 4-(3,3-diethylureido)phenyl
(48) 4-methylphenyl
(49) 4-phenoxyphenyl
(50) 4-hydroxyphenyl
(51) 3,4-diethoxycarbonylphenyl
(52) 3,4-dibutoxyphenyl
(53) 3,4-diphenylphenyl
(54) 3,4-diphenylthiophenyl
(55) 3,4-dichlorophenyl
(56) 3,4-dibenzoylphenyl
(57) 3,4-diactoxyphenyl
(58) 3,4-dibenzoyloxyphenyl
(59) 3,4-diphenoxycarbonylphenyl
(60) 3,4-dimethbxyphenyl
(61) 3,4-dianilinophenyl
(62) 3,4-dimethylphenyl.
(63) 3,4-diphenoxyphenyl
(64) 3,4-dihydroxyphenyl
(65) 2-naphthyl
(66) 3,4,5-triethoxycarbonylphenyl
(67) 3,4,5-tributoxyphenyl
(68) 3,4,5-triphenylpenyl
(69) 3,4,5-triphenylthiophenyl
(70) 3,4,5-trichlorophenyl
(71) 3,4,5-tribenzoylphenyl
(72) 3,4,5-triacetoxyphenyl
(73) 3,4,5-tribenzoyloxyphenyl
(74) 3,4,5-triphenoxycarbonylphenyl
(75) 3,4,5-trimethoxyphenyl
(76) 3,4,5-trianilinophenyl
(77) 3,4,5-trimethylphenyl
(78) 3,4,5-triphenoxyphenyl
(79) 3,4,5-trihydroxyphenyl

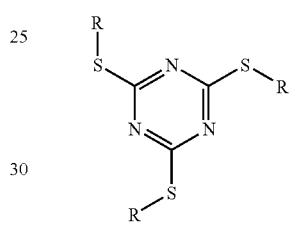

(80)~(145)

(80) phenyl
(81) 3-ethoxycarbonylphenyl
(82) 3-butoxyphenyl
(83) m-biphenyryl
(84) 3-phenylthiophenyl
(85) 3-chlorophenyl
(86) 3-benzoylphenyl
(87) 3-acetoxyphenyl
(88) 3-benzoyloxyphenyl
(89) 3-phenoxycarbonylphenol
(90) 3-methoxyphenyl
(91) 3-anilinophenyl
(92) 3-isobutyrylaminophenyl
(93) 3-phenoxycarbonylaminophenyl
(94) 3-(3-ethylureido)phenyl
(95) 3-(3,3-diethylureido)phenyl
(96) 3-methylphenyl
(97) 3-phenoxyphenyl
(98) 3-hydroxyphenyl
(99) 4-ethoxycarbonylphenyl
(100) 4-butoxyphenyl
(101) p-biphenyryl
(102) 4-phenylthiophenyl
(103) 4-chlorophenyl
(104) 4-benzoylphenyl
(105) 4-actoxyphenyl
(106) 4-benzoyloxyphenyl
(107) 4-phenoxycarbonylphenyl
(108) 4-methoxyphenyl
(109) 4-anilinophenyl
(110) 4-isobutyrylaminophenyl (111) 4-phenoxycarbonylaminophenyl
(112) 4-(3-ethylureido)phenyl
(113) 4-(3,3-diethylureido)phenyl
(114) 4-methylphenyl
(115) 4-phenoxyphenyl
(116) 4-hydroxyphenyl
(117) 3,4-diethoxycarbonylphenyl
(118) 3,4-dibutoxyphenyl
(119) 3,4-diphenylphenyl
(120) 3,4-diphenylthiophenyl
(121) 3,4-dichlorophenyl
(122) 3,4-dibenzoylphenyl
(123) 3,4-diactoxyphenyl
(124) 3,4-dibenzoyloxyphenyl
(125) 3,4-diphenoxycarbonylphenyl
(126) 3,4-dimethoxyphenyl
(127) 3,4-dianilinophenyl
(128) 3,4-dimethylphenyl
(129) 3,4-diphenoxyphenyl
(130) 3,4-dihydroxyphenyl
(131) 2-naphthyl
(132) 3,4,5-triethoxycarbonylphenyl
(133) 3,4,5-tributoxyphenyl
(134) 3,4,5-triphenylpenyl
(135) 3,4,5-triphenylthiophenyl
(136) 3,4,5-trichlorophenyl
(137) 3,4,5-tribenzoylphenyl
(138) 3,4,5-triacetoxyphenyl
(139) 3,4,5-tribenzoyloxyphenyl
(140) 3,4,5-triphenoxycarbonylphenyl
(141) 3,4,5-trimethoxyphenyl
(142) 3,4,5-trianilinophenyl
(143) 3,4,5-trimethylphenyl
(144) 3,4,5-triphenoxyphenyl
(145) 3,4,5-trihydroxyphenyl

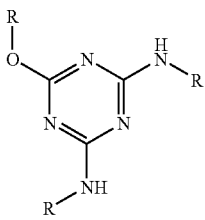

(146)~(164)

(146) phenyl
(147) 4-ethoxycarbonylphenyl
(148) 4-butoxyphenyl
(149) p-biphenyryl
(150) 4-phenylthiophenyl
(151) 4-chlorophenyl
(152) 4-benzoylphenyl
(153) 4-acetoxyphenyl
(154) 4-benzoyloxyphenyl
(155) 4-phenoxycarbonylphenol
(156) 4-methoxyphenyl
(157) 4-anilinophenyl
(158) 4-isobutyrylaminophenyl
(159) 4-phenoxycarbonylaminophenyl
(160) 4-(3-ethylureido)phenyl
(161) 4-(3,3-diethylureido)phenyl
(162) 4-methylphenyl
(163) 4-phenoxyphenyl
(164) 4-hydroxyphenyl

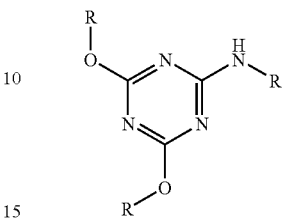

(165)~(183)

(165) phenyl
(166) 4-ethoxycarbonylphenyl
(167) 4-butoxyphenyl
(168) p-biphenyryl
(169) 4-phenylthiophenyl
(170) 4-chlorophenyl
(171) 4-benzoylphenyl
(172) 4-acetoxyphenyl
(173) 4-benzoyloxyphenyl
(174) 4-phenoxycarbonylphenol
(175) 4-methoxyphenyl
(176) 4-anilinophenyl
(177) 4-isobutyrylaminophenyl
(178) 4-phenoxycarbonylaminophenyl
(179) 4-(3-ethylureido)phenyl
(180) 4-(3,3-diethylureido)phenyl
(181) 4-methylphenyl
(182) 4-phenoxyphenyl
(183) 4-hydroxyphenyl

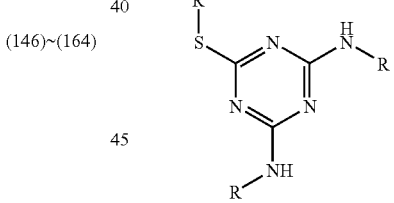

(184)~(202)

(184) phenyl
(185) 4-ethoxycarbonylphenyl
(186) 4-butoxyphenyl
(187) p-biphenyryl
(188) 4-phenylthiophenyl
(189) 4-chlorophenyl
(190) 4-benzoylphenyl
(191) 4-acetoxyphenyl
(192) 4-benzoyloxyphenyl
(193) 4-phenoxycarbonylphenol
(194) 4-methoxyphenyl.
(195) 4-anilinophenyl
(196) 4-isobutyrylaminophenyl
(197) 4-phenoxycarbonylaminophenyl
(198) 4-(3-ethylureido)phenyl
(199) 4-(3,3-diethylureido)phenyl
(200) 4 methylphenyl

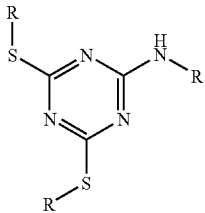

(203) phenyl
(204) 4-ethoxycarbonylphenyl
(205) 4-butoxyphenyl
(206) p-biphenyryl
(207) 4-phenylthiophenyl
(208) 4-chlorophenyl
(209) 4-benzoylphenyl
(210) 4-acetoxyphenyl
(211) 4-benzoyloxyphenyl
(212) 4-phenoxycarbonylphenol
(213) 4-methoxyphenyl
(214) 4-anilinophenyl
(215) 4-isobutyrylaminophenyl
(216) 4-phenoxycarbonylaminophenyl
(217) 4-(3-ethylureido)phenyl
(218) 4-(3,3-diethylureido)phenyl
(219) 4-methylphenyl
(220) 4-phenoxyphenyl
(221) 4-hydroxyphenyl

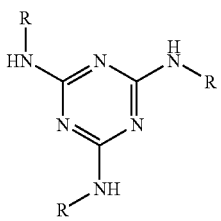

(222) phenyl
(223) 4-butylphenyl
(224) 4-2-methoxy-2-ethoxyethyl)phenyl
(225) 4-(5-nenenyl)phenyl
(226) p-biphenyryl
(227) 4-ethoxycarbonylphenyl
(228) 4-butoxyphenyl
(229) 4-methylphenyl
(230) 4-chlorophenyl
(231) 4-phenylthiophenyl
(232) 4-benzoylphenyl
(233) 4-aceoxyphenyl
(234) 4-benzoyloxyphenyl
(235) 4-phenoxycarbonylphenyl
(236) 4-methoxyphenyl
(237) 4-anilinophenyl
(238) 4-isobutyrylaminophenyl
(239) 4-phenoxycarbonylaminophenyl
(240) 4-(3-ethylureido)phenyl
(241) 4-(3,3-diethylureido)phenyl
(242) 4-phenoxyphenyl
(243) 4-hydroxyphenyl
(244) 3-butylphenyl
(245) 3-(2-methoxy-2-ethoxyethyl)phenyl
(246) 3-(5-nonenyl)phenyl
(247) m-biphenyryl
(248) 3-ethoxycarbonylphenyl
(249) 3-butoxyphenyl
(250) 3-methylphenyl
(251) 3-chlorophenyl
(252) 3-phenylthiophenyl
(253) 3-benzoylphenyl
(254) 3-actoxyphenyl
(255) 3-benzoyloxyphenyl
(256) 3-phenoxycarbonylphenyl
(257) 3-methoxyphenyl
(258) 3-anilinophenyl
(259) 3-isobutyrylaminophenyl
(260) 3-phenoxycarbonylaminophenyl
(261) 3-(3-ethylureido)phenyl
(262) 3-(3,3-diethylureido)phenyl
(263) 3-phenoxyphenyl
(264) 3-hydroxyphenyl
(265) 2-butylphenyl
(266) 2-(2-methoxy-2-ethoxyethyl)phenyl
(267) 2-(5-nonenyl)phenyl
(268) o-biphenyryl
(269) 2-ethoxycarbonylphenyl
(270) 2-butoxyphenyl
(271) 2-methylphenyl
(272) 2-chlorophenyl
(273) 2-phenylthiophenyl
(274) 2-benzoylphenyl
(275) 2-aceoxyphenyl
(276) 2-benzoyloxyphenyl
(277) 4-phenoxycarbonylphenyl
(278) 2-methoxyphenyl
(279) 2-anilinophenyl
(280) 2-isobutyrylaminophenyl
(281) 2-phenoxycarbonyl aminophenyl
(282) 2-(3-ethylureido)phenyl
(283) 2-(3,3-dimethylureido)phenyl
(284) 2-phenoxyphenyl
(285) 2-hydroxyphenyl
(286) 3,4-dibutylphenyl
(287) 3,4-di(2-methoxy-2-ethoxyethyl)phenyl
(288) 3,4-diphenylphenyl
(289) 3,4-diethoxycarbonylphenyl
(290) 3,4-didodecyloxyphenyl
(291) 3,4-dimethylphenyl
(292) 3,4-dichlorophenyl
(293) 3,4-dibenzoylphenyl
(294) 3,4-diacetoxyphenyl
(295) 3,4-dimethoxyphenyl
(296) 3,4-di-N-methylaminophenyl
(297) 3,4-diisobutyrylaminophenyl
(298) 3,4-diphenoxyphenyl
(299) 3,4-dihydroxyphenyl
(300) 3,5-dibutylphenyl
(301) 3,5-di(2-methoxy-2-ethoxyethyl)phenyl
(302) 3,5-diphenylphenyl
(303) 3,5-diethoxycarbonylphenyl
(304) 3,5-didodecyloxyphenyl
(305) 3,5-dimethylphenyl (306) 3,5-dichlorophenyl
(307) 3,5-dibenzoylphenyl
(308) 3,5-diacetoxyphenyl
(309) 3,5-dimethoxyphenyl
(310) 3,5-di-N-methylaminophenyl
(311) 3,5-diisobutyrylaminophenyl
(312) 3,5-diphenoxyphenyl
(313) 3,5-dihydroxyphenyl
(314) 2,4-dibutylphenyl
(315) 2,4-di(2-methoxy-2-ethoxyethyl)phenyl
(316) 2,4-diphenylphenyl
(317) 2,4-diethoxycarbonylphenyl
(318) 2,4-didodecyloxyphenyl
(319) 2,4-dimethylphenyl
(320) 2,4-dichlorophenyl
(321) 2,4-dibenzoylphenyl
(322) 2,4-diacetoxyphenyl
(323) 2,4-dimethoxyphenyl
(324) 2,4-di-N-methylaminophenyl
(325) 2,4-diisobutyrylaminophenyl
(326) 2,4-diphenoxyphenyl
(327) 2,4-dihydroxyphenyl
(328) 2,3-dibutylphenyl
(301) 3,5-di(2-methoxy-2-ethoxyethyl)phenyl
(302) 3,5-diphenylphenyl
(303) 3,5-diethoxycarbonylphenyl
(304) 3,5-didodecyloxyphenyl
(305) 3,5-dimethylphenyl
(306) 3,5-dichlorophenyl
(307) 3,5-dibenzoylphenyl
(308) 3,5-diacetoxyphenyl
(309) 3,5-dimethoxyphenyl
(310) 3,5-di-N-methylaminophenyl
(311) 3,5-diisobutyrylaminophenyl
(312) 3,5-diphenoxyphenyl
(313) 3,5-dihydroxyphenyl
(314) 2,4-dibutylphenyl
(315) 2,4-di(2-methoxy-2-ethoxyethyl)phenyl
(316) 2,4-diphenylphenyl
(317) 2,4-diethoxycarbonylphenyl
(318) 2,4-didodecyloxyphenyl
(319) 2,4-dimethylphenyl
(320) 2,4-dichlorophenyl
(321) 2,4-dibenzoylphenyl
(322) 2,4-diacetoxyphenyl
(323) 2,4-dimethoxyphenyl
(324) 2,4-di-N-methylaminophenyl
(325) 2,4-diisobutyrylaminophenyl
(326) 2,4-diphenoxyphenyl
(327) 2,4-dihydroxyphenyl
(328) 2,3-dibutylphenyl
(329) 2,3-di(2-methoxy-2-ethoxyethyl)phenyl
(330) 2,3-diphenylphenyl
(331) 2,3-diethoxycarbonylphenyl
(332) 2,3-didodecyloxyphenyl
(333) 2,3-dimethylphenyl
(334) 2,3-dichlorophenyl
(335) 2,3-dibenzoylphenyl
(336) 2,3-diacetoxyphenyl
(337) 2,3-dimethoxyphenyl
(338) 2,3-di-N-methylaminophenyl
(339) 2,3-diisobutyrylaminophenyl
(340) 2,3-diphenoxyphenyl
(341) 2,3-dihydroxyphenyl
(342) 2,6-dibutylphenyl
(343) 2,6-di(2-methoxy-2-ethoxyethyl)phenyl
(344) 2,6-diphenylphenyl
(345) 2,6-diethoxycarbonylphenyl
(346) 2,6-didodecyloxyphenyl
(347) 2,6-dimethylphenyl
(348) 2,6-dichlorophenyl
(349) 2,6-dibenzoylphenyl
(350) 2,6-diacetoxyphenyl
(351) 2,6-dimethoxyphenyl
(352) 2,6-di-N-methylaminophenyl
(353) 2,6-diisobutyrylaminophenyl
(354) 2,6-diphenoxyphenyl
(355) 2,6-dihydroxyphenyl
(356) 3,4,5-tributylphenyl
(357) 3,4,5-tri(2-methoxy-2-ethoxyethyl)phenyl
(358) 3,4,5-triphenylphenyl
(359) 3,4,5-triethoxycarbonylphenyl
(360) 3,4,5-tridodecyloxyphenyl
(361) 3,4,5-trimethylphenyl
(362) 3,4,5-trichlorophenyl
(363) 3,4,5-tribenzoylphenyl
(364) 3,4,5-triacetoxyphenyl
(365) 3,4,5-trimethoxyphenyl
(366) 3,4,5-tri-N-methylaminophenyl
(367) 3,4,5-triisobutyrylaminophenyl
(368) 3,4,5-triphenoxyphenyl
(369) 3,4,5-trihydoxyphenyl
(370) 2,4,6-tributylphenyl
(371) 2,4,6-tri(2-methoxy-2-ethoxyethyl)phenyl
(372) 2,4,6-triphenylphenyl
(373) 2,4,6-triethoxycarbonylphenyl
(374) 2,4,6-tridodecyloxyphenyl
(375) 2,4,6-trimethylphenyl
(376) 2,4,6-trichlorophenyl
(377) 2,4,6-tribenzoylphenyl
(378) 2,4,6-triacetoxyphenyl
(379) 2,4,6-trimethoxyphenyl
(380) 2,4,6-tri-N-methylaminophenyl
(381) 2,4,6-triisobutyrylamino phenyl
(382) 2,4,6-triphenoxyphenyl
(383) 2,4,6-trihydoxyphenyl
(384) pentafluorophenyl
(385) pentachlorophenyl
(386) pentamethoxyphenyl
(387) 6-N-methylsulfamoyl-8-methoxy-2-naphthyl
(388) 5-N-methylsulfamoyl-2-naphthyl
(389) 6-N-phenylsufamoyl-2-naphtyl
(390) 5-ethoxy-7-N-methylsulfamoyl-2-naphthyl
(391) 3-methoxy-2-naphthyl
(392) 1-ethoxy-2-naphthyl
(393) 6-N-phenylsulfamoyl-8-methoxy-2-naphthyl
(394) 5-methoxy-7-N-phenylsulfamoyl-2-naphthyl
(395) 1-(4-methylphenyl)-2-naphthyl
(396) 6,8-di-N-methylsufamoyl-2-naphthyl
(397) 6-N-2-acetoxyethylsulfamoyl-8-methoxy-2-naphthyl
(398) 5-acetoxy-7-N-phenylsulfamoyl-2-naphthyl
(399) 3-benzoyloxy-2-naphthyl
(400) 5-acetylamino-1-naphthyl
(401) 2-methoxy-1-naphthyl
(402) 4-phenoxy-1-naphthyl
(403) 5-N-methylsulfamoyl-1-naphthyl
(404) 3-N-methylcarbamoyl-4-hydroxy-1-naphthyl
(405) 5-methoxy-6-N-ethylsulfamoyl-1-naphthyl (406) 7-tetradecyloxy-1-naphthyl
(407) 4-(4-methylphenoxy)-1-naphthyl
(408) 6-N-methylsulfamoyl-1-naphthyl
(409) 3-N,N-dimethylcarbamoyl-4-methoxy-1-naphthyl
(410) 5-methoxy-6-N-benzylsulfamoyl-1-naphthyl
(411) 3,6-di-N-phenylsulfamoyl-1-naphthyl
(412) methyl
(413) ethyl
(414) butyl
(415) octyl
(416) dodecyl
(417) 2-butoxy-2-ethoxyethyl
(418) benzyl
(419) 4-methoxybenzyl
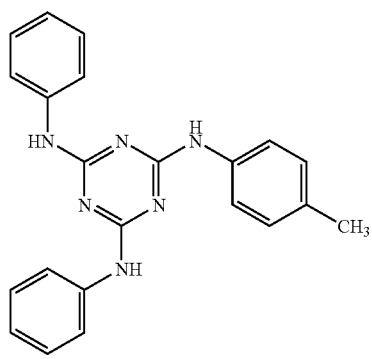
(420)
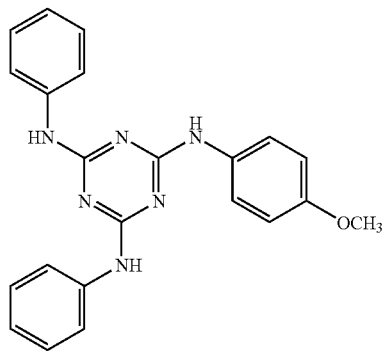
(420')
-continued
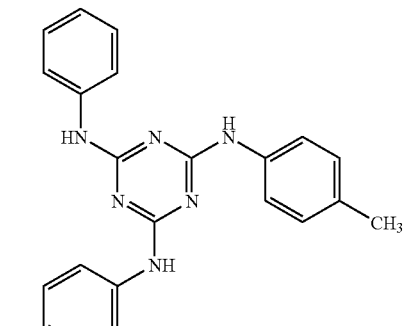
(422)
(423)
(424)~(426)
(424) methyl
(425) phenyl
(426) butyl
(421)
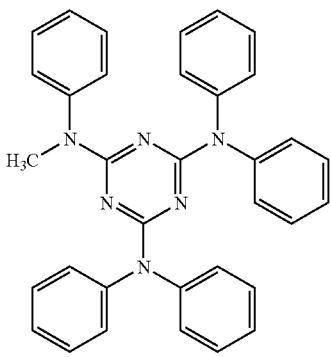
(427)

-continued
(428)
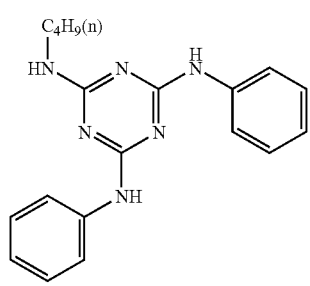
(429)
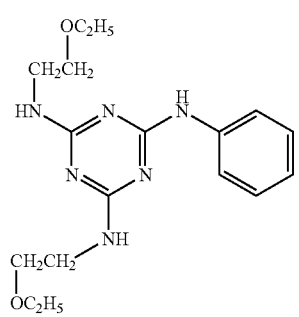
(430)~(437)
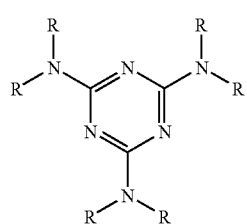
(430) methyl
(431) ethyl
(432) butyl
(433) octyl
(434) dodecyl
(435) 2-butoxy-2-ethoxyethyl
(436) benzyl
(437) 4-methoxybenzyl
(438)
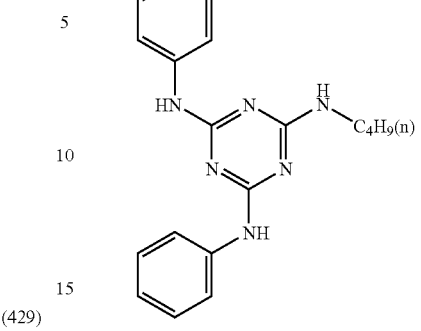
-continued
(439)
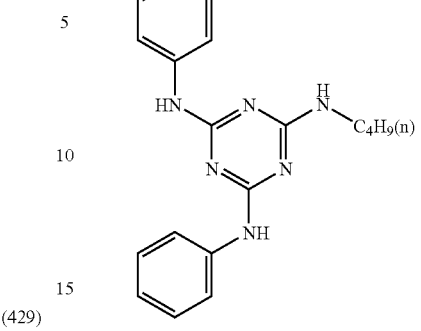
(440)
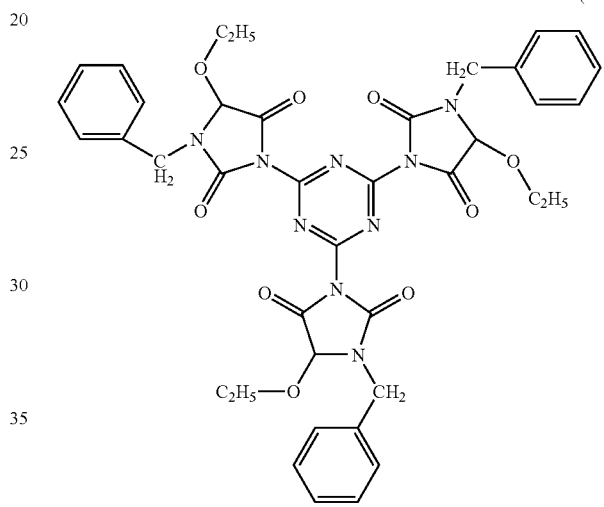
(441)
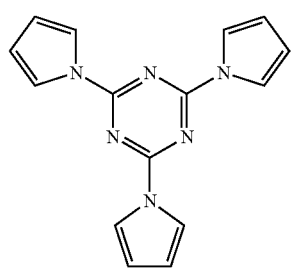
(442)
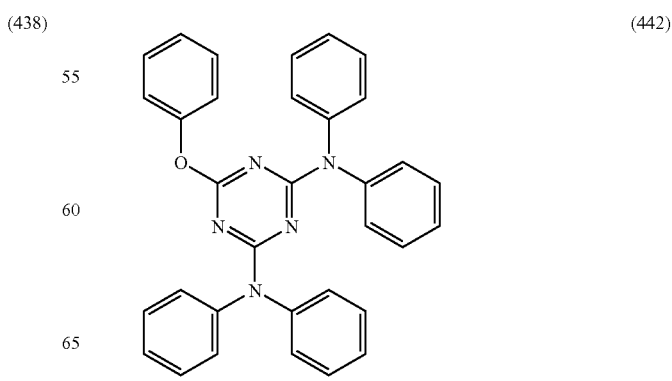

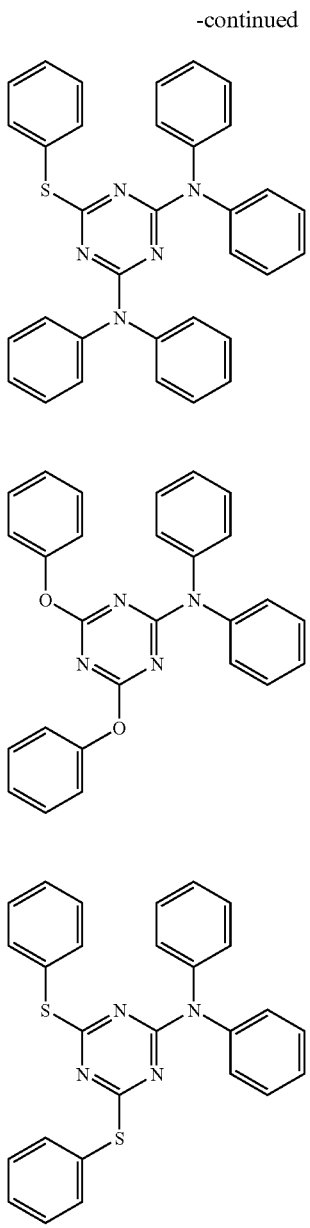

(443)

(444)

(445)

In the present invention, employed as a compound having a 1,3,5-triazine ring may be melamine polymers. It is preferable that the above melamine polymers are synthesized employing a polymerization reaction of the melamine compounds represented by Formula (13) below with carbonyl compounds.

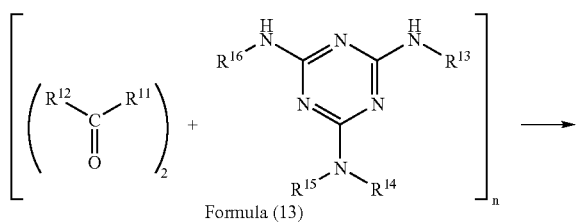

Formula (13)

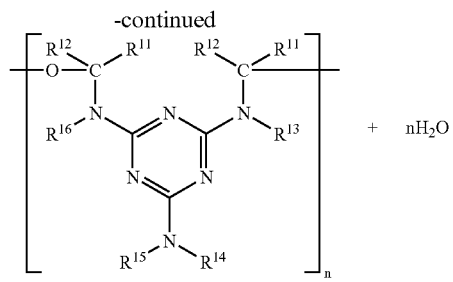

+ nH₂O

In the above synthesis reaction scheme, $R^{11}$, $R^{12}$, $R^{13}$, $R^{14}$, $R^{15}$, and $R^{16}$ each represent a hydrogen atom, an alkyl group, an alkenyl group, an aryl group or a heterocyclyl group.

The above alkyl group, alkenyl group, aryl group, and heterocyclyl group, as well as those substituents are as defined for each group and also the substituents described in above Formula (12).

The polymerization reaction of melamine compounds with carbonyl compounds is performed employing the same synthesis method as for common melamine resins (for example, a melamine-formaldehyde resin). Further, employed may be commercially available melamine polymers (being melamine resins).

The molecular weight of melamine polymers is preferably 2,000-400,000. Specific examples of repeating units of melamine polymers are shown below.

(MP-1)~(MP-50)

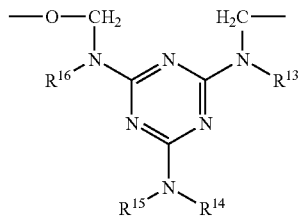

MP-1: $R^{13}$, $R^{14}$, $R^{15}$, $R^{16}$: CH₂OH
MP-2: $R^{13}$, $R^{14}$, $R^{15}$, $R^{16}$: CH₂OCH₃
MP-3: $R^{13}$, $R^{14}$, $R^{15}$, $R^{16}$: CH₂O-i-C₄H₉
MP-4: $R^{13}$, $R^{14}$, $R^{15}$, $R^{16}$: CH₂O-n-C₄H₉
MP-5: $R^{13}$, $R^{14}$, $R^{15}$, $R^{16}$: CH₂NHCOCH=CH₂
MP-6: $R^{13}$, $R^{14}$, $R^{15}$, $R^{16}$: CH₂NHCO(CH₂)₇CH=CH(CH₂)₇CH₃
MP-7: $R^{13}$, $R^{14}$, $R^{15}$: CH₂OH; $R^{16}$ CH₂OCH₃
MP-8: $R^{13}$, $R^{14}$, $R^{16}$: CH₂OH; $R^{15}$: CH₂OCH₃
MP-9: $R^{13}$, $R^{14}$: CH₂OH; $R^{15}$, $R^{16}$: CH₂OCH₃
MP-10: $R^{13}$, $R^{16}$: CH₂OH; $R^{14}$, $R^{15}$: CH₂OCH₃
MP-11: $R^{13}$: CH₂OH; $R^{14}$, $R^{15}$, $R^{16}$: CH₂OCH₃
MP-12: $R^{13}$, $R^{14}$, $R^{16}$: CH₂OCH₃; $R^{15}$: CH₂OH
MP-13: $R^{13}$, $R^{16}$: CH₂OCH₃; $R^{14}$, $R^{15}$: CH₂OH
MP-14: $R^{13}$, $R^{13}$, $R^{15}$: CH₂OH; $R^{16}$: CH₂O-i-C₄H₉
MP-15: $R^{13}$, $R^{14}$, $R^{16}$: CH₂OCH₃; $R^{15}$: CH₂O-i-C₄H₉
MP-16: $R^{13}$, $R^{14}$: CH₂OH; $R^{15}$, $R^{16}$: CH₂O-i-C₄H₉
MP-17: $R^{13}$, $R^{16}$: CH₂OH; $R^{14}$, $R^{15}$: CH₂O-i-C₄H₉
MP-18: $R^{13}$: CH₂OH; $R^{14}$, $R^{15}$, $R^{16}$: CH₂O-i-C₄H₉
MP-19: $R^{13}$, $R^{14}$, $R^{16}$: CH₂O-i-C₄H₉; $R^{15}$: CH₂OH
MP-20: $R^{13}$, $R^{16}$: CH₂O-i-C₄H₉; $R^{14}$, $R^{15}$: CH₂OH
MP-21: $R^{13}$, $R^{14}$, $R^{15}$: CH₂OH; $R^{16}$: CH₂O-n-C₄H₉
MP-22: $R^{13}$, $R^{14}$, $R^{16}$: CH₂OH; $R^{15}$: CH₂O-n-C₄H₉
MP-23: $R^{13}$, $R^{14}$: CH₂OH; $R^{15}$, $R^{16}$: CH₂O-n-C₄H₉
MP-24: $R^{13}$, $R^{16}$: CH₂OH; $R^{14}$, $R^{15}$: CH₂O-n-C₄H₉
MP-25: $R^{13}$: CH₂OH; $R^{14}$, $R^{15}$, $R^{16}$: CH₂O-n-C₄H₉

MP-26: $R^{13}, R^{14}, R^{16}$: $CH_2O$-n-$C_4H_9$; $R^{15}$: $CH_2OH$
MP-27: $R^{13}, R^{16}$: $CH_2O$-n-$C_4H_9$; $R^{14}, R^{15}$: $CH_2OH$
MP-28: $R^{13}, R^{14}$: $CH_2OH$; $R^{15}$: $CH_2OCH_3$; $R^{16}$: $CH_2O$-n-$C_4H_9$
MP-29: $R^{13}, R^{14}$: $CH_2OH$; $R^{15}$: $CH_2$-n-$C_4H_9$; $R^{16}$: $CH_2OCH_3$
MP-30: $R^{13}, R^{16}$: $CH_2OH$; $R^{14}$: $CH_2OCH_3$; $R^{15}$: $CH_2O$-n-$C_4H_9$
MP-31: $R^{13}$: $CH_2OH$; $R^{14}, R^{15}$: $CH_2OCH_3$; $R^{16}$: $CH_2O$-n-$C_4H_9$
MP-32: $R^{13}$: $CH_2OH$; $R^{14}, R^{16}$: $CH_2OCH_3$; $R^{15}$: $CH_2O$-n-$C_4H_9$
MP-33: $R^{13}$: $CH_2OH$; $R^{14}$: $CH_2OCH_3$; $R^{15}, R^{16}$: $CH_2O$-n-$C_4H_9$
MP-34: $R^{13}$: $CH_2OH$; $R^{14}, R^{15}$: $CH_2O$-n-$C_4H_9$; $R^{16}$: $CH_2OCH_3$
MP-35: $R^{13}, R^{14}$: $CH_2OCH_3$; $R^{15}$: $CH_2OH$; $R^{16}$: $CH_2O$-n-$C_4H_9$
MP-36: $R^{13}, R^{16}$: $CH_2OCH_3$; $R^{14}$: $CH_2OH$; $R^{15}$: $CH_2O$-n-$C_4H_9$
MP-37: $R^{13}$: $CH_2OCH_3$; $R^{14}, R^{15}$: $CH_2OH$; $R^{16}$: $CH_2O$-n-$C_4H_9$
MP-38: $R^{13}, R^{16}$: $CH_2O$-n-$C_4H_9$; $R^{14}$: $CH_2OCH_3$; $R^{15}$: $CH_2OH$
MP-39: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$
MP-40: $R^{13}$: $CH_2OH$; $R^{14}$: $CH_2OCH_3$; $R^{15}$: $CH_2NHCOCH=CH_2$; $R^{16}$ $CH_2O$-n-$C_4H_9$
MP-41: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$
MP-42: $R^{13}$ $CH_2OCH_3$; $R^{14}$: $CH_2OH$; $R^{15}$: $CH_2O$-n-$C_4H_9$; $R^{16}$: $CH_2NHCOCH=CH_2$
MP-43: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$
MP-44: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$
MP-45: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-46: $R^{13}$: $CH_2OH$; $R^{14}$: $CH_2OCH_3$; $R^{15}$: $CH_2NHCO=CH_2$; $R^{16}$: $CH_2NHCO(CH_2)_7CH=CH(CH_2)_7CH_3$
MP-47: $R^{13}$: $CH_2OH$; $R^{14}$: $CH_2NHCO(CH_2)_7CH=CH(CH_2)_7CH_3$; $R^{15}$ $CH_2NHCOCH=CH_2$; $R^{16}$: $CH_2OCH_3$
MP-48: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-49: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-50: $R^{13}$: $CH_2NHCO(CH_2)_7CH=CH(CH_2)_7CH_3$; $R^{14}$: $CH_2OCH_3$; $R^{15}$ $CH_2OH$; $R^{16}$: $CH_2NHCOCH=CH_2$

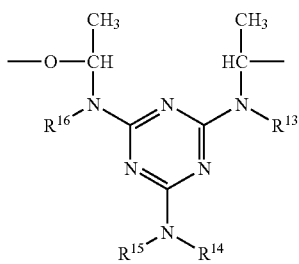

(MP-51)~(MP-100)

MP-51: $R^{13}, R^{14}, R^{15}, R^{16}$: $CH_2OH$
MP-52: $R^{13}, R^{14}, R^{15}, R^{16}$: $CH_2OCH_3$
MP-53: $R^{13}, R^{14}, R^{15}, R^{16}$: $CH_2O$-i-$C_4H_9$
MP-54: $R^{13}, R^{14}, R^{15}, R^{16}$: $CH_2O$-n-$C_4H_9$
MP-55: $R^{13}, R^{14}, R^{15}, R^{16}$: $CH_2NHCOCH=CH_2$
MP-56: $R^{13}, R^{14}, R^{15}, R^{16}$: $CH_2NHCO(CH_2)_7CH=CH(CH_2)_7CH_3$
MP-57: $R^{13}, R^{14}, R^{15}$: $CH_2OH$; $R^{16}$ $CH_2OCH_3$
MP-58: $R^{13}, R^{14}, R^{16}$: $CH_2OH$; $R^{15}$: $CH_2OCH_3$,
MP-59: $R^{13}, R^{14}$: $CH_2OH$; $R^{15}, R^{16}$: $CH_2OCH_3$
MP-60: $R^{13}, R^{16}$: $CH_2OH$; $R^{14}, R^{15}$: $CH_2OCH_3$
MP-61: $R^{13}$: $CH_2OH$; $R^{14}, R^{15}, R^{16}$: $CH_2OCH_3$
MP-62: $R^{13}, R^{14}, R^{16}$: $CH_2OCH_3$; $R^{15}$: $CH_2OH$
MP-63: $R^{13}, R^{16}$: $CH_2OCH_3$; $R^{14}, R^{15}$: $CH_2OH$
MP-64: $R^{13}, R^{14}, R^{15}$: $CH_2OH$; $R^{16}$: $CH_2O$-i-$C_4H_9$
MP-65: $R^{13}, R^{14}, R^{16}$: $CH_2OCH_3$; $R^{15}$: $CH_2O$-i-$C_4H_9$
MP-66: $R^{13}, R^{14}$: $CH_2OH$; $R^{15}, R^{16}$: $CH_2O$-i-$C_4H_9$
MP-67: $R^{13}, R^{16}$: $CH_2OH$; $R^{14}, R^{15}$: $CH_2O$-i-$C_4H_9$
MP-68: $R^{13}$: $CH_2OH$; $R^{14}, R^{15}, R^{16}$: $CH_2O$-i-$C_4H_9$
MP-69: $R^{13}, R^{14}, R^{16}$: $CH_2O$-i-$C_4H_9$; $R^{15}$: $CH_2OH$
MP-70: $R^{13}, R^{16}$: $CH_2O$-i-$C_4H_9$; $R^{14}, R^{15}$: $CH_2OH$
MP-71: $R^{13}, R^{14}, R^{15}$: $CH_2OH$; $R^{16}$: $CH_2O$-n-$C_4H_9$
MP-72: $R^{13}, R^{14}, R^{16}$: $CH_2OH$; $R^{15}$: $CH_2O$-n-$C_4H_9$
MP-73: $R^{13}, R^{14}$: $CH_2OH$; $R^{15}, R^{16}$: $CH_2O$-n-$C_4H_9$
MP-74: $R^{13}, R^{16}$: $CH_2OH$; $R^{14}, R^{15}$: $CH_2O$-n-$C_4H_9$
MP-75: $R^{13}$: $CH_2OH$; $R^{14}, R^{15}, R^{16}$: $CH_2O$-n-$C_4H_9$
MP-76: $R^{13}, R^{14}, R^{16}$: $CH_2O$-n-$C_4H_9$; $R^{15}$: $CH_2OH$
MP-77: $R^{13}, R^{16}$: $CH_2O$-n-$C_4H_9$; $R^{14}, R^{15}$: $CH_2OH$
MP-78: $R^{13}, R^{14}$: $CH_2OH$; $R^{15}$: $CH_2OCH_3$; $R^{16}$: $CH_2O$-n-$C_4H_9$
MP-79: $R^{13}, R^{14}$: $CH_2OH$; $R^{15}$: $CH_2$-n-$C_4H_9$; $R^{16}$: $CH_2OCH_3$
MP-80: $R^{13}, R^{16}$: $CH_2OH$; $R^{14}$: $CH_2OCH_3$; $R^{15}$: $CH_2O$-n-$C_4H_9$
MP-81: $R^{13}$: $CH_2OH$; $R^{14}, R^{15}$: $CH_2OCH_3$; $R^{16}$: $CH_2O$-n-$C_4H_9$
MP-82: $R^{13}$: $CH_2OH$: $R^{14}, R^{16}$: $CH_2OCH_3$; $R^{15}$: $CH_2O$-n-$C_4H_9$
MP-83: $R^{13}$: $CH_2OH$; $R^{14}$: $CH_2OCH_3$; $R^{15}, R^{16}$: $CH_2O$-n-$C_4H_9$
MP-84: $R^{13}$: $CH_2OH$: $R^{14}, R^{15}$: $CH_2O$-n-$C_4H_9$; $R^{16}$: $CH_2OCH_3$
MP-85: $R^{13}, R^{14}$: $CH_2OCH_3$; $R^{15}$: $CH_2OH$; $R^{16}$: $CH_2O$-n-$C_4H_9$
MP-86: $R^{13}, R^{16}$: $CH_2OCH_3$; $R^{14}$: $CH_2OH$; $R^{15}$: $CH_2O$-n-$C_4H_9$
MP-87: $R^{13}$: $CH_2OCH_3$; $R^{14}, R^{15}$: $CH_2OH$; $R^{16}$: $CH_2O$-n-$C_4H_9$
MP-88: $R^{13}, R^{16}$: $CH_2O$-n-$C_4H_9$; $R^{14}$: $CH_2OCH_3$; $R^{15}$: $CH_2OH$
MP-89: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$
MP-90: $R^{13}$: $CH_2OH$; $R^{14}$: $CH_2OCH_3$; $R^{15}$: $CH_2NHCOCH=CH_2$; $R^{16}$ $CH_2O$-n-$C_4H_9$
MP-91: $R^{13}$: $CH_2OH$; $R^{14}$: $CH_2O$-n-$C_4H_9$; $R^{15}$-$CH_2NHCOCH=CH_2$; $R^{16}$: $CH_2OCH_3$
MP-92: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$
MP-93: $R^{13}$ $CH_2OCH_3$; $R^{14}$: $CH_2OH$; $R^{15}$: $CH_2NHCOCH=CH_2$; $R^{16}$: $CH_2O$-n-$C_4H_9$
MP-94: $R^{13}$: $CH_2O$-n-$C_4H_9$; $R^{14}$: $CH_2OCH_3$; $R^{15}$, $CH_2OH$; $R^{16}$: $CH_2NHCOCH=CH_2$
MP-95: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-96: $R^{13}$: $CH_2OH$; $R^{14}$: $CH_2OCH_3$; $R^{15}$: $CH_2NHCO=CH_2$; $R_{16}$: $CH_2NHCO(CH_2)_7CH=CH(CH_2)_7CH_3$
MP-97: $R^{13}$: $CH_2OH$; $R^{14}$: $CH_2NHCO(CH_2)_7CH=CH(CH_2)_7CH_3$; $R^{15}$ $CH_2NHCOCH=CH_2$:; $R^{16}$: $CH_2OCH_3$

MP-98: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$

MP-99: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$

MP-100: $R^{13}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$

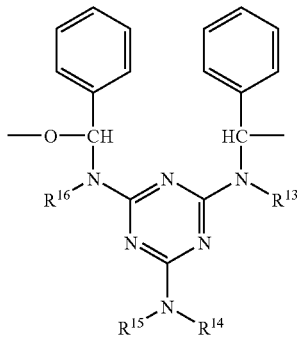

(MP-101)~(MP-150)

MP-101: $R^{13}$, $R^{14}$, $R^{15}$, $R^{16}$: $CH_2OH$
MP-102: $R^{13}$, $R^{14}$, $R^{15}$, $R^{16}$: $CH_2OCH_3$
MP-103: $R^{13}$, $R^{14}$, $R^{15}$, $R^{16}$: $CH_2O$-i-$C_4H_9$
MP-104: $R^{13}$, $R^{14}$, $R^{15}$, $R^{16}$: $CH_2O$-n-$C_4H_9$
MP-105: $R^{13}$, $R^{14}$, $R^{15}$, $R^{16}$: $CH_2NHCOCH=CH_2$
MP-106: $R^{13}$, $R^{14}$, $R^{15}$, $R^{16}$: $CH_2NHCO(CH_2)_7CH=CH(CH_2)_7CH_3$
MP-107: $R^{13}$, $R^{14}$, $R^{15}$: $CH_2OH$; $R^{16}$ $CH_2OCH_3$
MP-108: $R^{13}$, $R^{14}$, $R^{16}$: $CH_2OH$; $R^{15}$: $CH_2OCH_3$,
MP-109: $R^{13}$, $R^{14}$: $CH_2OH$; $R^{15}$, $R^{16}$: $CH_2OCH_3$
MP-110: $R^{13}$, $R^{16}$: $CH_2OH$; $R^{14}$, $R^{15}$: $CH_2OCH_3$
MP-111: $R^{13}$: $CH_2OH$; $R^{14}$, $R^{15}$, $R^{16}$: $CH_2OCH_3$
MP-112: $R^{13}$, $R^{14}$, $R^{16}$: $CH_2OCH_3$; $R^{15}$: $CH_2OH$
MP-113: $R^{13}$, $R^{16}$: $CH_2OCH_3$; $R^{14}$, $R^{15}$: $CH_2OH$
MP-114: $R^{13}$, $R^{14}$, $R^{15}$: $CH_2OH$; $R^{16}$: $CH_2O$-i-$C_4H_9$
MP-115: $R^{13}$, $R^{14}$, $R^{16}$: $CH_2OH$; $R^{15}$: $CH_2O$-i-$C_4H_9$
MP-116: $R^{13}$, $R^{14}$: $CH_2OH$; $R^{15}$, $R^{16}$: $CH_2O$-i-$C_4H_9$
MP-117: $R^{13}$, $R^{16}$: $CH_2OH$; $R^{14}$, $R^{15}$: $CH_26$-i-$C_4H_9$
MP-118: $R^{13}$: $CH_2OH$; $R^{14}$, $R^{15}$, $R^{16}$: $CH_2O$-i-$C_4H_9$
MP-119: $R^{13}$, $R^{14}$, $R^{16}$: $CH_2O$-i-$C_4H_9$; $R^{15}$: $CH_2OH$
MP-120: $R^{13}$, $R^{16}$: $CH_2O$-i-$C_4H_9$; $R^{14}$, $R^{15}$: $CH_2OH$
MP-121: $R^{13}$, $R^{14}$, $R^{15}$: $CH_2OH$; $R^{16}$: $CH_2O$-n-$C_4H_9$
MP-122: $R^{13}$, $R^{14}$, $R^{16}$: $CH_2OH$; $R^{15}$: $CH_2O$-n-$C_4H_9$
MP-123: $R^{13}$, $R^{14}$: $CH_2OH$; $R^{15}$, $R^{16}$: $CH_2O$-n-$C_4H_9$
MP-124: $R^{13}$, $R^{16}$: $CH_2OH$; $R^{14}$, $R^{15}$: $CH_2O$-n-$C_4H_9$
MP-125: $R^{13}$: $CH_2OH$; $R^{14}$, $R^{15}$, $R^{16}$: $CH_2O$-n-$C_4H_9$
MP-126: $R^{13}$, $R^{14}$, $R^{16}$: $CH_2O$-n-$C_4H_9$; $R^{15}$: $CH_2OH$
MP-127: $R^{13}$, $R^{16}$: $CH_2O$-n-$C_4H_9$; $R^{14}$, $R^{15}$: $CH_2OH$
MP-128: $R^{13}$, $R^{14}$: $CH_2OH$; $R^{15}$: $CH_2OCH_3$; $R^{16}$: $CH_2O$-n-$C_4H_9$
MP-129: $R^{13}$, $R^{14}$: $CH_2OH$; $R^{15}$: $CH_2$-n-$C_4H_9$; $R^{16}$: $CH_2OCH_3$
MP-130: $R^{13}$, $R^{16}$: $CH_2OH$; $R^{14}$: $CH_2OCH_3$; $R^{15}$: $CH_2O$-n-$C_4H_9$
MP-131: $R^{13}$: $CH_2OH$; $R^{14}$, $R^{15}$: $CH_2OCH_3$; $R^{16}$: $CH_2O$-n-$C_4H_9$
MP-132: $R^{13}$: $CH_2OH$; $R^{14}$, $R^{16}$: $CH_2OCH_3$; $R^{15}$: $CH_2O$-n-$C_4H_9$
MP-133: $R^{13}$: $CH_2OH$; $R^{14}$: $CH_2OCH_3$; $R^{15}$, $R^{16}$: $CH_2O$-n-$C_4H_9$
MP-134: $R^{13}$: $CH_2OH$; $R^{14}$, $R^{15}$: $CH_2O$-n-$C_4H_9$; $R^{16}$: $CH_2OCH_3$
MP-135: $R^{13}$, $R^{14}$: $CH_2OCH_3$; $R^{15}$: $CH_2OH$; $R^{16}$: $CH_2O$-n-$C_4H_9$
MP-136: $R^{13}$, $R^{16}$: $CH_2OCH_3$; $R^{14}$: $CH_2OH$; $R^{15}$: $CH_2O$-n-$C_4H_9$
MP-137: $R^{13}$: $CH_2OCH_3$; $R^{14}$, $R^{15}$: $CH_2OH$; $R^{16}$: $CH_2O$-n-$C_4H_9$
MP-138: $R^{13}$, $R^{16}$: $CH_2O$-n-$C_4H_9$; $R^{14}$: $CH_2OCH_3$; $R^{15}$: $CH_2OH$
MP-139: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$
MP-140: $R^{13}$: $CH_2OH$; $R^{14}$: $CH_2OCH_3$; $R^{15}$: $CH_2NHCOCH=CH_2$; $R^{16}$ $CH_2O$-n-$C_4H_9$
MP-141: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$
MP-142: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$
MP-143: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$
MP-144: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$
MP-145: $R^{13}$ $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-146: $R^{13}$: $CH_2OH$; $R^{14}$: $CH_2OCH_3$; $R^{15}$: $CH_2NHCO=CH_2$; $R_{16}$: $CH_2NHCO(CH_2)_7CH=CH(CH_2)_7CH_3$
MP-147: $R^{13}$: $CH_2$, $R^{14}$: $CH_2NHCO(CH_2)_7CH=CH(CH_2)_7CH_3$; $R^{15}$ $CH_2NHCOCH=CH_2$:; $R^{16}$: $CH_2OCH_3$
MP-148: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-149: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-150: $R^{13}$: $CH_2NHCO(CH_2)_7CH_3$; $R^{14}$: $CH_2OCH_3$; $R^{15}$: $CH_2OH$; $R^{16}$: $CH_2NHCOCH=CH_2$ (MP-151)~(MP-200)

MP-151: $R^{13}$, $R^{14}$, $R^{15}$, $R^{16}$: $CH_2OH$
MP-152: $R^{13}$, $R^{14}$, $R^{15}$, $R^{16}$: $CH_2OCH_3$
MP-153: $R^{13}$, $R^{14}$, $R^{15}$, $R^{16}$: $CH_2O$-i-$C_4H_9$
MP-154: $R^{13}$, $R^{14}$, $R^{15}$, $R^{16}$: $CH_2O$-n-$C_4H_9$
MP-155: $R^{13}$, $R^{14}$, $R^{15}$, $R^{16}$: $CH_2NHCOCH=CH_2$
MP-156: $R^{13}$, $R^{14}$, $R^{15}$, $R^{16}$: $CH_2NHCO(CH_2)_7CH=CH(CH_2)_7CH_3$
MP-157: $R^{13}$, $R^{14}$, $R^{15}$: $CH_2OCH_3$
MP-158: $R^{13}$, $R^{14}$, $R^{16}$: $CH_2OH$; $R^{15}$: $CH_2OCH_3$,
MP-159: $R^{13}$, $R^{14}$: $CH_2OH$; $R^{15}$, $R^{16}$: $CH_2OCH_3$
MP-160: $R^{13}$, $R^{16}$: $CH_2OH$; $R^{14}$, $R^{15}$: $CH_2OCH_3$
MP-161: $R^{13}$: $CH_2OH$; $R^{14}$, $R^{15}$, $R^{16}$: $CH_2OCH_3$
MP-162: $R^{13}$, $R^{14}$, $R^{16}$: $CH_2OCH_3$; $R^{15}$: $CH_2OH$
MP-163: $R^{13}$, $R^{16}$: $CH_2OCH_3$; $R^{14}$, $R^{15}$: $CH_2OH$
MP-164: $R^{13}$, $R^{14}$, $R^{15}$: $CH_2OH$; $R^{16}$: $CH_2O$-i-$C_4H_9$
MP-165: $R^{13}$, $R^{14}$, $R^{16}$: $CH_2OH$; $R^{15}$: $CH_2O$-i-$C_4H_9$
MP-166: $R^{13}$, $R^{14}$: $CH_2OH$; $R^{15}$, $R^{16}$: $CH_2O$-i-$C_4H_9$
MP-167: $R^{13}$, $R^{16}$: $CH_2OH$; $R^{14}$, $R^{15}$: $CH_2O$-i-$C_4H_9$
MP-168: $R^{13}$: $CH_2OH$; $R^{14}$, $R^{15}$, $R^{16}$: $CH_2O$-i-$C_4H_9$
MP-169: $R^{13}$, $R^{14}$, $R^{16}$: $CH_2O$-i-$C_4H_9$; $R^{15}$: $CH_2OH$

MP-170: $R^{13}$, $R^{16}$: $CH_2O$-i-$C_4H_9$; $R^{14}$, $R^{15}$: $CH_2OH$
MP-171: $R^{13}$, $R^{14}$, $R^{15}$: $CH_2OH$; $R^{16}$: $CH_2O$-n-$C_4H_9$
MP-172: $R^{13}$, $R^{14}$, $R^{16}$: $CH_2OH$; $R^{15}$: $CH_2O$-n-$C_4H_9$
MP-173: $R^{13}$, $R^{14}$: $CH_2OH$; $R^{15}$, $R^{16}$: $CH_2O$-n-$C_4H_9$
MP-174: $R^{13}$, $R^{16}$: $CH_2OH$; $R^{14}$, $R^{15}$: $CH_2O$-n-$C_4H_9$
MP-175: $R^{13}$: $CH_2OH$; $R^{14}$, $R^{15}$, $R^{16}$: $CH_2O$-n-$C_4H_9$
MP-176: $R^{13}$, $R^{14}$, $R^{16}$: $CH_2O$-n-$C_4H_9$; $R^{15}$: $CH_2OH$
MP-177: $R^{13}$, $R^{16}$: $CH_2O$-n-$C_4H_9$; $R^{14}$, $R^{15}$: $CH_2OH$
MP-178: $R^{13}$, $R^{14}$: $CH_2OH$; $R^{15}$: $CH_2OCH_3$; $R^{16}$: $CH_2O$-n-$C_4H_9$
MP-179: $R^{13}$, $R^{14}$: $CH_2OH$; $R^{15}$: $CH_2$-n-$C_4H_9$; $R^{16}$, $CH_2OCH_3$
MP-180: $R^{13}$, $R^{16}$: $CH_2OH$; $R^{14}$: $CH_2OCH_3$; $R^{15}$: $CH_2O$-n-$C_4H_9$
MP-181: $R^{13}$: $CH_2OH$; $R^{14}$, $R^{15}$: $CH_2OCH_3$; $R^{16}$: $CH_2O$-n-$C_4H_9$
MP-182: $R^{13}$: $CH_2OH$; $R^{14}$, $R^{16}$: $CH_2OCH_3$; $R^{15}$: $CH_2O$-n-$C_4H_9$
MP-183: $R^{13}$: $CH_2OH$; $R^{14}$: $CH_2OCH_3$; $R^{15}$, $R^{16}$: $CH_2O$-n-$C_4H_9$
MP-184: $R^{13}$: $CH_2OH$; $R^{14}$, $R^{15}$: $CH_2O$-n-$C_4H_9$; $R^{16}$: $CH_2OCH_3$
MP-185: $R^{13}$, $R^{14}$: $CH_2OCH_3$; $R^{15}$: $CH_2OH$; $R^{16}$,: $CH_2O$-n-$C_4H_9$
MP-186: $R^{13}$, $R^{16}$: $CH_2OCH_3$; $R^{14}$: $CH_2OH$; $R^{15}$: $CH_2O$-n-$C_4H_9$
MP-187: $R^{13}$: $CH_2OCH_3$; $R^{14}$, $R^{15}$: $CH_2OH$; $R^{16}$: $CH_2O$-n-$C_4H_9$
MP-188: $R^{13}$, $R^{16}$: $CH_2O$-n-$C_4H_9$; $R^{14}$: $CH_2OCH_3$; $R^{15}$: $CH_2OH$
MP-189: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$
MP-190: $R^{13}$: $CH_2OH$; $R^{14}$: $CH_2OCH_3$; $R^{15}$: $CH_2NHCOCH=CH_2$; $R^{16}$ $CH_2O$-n-$C_4H_9$
MP-191: $R^{13}$: $CH_2H$; $R^{14}$: $CH_2O$-n-$C_4H_9$; $R^{15}$: $CH_2NHCOCH=CH_2$; $R^{16}$: $CH_2OCH_3$
MP-192: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$
MP-193: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$
MP-194: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$
MP-195: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-196: $R^{13}$: $CH_2OH$; $R^{14}$: $CH_2OCH_3$; $R^{15}$: $CH_2NHCO=CH_2$; $R_{16}$: $CH_2NHCO(CH_2)_7CH=CH(CH_2)_7CH_3$
MP-197: $R^{13}$: $CH_2OH$; $R^{14}$: $CH_2NHCO(CH_2)_7CH=CH(CH_2)_7CH_3$; $R^{15}$ $CH_2NHCOCH=CH_2$:; $R^{16}$: $CH_2OCH_3$
MP-198: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-199: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-200: $R^{13}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$

In the present invention, employed may be copolymers in which at least two types of the above repeating units are combined.

Further, simultaneously employed may be at least two types of compounds having a 1,3,5-triazine ring. Also simultaneously employed may be at least two types of disk shaped compounds (for example, compounds having a 1,3,5-triazine ring and compounds having a porphyrin skeleton).

The amount of additives containing a rod-shaped compound or a disc-shaped compound is preferably 0.2-30% by weight with respect to the optical compensating film, but is particularly preferably 1-20% by weight.

(Matting Agent)

A particle agent such as a matting agent can be added to the optical film of the present invention for giving slipping ability and improving physical properties of the film. As the particle, a particle of an inorganic compound and that of an organic compound can be employed. The shape of the particle may be spherical, planar, rod-like, needle-like, layer like and irregular shape.

Example of the particle include inorganic particles made of metal oxide, hydroxide, silicate, phosphate and carbonate of a metal such as silicon dioxide, titanium dioxide, aluminum oxide, zirconium oxide, calcium carbonate, kaolin, talc, baked calcium silicate, hydrated calcium silicate, aluminum silicate, magnesium silicate or calcium phosphate, and crosslinked polymer particles. Among them, silicon dioxide is preferable since the haze of the film can be lowered by it. The particle such as the silicon dioxide is frequently subjected to a surface treatment by an organic compound, and the surface treated particle is preferable since the haze of the film can be reduced by it.

The preferable organic compound for the surface treatment includes a halosilane, an alkoxysilane, a silazane and siloxane. The particle having lager average diameter displays higher slipping effect and one having lower average diameter is superior in the transparency. The average diameter of the particle is within the range of 0.005-1.0 μm. The particle may be a primary particle or a secondary particle formed by coagulation. The average diameter of the primary particles is preferably 5-50 nm, and more preferably 7-14 nm. These particles can form irregularity of 0.01-1.0 μm on the film surface. The content of the particles in the cellulose ester is 0.005-10%, and preferably 0.05-5%, by weight of the cellulose ester.

Examples of the particle of silicon dioxide inclued Aerosil 200, 200V, 300, R972, R972V, R974, R202, R812, OX50 and TT600, each manufactured by Nihon Aerosil Co., Ltd., and Aerosil 200V, R972, R972V, R974, R202 and R812 are preferable. The particles may be employed in a combination of two or more kinds thereof. In such the case, the particles different from each other in the average diameter or material may be employed in combination, for example, Aerogil 200V and R972 can be employed within the range of from 0.1:99.9 to 99.9:0.1.

The particles employed as the above matting agent can be used to strengthen a film for another purpose.

The particle can be added by kneading with the resin, furthermore, by kneading together with the plasticizer, the hindered amine compound, the UV absorbent or the acid capturing agent. Besides, one prepared by a method can be employed, in which the particle dispersed in a solvent such as methanol and ethanol is sprayed onto the cellulose resin and mixed after dried. Moreover, the particle dispersed in the solvent is added to a cellulose resin dissolved in a solvent mainly composed of methylene chloride or methyl acetate and the resultant mixture is dried for solidifying. Thus obtained solid material may be employed for the material of the melt-cascading process. The cellulose resin solution containing the particles preferably may further contain a part or whole of the additives such as the plasticizer, the hindered amine compound, the hindered phenol.compound, the UV absorbent and the acid capturing agent.

The film having a surface layer containing the particles can be formed by a co-extrusion method or a successive extrusion method. By such the method, the surface layer containing particles having an average diameter of not more than 1.0 μm can be formed on at least one of the surfaces of the film. When the film has the surface layer containing the particles, the particles may be contained-in the inner base film.

(Film Formation)

The optical films of the present invention are formed by the melt-casting method. In detail, the film formation which is melt-cast by heat-melt treatment without employing a solvent such as methylene chloride and the like used in the solution-casting method can be classified into a melt-extrusion method, a press formation method, an inflation method, an injection forming method, a blow forming method and a stretching forming method. Among them, the melt-extrusion method is suitable for obtaining the polarizing plate protective film being excellent in the mechanical strength and the surface precision. In view of the optical film property, the melting temperature is preferably within the range of 120-280° C., and more preferably 200-250°C.

Namely, raw material cellulose esters molded into powders or pellets are subjected to hot air drying or vacuum drying, and are heat-melted together with film constituting materials to result in fluidity. Thereafter, the resulting melted mixture is extruded into a sheet through a T-die, and for example, is brought into close contact with a cooling drum or a looped belt, employing an electrostatic application method, cooling-solidified, whereby an un-stretched sheet is produced. It is preferable that the temperature of the cooling drum is maintained in the range of 90-150° C.

It is preferable that the film peeled from the cooling drum is re-heated and subjected to single step or multi-step stretching in the longitudinal direction employing a heating unit such as a infrared heater, and then cooled. During these processes, it is preferable that the film is heated preferably in the range of (Tg–30)° C.-(Tg+100)° C., wherein Tg represents the transition temperature, but more preferably in the range of (Tg–20)° C.-(Tg+80)° C. is stretched either in the moving direction (the longitudinal direction: MD) or in the transverse direction (TD). It is preferable that transverse stretching is performed in the temperature range of (Tg–20)° C.-(Tg+20)° C. and subsequently and the resulting film is subjected to heat fixing. It is also preferable that after the stretching process, the resulting film is subjected to a relaxation treatment.

It is possible to control the Tg of cellulose ester film depending on the type and ratio of film constituting materials. In the use of present invention, Tg is preferably at least 120° C., but is more preferably at least 135° C. The reasons for this are as follows. In cases in which the optical film of the present invention is applied to liquid crystal display units, and when the Tg of the above film is at most the above temperature, the temperature in the orientation state of molecules fixed in the film interior is adversely affected by effects of the used ambience temperature and backlight heat, and retardation values, dimensional stability, and shape tend to easily vary. On the other hand, when the Tg of the film is excessively high, it is difficult to realize production due to reaching the decomposition temperature of film constituting materials. Further, due to decomposition of materials which are employed for film casting, volatile components and coloration are occasionally result. Consequently, the Tg is preferably at most 200° C., but is more preferably at most 170° C. During this operation, film Tg is determined based on the method described in JIS K 7121.

When performing. transverse stretching (transverse direction: TD), it is preferable that transverse stretching is performed in a stretching zone which is divided into at least two zones while successively increasing temperature within a range of temperature difference of 1-5° C., since thereby physical properties in the transverse direction becomes more uniform. Further, after the transverse stretching, when the resulting film is maintained in the range of at most final stretching temperature and at least Tg–40° C. for 0.01-5 minutes, it is possible to make physical properties in the transverse direction more uniform. Consequently, the above operation is preferred.

Heat fixing is carried out in the temperature range of at least the final stretching temperature to at most Tg–20° C. commonly, for 0.5.-300 seconds. During-this operation, it is preferable that heat fixing is carried out in a zone which is divided into at least two while successively increasing temperature in a range of temperature difference of 1-100° C.

Heat-fixed film is commonly cooled to Tg or a temperature lower than Tg, and is wound after the clip holding portions on both sides of the film are slit off. During the above treatments, it is preferable that a relaxation treatment by 0.1-10% is performed in the transverse and/or longitudinal direction. Further, it is preferable that gradual cooling is performed from the final heat-fixing temperature to Tg at a cooling rate of 100° C. per second or less. The means to perform cooling and the relaxation treatment. are not particularly limited, and prior art methods may be employed. In view of enhancing the dimensional stability of the film, it is particularly preferable that these treatments are performed at a plurality of temperature ranges under successive cooling. "Cooling rate", as described herein, refers to the value obtained based on (T1–T2)/t, wherein T1 represents the final heat-fixing temperature, T2 represents the temperature after cooling, and t represents the time necessary for cooling the film from T1 to T2.

The stretching factor of optical films is 1.01-2.00 in both the longitudinal and transverse directions, is more preferably 1.01-1.50, but is still more preferably 1.01-1.30. By doing so, it is possible to produce an optical film which exhibits excellent optical isotropy and, simultaneously, excellent flatness. It is preferable to perform such width holding or stretching in the longitudinal direction, employing a tenter, which may be either a pin or a clip type.

Further, in the case of production of an optical compensating film, it is possible to produce an optically anisotropic film by stretching in such a manner that stretching factors in the longitudinal and transverse directions are allowed to differ and one stretching factor is different from the other. During the above operation, the ratio of stretching factor in the transverse direction to the longitudinal direction is preferably 1.1-2.0, but is more preferably 1.2-1.5.

Further, in the present invention, it is possible to prepare an optical film in a multilayered structure by co-extruding compositions incorporating cellulose resins in which the concentrations of additives, such as the aforementioned polymer, plasticizer, UV absorbent, or particles, differ. For example, it is possible to prepare an optical film structured as a skin layer/core layer/skin layer. For example, it is possible to incorporate particles in the skin layer in a larger amount or only in the skin layer. The polymer, the plasticizer and the UV absorbent can be incorporated in larger amount in the core layer than in the skin layer, and may be incorporated only in the core layer. Further, it is possible to change the types of polymers, plasticizers and UV absorbents in the core layer and also in the skin layer. For example, it is possible to incorporate low volatile plasticizers and/or UV absorbents in the skin layer, and to incorporate plasticizers exhibiting excellent plasticity or UV absorbents exhibiting high UV absorptivity in the core layer. Tg of the skin layer and the core layer may differ, and it is preferred that Tg of the core layer is lower than that of the skin layer. Further, viscosity of a melt containing cellulose resins of the skin layer and the core layer may differ during melt-casting. The following relationship is acceptable: viscosity of the skin layer>viscosity of the core layer and viscosity of the core layer≧viscosity of the skin layer.

By employing a co-extrusion method, it is possible to produce a distribution of the concentration of additives such as a plasticizer and the like in the thickness direction to decrease their content of the surface, but it is also possible to prepare a uniform film having less additive concentration distribution in the thickness direction via single layer extrusion, to be preferably employed.

In cases in which the optical film of the present invention is employed as a polarizing plate protecting film, the thickness of the above protective film is preferably 10-500 μm, is more preferably 10-100 μm, is still more preferably 20-80 μm, but is most preferably 30-60 μm.

Further, in the solution-casting method, an increase in thickness markedly increases drying load. However, in the present invention, no drying process is required, and it is possible to produce quite thick films at high productivity. Due to that, an advantage results in which it is easier than before to increase film thickness depending on purposes such as providing required retardation and a simultaneous decrease in moisture permeability. Further, effects result in which even though film thickness is low, by stretching such a rather thick film, it is possible to achieve efficient production.

Further, the thickness variation of optical film supports is preferably within ±3% in both the longitudinal and width directions, is more preferably within ±1%, but is still more preferably within ±0.1.

The width of the optical film of the present invention is preferably 1-4 m, but is particularly preferably 1.4-4 m.

Since cellulose ester film, in which the organic acid polyhydric alcohol ester compounds, represented by above Formula (1) of the present invention, are employed as a plasticizer, and result in an optical film which exhibits excellent flatness, it is possible to produce a relatively wide cellulose ester film. The employed width is preferably 1.4-4 m, but is particularly preferably 1.4-2 m. When the width exceeds 4 m, problems such as shipping difficulty occur.

The length of the rolled film is preferably 500-5,000 m, but is more preferably 1,000-5,000 m. It is also preferable that winding is performed while knurling of a height of 0-25% with respect to the film thickness on both edges.

(Removal of Volatile Component)

In order to achieve stable production of a long-length film, it is essential that no volatile components are blended into the casting materials. The casting temperature employing the melt-casting method markedly differs from that of the solution-casting method. Consequently, if volatile components are present, such additives are evaporated during casting and adhere to the casting apparatus, resulting in various problems. Therefore, in view of achieving film flatness and transparency to enable utilization as a film and a polarizing plate protecting film, the presence of such volatile materials is not preferred. Specifically, adhesion onto. dies results in streaking on the film surface whereby degradation of flatness is occasionally induced. Consequently, in cases in which film constituting materials. are subjected to casting, in view of minimizing the formation of volatile components during heat-melting, it is preferable that no volatile components are present in the range which is lower than the melting temperature for casting.

Listed as the above volatile components are moisture absorbed into any of the film constituting materials, mixed gases such as oxygen or nitrogen, solvents and impurities mixed prior to procurement of materials or during synthesis, as well as evaporated materials via heating and materials derived from sublimation and volatized materials due to decomposition. "Solvents", as described herein, differ from those which dissolve resins to prepare solution as a casting solution. Consequently, selection of film constituting materials is important to avoid the generation of volatile components.

In the present invention, prior to casting or during heating, it is preferable to remove the volatile components represented by the above moisture and solvents from the film constituting materials employed for solution-casting. It is possible to employ, as the above removing method, drying method such as a heating method, a vacuum method, or a heating-vacuum method. Drying may be performed under ambient air or inert gases such as nitrogen or argon. It is preferable that these inert gases incorporate a low or no amount of moisture or water. When these drying methods, known in the art are performed, in view of the film quality, it is preferable that drying is performed in the temperature range in which film constituting materials do not undergo decomposition. In the case of film constituting materials of liquid, it is preferable that water, a solvent, and impurities in the heated liquid are removed by a bubbling dried nitrogen gas.

Specifically, the moisture content of employed cellulose ester resins is preferably less than 0.5% by weight. It is possible to determine these characteristic values based on ASTM-D817-96. It is further preferable that the cellulose ester is subjected to a decrease in moisture via a heat treatment and employed at a moisture amount of 0.1-1,000 ppm.

By drying film constituting materials prior to casting, it is possible to lower the generation of volatile materials. Resins may be dried individually. Alternately, film constituting materials may be divided into a mixture of at least one except from resins or a compatible material which may be dried. Drying temperature is preferably at least 80° C.—at most the Tg or the melting point of drying materials. In order to also avoid fusion among materials, the drying temperature is more preferably 100° C.-(Tg−5)° C., but is still more preferably 110° C.-(Tg−20)° C. Drying time is preferably 0.5-24 hours, is more preferably 1-18 hours, but is still more preferably 1.5-12 hours. When the drying temperature is below the lower limit, the removal ratio of volatile materials decreases or an excessively long drying time is required. Further, when any of drying materials exhibits Tg, drying, in which the temperature is higher than Tg, difficulty in handling occasionally results due to fusion of materials. It is preferable that drying is performed at most at atmospheric pressure. It is more preferable that particularly, drying is performed under vacuum −½ atmospheric pressure. It is preferable that drying is performed while appropriately mixing materials such as resins. A fluidized bed system is preferred in which in a drying vessel, drying is performed while drying air or nitrogen is being fed from the bottom, since it is possible to achieve required drying within a shorter time.

The drying process may be divided into at least two stages. For example, casting may be performed employing components which have been stored in a preliminary drying process and which have subjected to drying which is performed from immediately to one week prior to casting.

(Retardation Value)

When used as a polarizer protecting film, in-plane retardation Ro value and retardation Rt value in the thickness direction of the optical film according to the present invention are preferably 0≦Ro≦300 nm and −150≦Rt≦150 nm, respectively, are more preferably 0≦Ro≦200 nm and −50≦Rt≦50 nm, but are still more preferably 0≦Ro≦70 nm and −30≦Rt≦30 nm.

Further, the variation of Rt and distribution width are preferably less than ±10 nm, respectively, are more preferably less than ±8 nm, still more preferably less than ±5 nm, further more preferably less than ±3 nm, and most preferably ±1 nm, but further most preferably zero.

It is possible to obtain retardation values Ro and Rt based on the following formulas.

$$Ro=(nx-ny) \times d \qquad \text{Formula (i)}$$

$$Rt=\{(nx+ny)/2-nz\} \times d \qquad \text{Formula (ii)}$$

wherein d (in nm) represents the film thickness, nx represents the maximum refractive index on the film plane, (also called the refractive index in the delayed phase axis direction), ny represents the refractive index in the direction at right angles to the delayed phase axis on the film plane, and nz represents the refractive index of the film in the thickness direction.

Further, it is possible to determine retardation values Ro and Rt employing an automatic double refractometer. For example, it is possible to determine them at a wavelength of 590 nm under 23° C. and 55% relative humidity, employing KOBRA-21ADH (produced by Oji Scientific Instruments).

Further, the delayed phase axis is. preferably within ±1° in the transverse direction of a long film or within ±1° in the longitudinal direction, but is more preferably within ±0.7° in the transverse direction or in the longitudinal direction, but is more preferably within ±0.5° in the transverse or longitudinal direction, and still more preferably within ±0.1°.

(Film Residual Solvent Amount and Moisture Amount)

Since solvents are basically not used in the casting process of the optical film of the present invention, the residual organic solvent amount incorporated in the wound optical film, after casting, is consistently less than 1% by weight. Based on the above, it is possible to provide an optical film which exhibits more stable flatness and Rt than heretofore. Specifically, in 100 m or longer rolls, it has been possible to produce an optical film which exhibits stable flatness and Rt. The roll length of the above optical film is not particularly limited and 1,500, 2,500, and 5,000 m rolls are preferably employed.

It is possible to determine the amount of residual organic solvents employing head space gas chromatography. Namely, cellulose ester film whose amount has been known is heated at 120° C. for 20 minutes in a tightly sealed vessel and organic solvents incorporated in a gas phase in the above tight-sealed vessel are quantitatively analyzed. Based on the results, it is possible to calculate the residual organic solvent amount (in %).

Further, in cases in which film incorporates moisture, the weight (in g) of the moisture incorporated in the cellulose ester film is determined employing another method. Subsequently, it is possible to obtain a ratio (in percent) of residual organic solvents based on the value obtained-by subtracting the weight (in g) of moisture from the weight difference (in g) between prior to and after the above heating treatment.

It is difficult to reach at most 0.1% by weight of the residual organic solvent ratio (in %) in the cellulose ester film prepared employing the solution-casting method. In order to reach the above value, a long drying process is required. However, according to the above method, it is possible to produce a cellulose ester film at a markedly low residual solvent ratio and also to produce a cellulose ester film which exhibits excellent characteristics as an optical film.

Heat-melting constituting materials result.in marked decomposition reaction, due to which coloration and quality degradation occasionally result. Further, the decomposition reaction also occasionally generates adverse volatile components.

For the purpose of minimizing modification and moisture absorption of the film constituting materials, pellets composed of at least one of them are prepared and stored. Further, by employing the above pellets, it is possible to prepare a melt. Pelletization serves to enhance mixing properties and compatibility of film constituting materials when melted, and also contributes to achieve optical uniformity of the resulting film. Uniform mixing of constituting material, other than cellulose resins, with the above resins prior to melting makes it possible to contribute to resulting in uniformly melting properties when heat-melted.

(Polymer Layer)

It is a feature that an optical compensating film of the present invention has the foregoing optical film (hereinafter referred to also as a melted cellulose ester film) in the present invention, which is formed on a polymer layer. These will be explained in detail.

A polymer layer of the present invention is formed by coating. If a forming process of the polymer layer is conducted after an optical film has been formed by melt-casting cellulose ester film compositions used for a support, the continuous process may be carried out in the film forming process with no particular limitation. The melted cellulose ester film reeled in advance is also unreeled after film formation, the polymer layer is coated by a micro-gravure coater or an extrusion coater and then dried, stretching and drying treatment of whole support may subsequently be conducted by a stretching process employing a tenter. It is preferred that the film formation process and the polymer formation/stretching process may separately be conducted in view of production freedom and quality assurance.

Another method of tranferring into a melted cellulose ester film of the present invention via adhesives may also be employed after coating a polymer layer onto another support to be formed.

The thickness of a polymer in the present invention is preferably 1-20 μm, because it is difficult to add a desired phase difference in the case of less than 1 μm in thickness, and the film thickness is too thick to handle cracks and such in the case of thickness exceeding 20 μm. In view of addition of a thin film trend and a desired phase difference property, thickness of the polymer layer is preferably not more than 15 μm, more preferably not more than 12 μm, and still more preferably 2-10 μm.

A solid polymer prepared by a coating process is preferred for forming a polymer layer, and the solid polymer capable of forming a layer exhibiting a light transmittance of not less than 75%, and paricularly not less than 85% with excellent heat resistance is preferred. In the present invention, preferably employed is a polymer mixed with polyether ketone, or particularly one kind or not less than two kinds of polyarylether ketone, polyamide, polyester, polyimide, polyamideimide, and polyester imide in view of phase diferrence added by the coat layer forming/stretching process.

Provided is the Compound having a repeating unit expressed by following Formula (14), for example, as a specific example of the foregoing polyether ketone or polyarylether ketone in particular.

Formula (14)

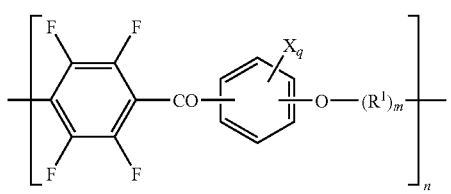

In foregoing Formula (14), X is a halogen, an alkyl group, or an alkoxy group, and bond number q of X to a benzene ring, namely substitution number q value of hydrogen atoms at residual positions where a p-tetra-fluorobenzoylene group and an oxyalkylene group are not bonded is an integer of 0-4. $R^1$ is also a compound (a group) expressed by following Formula (15), and m is 0 or 1. Further, n represents a polymerization degree, which is preferably 2-5000, and more preferably 5-500.

Formula (15)

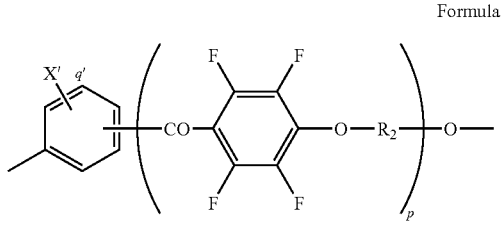

In addition, examples of halogen as X in foregoing Formula (14) include a fluorine atom, a bromine atom, a chlorine atom, and an iodine atom. Of these, a fluorine atom is preferable. Examples of an alkyl group also include a methyl group, an ethyl group, a propyl group, an isopropyl group and a butyl group having carbon atoms of 1-6, and an alkyl group having carbon atoms of 1-4 with a straight chain or a branched chain is preferably provided. Of these, a halogenated alkyl group such as a methyl group or an ethyl group, and this trifluoromethyl group is preferable.

Further, examples of an alkoxy group include a methoxy group, an ethoxy group, a propoxy group, an isopropoxy group, a butoxy group having carbon atoms of 1-6, and an alkoxy group having carbon atoms of 1-4 with a straight chain or a branched chain is preferably provided. Of these, a halogenated alkoxy group such as a methoxy group, an ethoxy group, or their trifluoromethoxy group is preferable. Particularly, a preferable X is a fluorine atom.

On the other hand, in the group expressed by foregoing formula (15), X' is a halogen, an alkyl group, or an alkoxy group, and The value of bond number q' of X' to a benzene ring is an integer of 0-4. A halogen, an alkyl group, or an alkoxy group as X' is the same X as aforementioned.

A preferable X' is a halogenated alkyl group such as a fluorine atom, a methyl group, an ethyl group or their trifluoromethyl group, or a halogenated alkoxy group such as a methoxy group, an ethoxy group or their trifluoromethoxy group. Of these, a fluorine atom is preferable.

In addition, X may be allowed to be X' or not be allowed to be X' in foregoing Formulas (14) and (15). Two or more X or X' in molecules based on the fact that two or more q or q' are existing in Formulas (14) and (15) may be the same or may be different.

Particularly, a preferable $R^1$ is a group expressed by following Formula (16).

Formula (16)

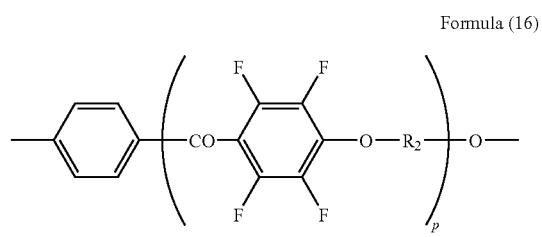

$R^2$ is a divalent aromatic group in foregoing Formulas (15) and (16), and P is 0 or 1. Examples of the divalent aromatic group include (o, m, orp-) a phenylene group, a naphthalene group, a biphenyl group, an anthracene group and (o, m, or p-) a terphenyl group, a phenanthrene group, a dibenzofuran group, a biphenylether group, a biphenylsulfone group, an alkoxy group, substitute, and a divalent aromatic group expressed by the following formula. Incidentally, as to the divalent aromatic group, a hydrogen directly bonded to the aromatic ring may be substituted by a hologen, an alkyl group, or an alkoxy group.

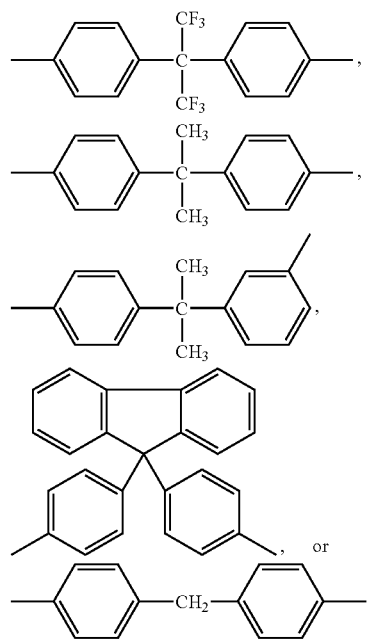

The foregoing preferable divalent aromatic group ($R^2$) is expressed by the following formula.

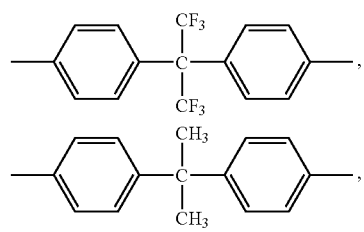

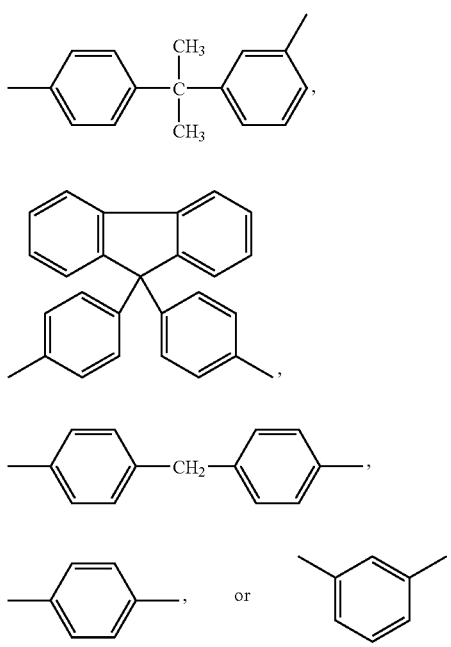

The polyaryletherketone represented by foregoing Formula (14) may be composed of the same repeating units, or of two kinds or not less than 3 kinds of different repeating units. In the latter case, each of repeating units may exist in the form of block, or at random.

In consideration of the above, the polyaryletherketone expressed by following Formula (17) is preferable.

Formula (17)

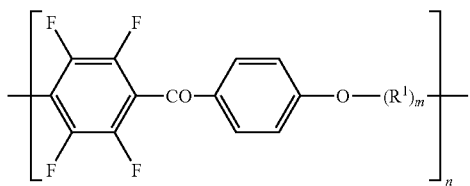

The preferable polyaryletherketone in the case of inclusion of a group at a molecular terminal is represented by following Formula (18) corresponding to Formula (14), and following Formula (19) corresponding to Formula (17). As to the above, a fluorine atom is bonded on the side of a p-tetra-fluorobenzoylene group in the molecules, and a hydrogen atom is bonded on the side of an oxyalkylene group.

Formula (18)

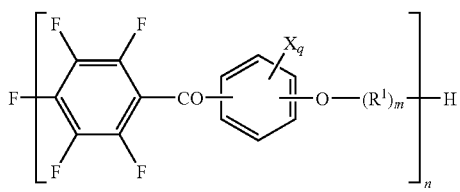

Formula (19)

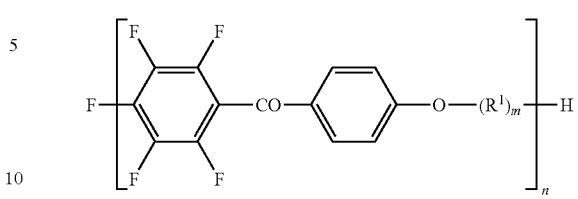

On the other hand, specific examples of the foregoing polyamide or polyester include repeating units and such expressed by following Formula (20).

Formula (20)

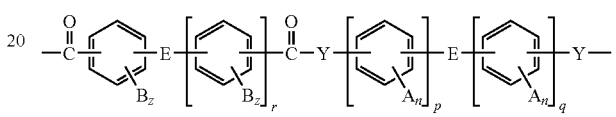

B in foregoing Formula (20) is a halogen, an alkyl group having carbon atoms of 1-3 or these halides, a phenyl group substituted by one kind or two kinds or more of these halides, or the unsubstituted phenyl group, where z is an integer of 0-3.

E is a covalently bonded alkenyl group having two carbon atoms or this halide, and is a $CH^2$ group, a $C(CX_3)_2$ group, a CO group, an O atom, a S atom, a $SO_2$ group, a $Si(R)_2$ group, or a NR group. X in the foregoing $C(CX_3)_2$ group is a hydrogen atom or a halogen, and R in the $Si(R)_2$ group and the NR group is an alkyl group having carbon atoms of 1-3 or this halide. In addition, E is at a meta position or a para position with respect to a carbonyl group or a Y group. in the meta position and the para position. Halogen is also a fluorine atom, a chlorine atom, a bromine atom, or an iodine atom (hereinafter, the same as in Formula (20)).

Further, Y is an O atom or a NH group. A is a hydrogen atom, a halogen, an alkyl group having carbon atoms of 1-3 or these halides, a nitro group, a cyano group, a thioalkyl group having carbon atoms of 1-3, an alkoxy group having carbon atoms of 1-3 or these halides, an aryl group or these halides, an alkylester group having carbon atoms of 1-9, an arylester group having carbon atoms of 1-12, or this substituted derivative.

n is also an integer of 0-4, p is an integer of 0-3, q is an integer of 1-3, and r is an integer of 0-3. In a preferable polyamide or polyester, the foregoing r and q are 1, and provided are repeating units expressed by following Formula (21), prepared via substitution of at least one biphenyl ring at the $2^{nd}$ position and $2^{nd}$, position.

Formula (21)

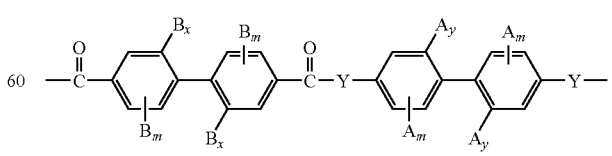

In foregoing Formula (21), m is an integer of 0-3, but preferably 1 ot 2, and x and y are 0 or 1, but both x and y are not 0. Incidentally, other symbols are synonymous with the case in foregoing Formula (20), but E is a carbonyl group or a Y group in the para orientation of covalent bonding.

When B, E, Y, or A exists plurally in molecules in foregoing Formulas (20) and (21), each of them may be the same, or be diferrent. Similarly to z, n, m, x, or y, each of them may also be the same, or be diferrent. Incidentally, in this case, B, E, Y, A, z, n, m, x, and y are independently determined respectively.

The polyamide or polyester represented by foregoing Formula (20) may be composed of the same repeating units, or of two kinds or not less than 3 kinds of different repeating. units. In the latter case, each of repeating units may exist in the form of block, or at random.

On the other hand, provided as a specific example of the above polyimide is the compound having at least one repeating unit expressed by. following Formula (22), containing a product via condensation-polymerization of an aromatic tetracarboxylic acid dianhydride.

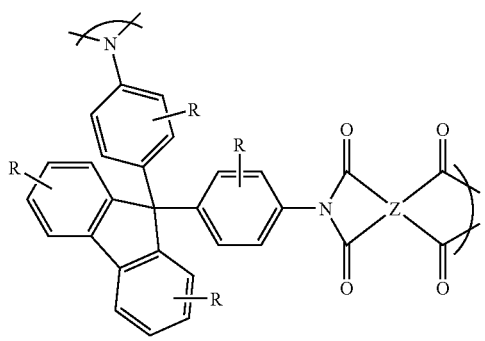

Formula (22)

In foregoing Formula (22), R is a hydrogen atom, a phenyl group, a phenyl group substituted by an alkyl group having halogen atoms of 1-4 or carbon atoms of 1-10, or an alkyl group having carbon atoms of 1-10. Each of four Rs can be independently determined, and be substituted in the range of 0-4. The foregoing substitution group is preferable, but different groups may be allowed to be partly contained. In addition, a halogen is a fluorine atom, a chlorine atom, an iodine atom, or a bromine atom (hereinafter, the same as in Formula (22)).

Z is a trisubstituted aromatic group having carbon atoms of 6-20. Preferable Zs are a pyromellitic group, or a naphtylene group and a fluolenylene group, a polycyclic aromatic group such as a benzofluolenylene group, an anthracenylene group or these substituted derivatives, or a group expressed by following Formula (23). In addition, provided as a substituent of the substituted derivative in the above polycyclic aromatic group is an.alkyl group or a fluorinated compound having carbon atoms of 1-10.

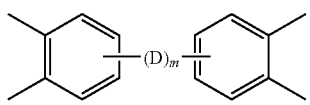

Formula (23)

In foregoing Formula (23), D is covalently bonded, and is a $C(R^2)_2$ group, a CO group, an O atom, a S atom, a $SO_2$ group, a $Si(C_2H_5)_2$ group, a $N(R^3)_2$ group, or in combination with these, and m is an integer of 1-10. In addition, the foregoing each of $R^2$s is independently a hydrogen atom or a $C(R^4)_3$ group. $R^3$ is independently a hydrogen atom, an alkyl group having carbon atoms of 1-20, or an allyl group having acarbon atoms of approximately 6-20. Each of $R^4$s is independently a hydrogen atom, a fluorine atom, or a chlorine atom.

Provided as polyimide other than aforementioned may be compounds having a unit expressed by following Formulas (24) and (25). Of these, polyimide having a unit represented by Formula (26) is preferable.

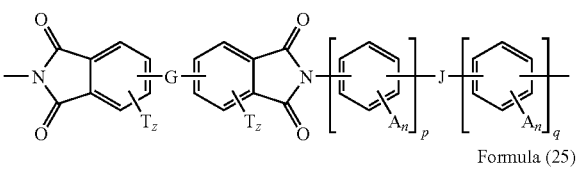

Formula (24)

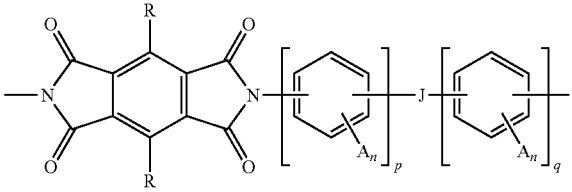

Formula (25)

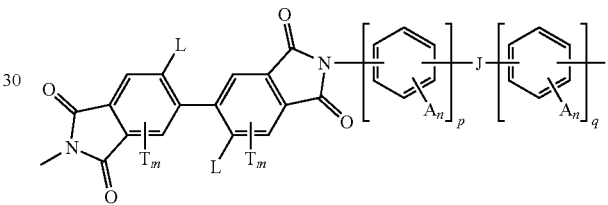

Formula (26)

T and L in foregoing Formulas (24), (25) and (26) are a halogen, an alkyl group having carbon atoms of 1-3 or these halides, a phenyl group substituted by one kind or two kinds or more of these halides, or the unsubstituted phenyl group. The foregoing halogen is a fluorine atom, a chlorine atom, an iodine atom, and a bromine atom (hereinafter, the same as in Formulas (24), (25), and (26)). Symbol z is an integer of 0-3.

G and J are covalently bonded or bonded, and a $CH^2$ group, a $C(CX_3)_2$ group, a CO group, an O atom, a S atom, a $SO_2$ group, a $Si(C_2H_5)_2$ group, or a $N(CH_3)$ group. X in the foregoing $C(CX_3)_2$ group is a hydrogen atom or a halogen (hereinafter, the same as in Formulas (24), (25), and (26)).

A is a hydrogen atom, a halogen, an alkyl group or these halides, and a nitro group, a cyano group, a thioalkyl group, an alkoxy group or these halides. A is also an aryl group or this halide, and an alkylester group or this substituted derivative.

R is a substituted phenyl group such as a hydrogen stom, a halogen, a phenyl group or these halides, or a substituted alkyl group such as an alkyl group or this halide. Symbol n is an integer of 0-4, p is an integer of 0-3, and q is an integer of 1-3.

When T, A, R, or L exists plurally in molecules in foregoing Formulas (24), (25) and (26), each of them may be the same, or be diferrent. Similarly to z, n or m, each of them may also be the same, or be diferrent. Incidentally, in this case, T, A, R, L, z, n, and m are independently determined respectively.

The polyimide represented by foregoing Formulas (22), (24), (25), and (26) may be composed of the same repeating units, or of two kinds or not less than 3 kinds of different repeating units. The different repeating units may be formed by polymerizing one kind or not less than two kinds of acid dianhydride and/or diamine other than aforementioned. An aromatic diamine is particularly preferable as diamine. In the latter case of having a repeating unit, each of repeating units may exist in the form of block, or at random.

Examples of acid dianhydride used for forming the foregoing different repeating unit include pyromellitic acid dianhydride, 3,6-diphenylpyromellitic acid dianhydride, 3,6-bis(trifluoromethyl)pyromellitic acid dianhydride, 3,6-dibropyromellitic acid dianhydride, 3,6-dichloropyromellitic acid dianhydride, 3,3',4,4'-benzophenone tetracarboxylic acid dianhydride, 2,3,3',4'-benzophenone tetracarboxylic acid dianhydride, 2,2',3,3'-benzophenone tetracarboxylic acid dianhydride, 3,3',4,4'-biphenyl carboxylic acid dianhydride, and bis(2,3-dicarboxyphenyl)methane dianhydride.

Examples of the foregoing acid dianhydride also include bis(2,5,6-trifluoro 3,4-dicarboxyphenyl)methane dianhydride, 2,2'-bis(3,4-dicarboxyphenyl)-1,1,1,3-hexafluoropropane dianhydride, bis(3,4-dicarboxyphenyl)ether dianhydride (4,4'-oxydiphthalic acid anhydride), bis(3,4-dicarboxyphenyl)sulfone dianhydride(3,31,4,41-diphenylsulfone tetracarboxylic acid anhydride), and 4,4'-[4, 4'-isopropylidene-di(p-phenyleneoxy)]bis(phthalic acid anhydride)

Examples of the foregoing acid dianhydride include heterocyclic aromatic tetracarboxylic acid dianhydride and so forth such as N,N-(3,4-dicarboxyphenyl)-N-methylamine dianhydride, bis(3, 4-dicarboxyphenyl)diethylsilane dianhydride, 2,3,6,7-naphthalene-tetracarboxylic acid dianhydride, and 1,2,5,6-naphthalene-tetracarboxylic acid dianhydride, 2,6-dichloro-naphthalene-1,4,5,8-tetracarboxylic acid dianhydride naphthalene tetracarboxylic acid dianhydride, thiophenes-2,3,4,5-tetracarboxylic acid dianhydride, pyrazine-2,3,5,6-tetracarboxylic acid dianhydride, and pyridine-2,3,5,6-tetracarboxylic acid dianhydride.

Examples of acid dianhydride include 2,2'-substituted dianhydride and so forth such as 2,2'-dibromo-4,4',5,5'-biphenyltetracarboxylic acid dianhydride, 2,2'-dichloro-4,4',5,5'-biphenyltetracarboxylic acid dianhydride, and 2,2'-trihalo substitution dianhydride, but 2,2-bis(trifluoromethyl)-4,4',5,5'-biphenyltetracarboxylic acid dianhydride is particularly preferable.

On the other hand, examples of diamine to form the foregoing different repeating unit include Benzene diamine such as (o, m, or p-)phenylenediamine, 2,4-diaminotoluene, 1,4-diamino-2-methoxybenzene, 1,4-diamino-2-phenylbenzene or 1,3-diamino-4-chlorobenzene, and 4,4'-diaminobiphenyl, 4,4-diaminodiphenylmethane, 2,2-bis(4-aminophenyl)propane, 2,2-bis(4-aminophenyl)-1,1,1,3,3,3-hexafluoropropane, 4,4'-diamino diphenylether, 3,4'-diaminodiphenylether, 1,3-bis(3-aminophenoxy)benzene, 1,3-bis($^4$-aminophenoxy)benzene and 1,4-bis(4-aminophenoxy)benzene.

Examples of the foregoing diamine also include 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3-hexafluoropropane, 4,4'-diaminodiphenyl thioether, 4,4'-diaminodiphenylsulfone, 2,2'-diaminobenzophenone, 3,3'-diaminobenzophenone, naphthalenediamine such as 1,8-diaminonaphthalene or 1,5-diaminonaphthalene, naphthalenediamine, and heterocyclic aromatic diamine such as 2,6-diaminopyridine, 2,4-diamino pyridine or 2,4-diamino-S-triazine.

A preferable polyimide is a heat-resistant and solvent-soluble polyimide prepared by employing aromatic acid dianhydride such as 2,2'-bis(3,4-dicarboxyphenyl)hexafluoropropane dianhydride, 4,4'-bis(3,4-dicarboxyphenyl)-2,2-diphenylpropane dianhydride, naphthalenetetracarboxylic acid dianhydride or bis(3,4-dicarboxyphenyl)sulfone dianhydride.

Preferably employed is a heat resistant and solvent-soluble polyimide prepared by using aromatic diamine such as diamine, 4,4-(9-fluorenylidene)-dianiline, 2,2'-bis(trifluoromethyl)-4,4'-diaminobiphenyl, 3,3'-dichloro-4,4'-diaminodiphenylmethane, 2,2'-dichloro-4,4'-diaminobiphenyl, 2,2', 5,5'-tetrachlorobenzidine, 2,2-bis(4-aminophenoxyphenyl)propane, 2,2-bis(4-aminophenoxyphenyl)hexafluoropropane, 1,4-bis(4-aminophenoxy)benzene, 1,3-bis(4-amino phenoxy)benzene, or 1,3-bis(3-aminophenoxy)benzene, The above-mentioned polyamideimide or polyesterimide is not specifically limited, and one-kind or not less than two kinds is/are appropriately used. Of these, polyamideimide described in Japanese Patent O.P.I. Publication No. 61-162512, and polyesterimide described in Japanese Patent O.P.I. Publication No. 64-38472 are preferably employed.

The molecular weight of a solid polymer to form a polymer layer is not particularly limited, but it is preferable to be solvent-soluble. The weight average molecular weight is 10000-1000000, preferably 20000-500000, and more preferably 50000-200000 from the aspect of accuracy in thickness and surface of a coated layer, surface flatness, film strength, inhibition of cracks caused by film stretch or film distortion, and solubility to solvents (inhibition of gelation). Incidentally, the weight average molecular weight is a value measured by a gel permeation chromatography (GPC), employing a dimethylformamide solvent with a standard sample of polyethyleneoxide.

The foregoing solid polymer such as polyallylether ketone, polyamide, polyester, or polyimide may be used for polymer layer formation singly or in combination of not less than two kinds of homogeneity. Also used may be an admixture of two kinds or more polymers having different functional groups such as the admixture of polyallylether ketone and polyamide.

At the level where no orientation of the foregoing polymer for polymer layer formation is largely lowered, one kind or not less than two kinds of polymers such as polyethylene, polypropylen, polystyrene, polymethylmethacrylate, an ABS resin, an AS resin, polyacetate, and polycarbonate can be appropriately used in combination. A thermosetting resin such as an epoxy resin, a phenol resin, or a novolak resin may also be used in combination. In the case of the level where no orientation is largely lowered, an amount of polymer consumption used in combination is not particularly limited, but it is commonly not more than 50% by weight, preferably not more than 40% by weight, and more preferably not more than 30%.

For liquefaction of a solid polymer to form a polymer layer, provided can be an appropriate process such as a process of melting a thermoplastic resin by heating, or a process of dissolving a solide polymer in a solution employoing a solvent. Solidification of the development layer can be conducted by cooling the development layer in the case of the former solution, or by removing the solution from the development layer and then drying in the case of the latter solution. When a polymer layer is formed, various additives composed of a stabilizer, a plasticizer and metals can be combined if desired.

It is preferred that a drying process after coating the foregoing polymer layer such as a naturally drying process (natural seasoning process), or a heat-drying process commonly employing hot-air, infrared radiation, a heat roll, or microwave is conducted. A hot-air process is preferable in view of simplicity and easy-to-use. It is preferred that a drying temperature is gradually increased in the rage of 40-150° C. by a zone drying method accompanied with 3-5 separated stages of temperature zone in consideration of a tenter stretching treatment temperature in the next process, and more preferred that the drying temperature is gradually increased in the rage of 80-140° C. in order to improve properties of anti-scratch and dimention stability of a polymer layer.

Examples of the foregoing solvent include halogenated hydrocarbon such as chloroform, dichloromethane, carbon tetrachloride, dichlororthane, tetrachloroethane, trichloroethylene, tetrachloroethylene, chlorobenzene, or orthodichlorobenzene; phenol such as phenol or parachlorophenol; aromatic hydrocarbon such as benzene, toluene, xylene, methoxybenzene, or 1,2-dimetoxybenzene; ketone such as acetone, methylethylketone, methylisobutylketone, cyclohexanone, cyclopentanone, 2-pyrrolidone, or N-methyl-2-pyrrolidone; and ester such as ethylacetate or butylacetate.

Examples of the foregoing solvent include alcohol such as t-butyl alcohol, glycerin, ethylene glycol, triethylene glycol, ethylene glycol monomethylether, diethylene glycol dimethylether, propylene glycol, dipropylene glycol, or 2-methyl-2,4-pentanediol; amide such as dimethylformamide or dimethylacetamide; nitrile such as acetonitrile or butyronitrile; ether such as diethylether, dibutylether, or tetrahydrofuran; and others such as methylene chloride, carbon disulfide, ethylcellosolve, and butylcellosolve.

The solvent can be appropriately mixed singly or in combination with not less than two kinds to use. In view of coating viscosity, the solution has 2-100 parts by weight of a solid polymer, with respect to 100 parts by weight of a solvent, preferably 5-50 parts by weight, and more preferably 10-40 parts by weight.

As to a liquefied polymer developed on a melted cellulose ester film, examples of the appropriate film formation method include a casting method or an extrusion method such as a spin coat method, a roll coat method, a flow coat method, a printing method, a dip coat method, a casting film formation method, a bar coat method, or a gravure printing method. Of these, a solution film formation method such as a casting method or so forth is preferably employed in view of mass-production of films exhibiting reduced thickness unevenness and reduced orientation unevenness caused by distortion.

A polymer solution liquefied by dissolving in a solvent described above is developed on a support to dry the polymer layer, and the whole support is stretched by a stretching treatment process described later. It is preferred that stretching treatment is conducted by a tenter process. This process is capable of continuous production since the treatment is possible to be carried out in the state of supporting a polymer layer by a base material via this process, and excellent production efficiency and processing accuracy are exhibited.

(Stretching Operation)

The preferable stretching operation of an optical compensating film in the present invention will be explained.

After the foregoing polymer layer is provided on a melt-cast optical film to prepare the optical compensating film, it is preferred that the polymer layer and the optical film are simultaneously stretched to control a phase difference. An optical film melt-cast before providing a polymer layer may also be stretched independently in a similar way.

It is preferred that the optical film is stretched in one direction to a magnification of 1.0-2.0, and stretched in another direction approximately to a magnification of 0.8-1.5.

For example, it is possible to successively or simultaneously perform stretching in the longitudinal direction and the direction at right angles to it in the interior of the film surface, namely across the width of the film. During the above stretching, when the stretching ratio in one direction is excessively small, it is not possible to achieve sufficient phase difference, while when it is excessively large, it becomes difficult to perform stretching, whereby breakage occasionally occurs.

In cases in which stretching is performed in the melt cast direction, when width-wise contraction is excessively large, the refractive index of the film in the thickness direction becomes excessively large. In this case, improvement is achieved by minimizing the width-wise contraction of the film or by performing width-wise stretching. In cases in which width-wise stretching is performed, a distribution of the resulting index occasionally results width-wise. This occasionally occurs in the use of the tenter method. This is phenomenon which is formed in such a manner that by performing width-wise stretching, contraction force is generated in the central portion of the film, while the edge portion is fixed and is assumed to be so-called boing phenomenon. Even in this case, it is possible to retard the boing phenomenon by performing the above casting direction stretching and to minimize the width-wise phase difference distribution.

Further, by stretching in the biaxial directions, being at right angles to each other, it is possible to decrease the thickness variation of the resulting film. When the thickness variation of an optical compensating film is excessively large, uneven phase difference results, and when employed in liquid crystal displays, problems of non-uniformity such as coloration occasionally occur.

It is preferable that the thickness variation of the optical film of the present invention is controlled in the range of ±3%. and further ±1%. To achieve the above purposes, a method is effective in which stetching is performed in the biaxial directions which are in right angles to each other.

As an optical compensating film, in order to control retardation in the plane or thickness direction, it may be possible to perform free edge uniaxial stretching in the cast direction or the width direction, or unbalanced biaxial stretching in which stretching is performed in the width direction while contraction is performed in the cast direction. The stretching magnification in the. contraction direction is preferably at a factor of 0.7-1.0.

In the case of use of a cellulose resin resulting in positive birefringence for stress, by performing width-wise stretching, it is possible to provide delayed phase axis of the optical film in the width direction. In this case, in the present invention, in order to enhance listed quality, it is preferable that the delayed phase axis of the optical film is in the width direction and to satisfy (stretching magnification in the width direction)> (stretching magnification in the cast direction).

An optical film prepared by coating a polymer layer via melt-casting is subjected to preliminary heat treatment prior to stretching, preferably at 50-180° C., more preferably 60-160° C., but most preferably at 70-150° C., and preferably for 5 seconds-3 minutes, more preferably for 10 seconds-2 minutes, but most preferably for 15-90 seconds. It is preferable that the above heat treatment is performed between just prior to holding a film employing a tenter and just prior to the start of stretching. It is particularly preferable that the heat treatment is performed between holding the film employing the tenter and just prior to the start of film stretching.

Stretching is preferably performed at 5-300%/minute, more preferably at 10-200%/minute, but still more preferably at 15-150%/minute. It is preferable that stretching is performed employing a tenter while both ends of the film are held.

The stretching angle is preferably 2°-10°, more preferably 3°-7°, but most preferably 3°-5°. The stretching rate may be constant or may vary.

A stretching temperature is controlled in the relationship in which stretching temperature B is represented by following Formula (I).

Formula (I): Melting temperature A−100° C.≦Stretching temperature B≦Melting temperature A−40° C. where Melting temperature A is a temperature during melt-casting. When Stretching temperature B is a temperature of less than Melting temperature A−100° C., a stretching magnification is desired to be increased in oreder to obtain a sufficient phase difference, and increasing in haze and coloring is caused. On the other hand, When Stretching temperature B is a temperature exceeding Melting temperature A−40° C., controlling in phase difference and reproducibility is degraded, and unevenness caused by stretching is also generated easily. In this case, coloring is easily increased in a long period of duration.

It is further preferred that the following relation is satisfied. Melting temperature A−90° C.≦Stretching temperature B≦Melting temperature A−50° C.

It is preferable that the ambient temperature during the tenter process exhibits minimal distribution. Variation across the width is preferably within ±5° C., more preferably within ±2° C., still more preferably within ±1° C., but most preferably within ±0.5° C. It is preferable that in the tenter process, a heat treatment is performed preferably in the range of a heat conductivity of $20\text{-}130\times10^3$ J/m²hr, more preferably in the range of $40\text{-}130\times10^3$ J/m²hr, but most preferably in the range of $42\text{-}84\times10^3$ J/m²hr.

The film conveying tension during the casting process in the tenter varies depending on temperature, but is preferably 120-200 N/m, is more preferably 140-200 N/m, but is most preferably 140-160 N/m.

In order to minimize undesired film elongation during the casting process, it is preferable to arrange a tension reduction roller prior to or after the tenter.

It is preferable that residual distortion in an optical compensating film of the present invention is relaxed employing a heat treatment process after a stretching process. The heat treatment is commonly performed at 110-150° C., preferably at 100-180° C., but still more preferably at 130-160° C. In the above case, the heat treatment is performed preferably in the range of a heat conductivity of $20\text{-}130\times10^3$ J/m²hr, more preferably in the range of $40\text{-}130\times10^3$ J/m²hr, but most preferably in the range of $42\text{-}84\times10^3$ J/m²hr. By doing so, the residual distortion is eliminated, whereby dimensional stability at high temperature such as 90° C., or high temperature and high humidity such as 80° C. and 90 percent RH is improved.

After stretching, the film is cooled to room temperature. It is preferable that the stretched film is cooled while it is subjected to width holding by the tenter. Relaxation is preferably performed in such a manner that the width hold by the tenter is reduced preferably by 1-10%, more preferably by 2-9%, but still more preferably by 2-8% with respect to the film width after stretching. A practical cooling rate is preferably 10-300° C. per minute, more preferably 30-250° C. per minute, but still more preferably 50-200° C. per minute. Cooling to room temperature may be performed under tenter holding. However, it is preferable that on the way, holding is terminated and roll conveying is employed. Thereafter, roll winding is performed.

The optical compensating film of the present invention, produced as above, exhibits the following characteristics.

(Optical Characteristics)

In the optical compensating film of the present invention, it is preferable that retardation values Ro and Rt, defined by foregoing Formula, are in the range of 20-300 nm and in the range between −600 nm and 600 nm, respectively. Further, Ro value is more preferably in the range of 20-120 nm and Rt value is more preferably in the range between −400 nm and 400 nm, while Ro value is most preferably in the range of 40-100 nm and Rt value is most preferably in the range between −300 nm and 300 nm.

The optical compensating film of the present invention is advantageously employed as an optical compensating film used for a VA type liquid crystal display having a liquid cryastal cell in a VA mode. The optical compensating film used for a VA type liquid crystal display has preferably an Ro value of 20-150 nm, and an Rt value of 70-400 nm, and more preferably an Ro value of 30-100 nm. In the case of two optical compensating films used for the VA type liquid crystal display, it is preferable that an Rt value of the film is 70-250 nm. In the case of one optical compensating film used for the VA type liquid crystal display, it is preferable that an Rt value of the film is 150-400 nm.

When the retardation values are set in the above-mentioned range, optical characteristics exhibited in a polarizing plate phase difference film, in particular, are sufficiently satisfied.

Other physical properties of the optical film and the optical compensating film of the present invention will now be described. The following are the preferable properties of an optical film or an optical compensating film on which a polymer layer is coated on the optical film to fix.

(Moisture Permeability)

The moisture permeability of the optical film or the optical compensating film of the present invention is preferably 1-250 g/m²·24 hours at 25° C. and 90% RH, is more preferably 10-200 g/m²·24 hours, but is most preferably 20-180 g/m²·24 hours. It is possible to determine the above moisture permeability employing the method described in JIS Z 0208.

(Equilibrium Moisture Content)

The equilibrium moisture content the optical film or the optical compensating film is preferably 0.1-3% at 25° C. and 60% relative humidity, is more preferably 0.3-2%, but is most preferably 0.5-1.5%.

It is possible to determine the equilibrium moisture content employing the Carl Fischer method measurement instruments (such as Carl Fischer moisture measurement instrument CA-05, produced by Mitsubishi Chemical Co., Ltd.; water vaporizing device: VA-05, internal liquid: AQUAMICRON CXµ, external liquid: AQUAMICRON AX, nitrogen flow rate: 200 ml/minute, and heating temperature 150° C.). In practice, a sample which has been rehumidified at 25° C. and relative humidity 60% for at least 24 hours is accurately weighed in an amount of 0.6-1.0 g and is subjected to determination employing a measurement instrument. Subsequently, it is possible to obtain the equilibrium moisture content based on the resulting weight of water.

In order to secure adhesion to polyvinyl alcohol (being a polarizer), the moisture content of the optical film or the optical compensating film of the present invention is preferably 0.3-15 g/m², but is more preferably 0.5-10 g/m². When it is at least 15 g/m², retardation variation tends to increase due to temperature and humidity variations.

(Dimensional Stability)

One of the features of the optical film or the optical compensating film according to the present invention is excellent dimensional stability. By employing the measurement method below, length variation (contraction) as a variation ratio respect to the original length is determined and then evaluated. The dimensional variation ratio is preferably 0 to −0.06%.

(Determination of Dimensional Variation Ratio)

After rehumidifying the film in the room conditioned at 23° C. and 55% relative humidity for 24 hours, marks were made at about 10 cm intervals in the width direction and the longitudinal direction employing a cutter, and distance (L1) was determined. Subsequently, the resulting film was stored in a thermostat conditioned at the specified temperature and humidity for 24 hours. After rehumidifying the film in a room conditioned at 23° C. and relative humidity 55% for 24 hours, the marked distance (L2) was determined. The dimensional variation ratio was evaluated based on the formula below.

Dimensional variation ratio (%)={(L2−L1)/L1}×100

(Polarizing Plate)

It is possible to prepare the polarizing plates employing commonly known methods. It is preferable that the reverse side of the optical film or the optical compensating film of the present invention is subjected to an alkali saponification treatment and the resulting optical film or the optical film is adhered, employing an aqueous completely-saponified polyvinyl alcohol solution, to at least one surface of a polarizing film which has been prepared by being immersed into an iodine solution and subsequently being stretched. Polymer films employing norbornene polymer, polycarbonate, polyetherdulfone, polysulfone, polyolefin, acrylic polymer, polyallylate, polystyrene, polyvinyl alcohol, polyvinyl chrloride, polyvinylidene chloride, cellulose ester polymer, ans so forth may be used. Another polarizing plate protective film may further be employed on the other surface.

Employed as a polarizing plate protective film used on the other surface, instead of the cellulose ester film of the present invention, may be commercially available cellulose ester film. For example, preferably employed as commercially available cellulose ester films are KC8UX, KC4UX, KC5UX, KC8UY, KC4UY, KC12UR, KC8UYW-HA, and KC8UX-RHA (all produced by Konica Minolta Opt, Inc.), and it is possible to obtain polarizing plates which exhibit excellent flatness and viewing angle increasing effects.

The polarizing film which is a major constituting component of polarizing plates, as described herein, refers to the element which only transmits the light of a polarized wave in the definite direction. The representative polarizing film, which is presently known, is a polyvinyl alcohol based polarizing film which is classified to one prepared by dying polyvinyl alcohol based film with iodine and the other prepared by dying the same with dichroic dyes. The polarizing film is prepared in such a manner that an aqueous polyvinyl alcohol solution is cast and the resulting cast film is subjected to uniaxial orientation and dying, or is subjected to dying and uniaxial orientation and subsequently to a durability treatment employing preferably boron compounds. One side of the cellulose ester film of the present invention is adhered to the surface of the above polarizing film, whereby a polarizing plate is formed. Adhesion is performed employing preferably water based adhesives employing completely-saponified polyvinyl alcohol as a major component.

A polarizing film is subjected to uniaxial orientation (commonly in the longitudinal direction). When a polarizing plate is allowed to stand at high temperature and high humidity, the length in the stretching direction (commonly in the longitudinal direction) decreases, while the length in. the perpendicular direction (commonly the width direction) increases. As the thickness of a polarizing plate protective film decreases, elongation and shrinkage ratio increases, while a degree of contraction in the stretching direction of the polarizing film particularly increases. Generally, adhesion of a polarizing film to a polarizing plate protective film so that the stretching direction of the polarizing film is at the fright angles to the casting direction (being the MD direction) of the polarizing plate protective layer. Consequently, it is critical that when the thickness of the polarizing plate protective film decreases, it is important that elongation and shrinkage ratio in the casting direction exhibit no significant change. The optical film of the present invention is suitably applied to such a polarizing plate protective film due to excellent dimensional stability. The thickness of a polarizing film is preferably 5-30 μm.

Namely, in a durability test at 60° C. and 90% RH, wavy unevenness does not increase. After the durability test, the polarizing plate having an optical compensating film on the reverse side results in no variation of viewing angle characteristics whereby it is possible to provide excellent visibility.

It is possible to constitute a polarizing plate further by adhering a protective film onto one side of the polarizing plate and a separate film onto the opposite side. The protective film and separate film are employed to protect the polarizing plate at its shipping and product inspection. In this case, the protective film is adhereed to protect the surface of the polarizing plate and is employed on the side opposite the side to adhere the polarizing plate to a liquid crystal plate. Further, the separate film is employed to cover the adhesion layer to adhere to the liquid crystal plate and is employed on the side to adhere the polarizing plate to a liquid cell.

(Liquid Crystal Display)

By attaching the polarizing plate of the present invention on at least one surface of a liquid crystal cell, installed in a display device, it is possible to prepare the various display devices of the present invention, which exhibit excellent visibility. The antireflection film of the present invention is preferably employed in a reflection type, transmission type, and a semi-transmission type LCD or LCD of various driving systems such as a TN type, an STN-type, an OCB type an HAN type, a VA type (a PVA type and an MVA type), and an IPS type. Further, the cellulose ester film of the present invention exhibits excellent flatness and is employed to various display devices such as a plasma display, a field emission display, an organic EL display, an inorganic EL display, an electrons paper. Particularly, in a large image screen display device, uneven color and wavy unevenness were minimized, resulting in effects of minimal eye fatigue even for viewing of an extended period.

The preferable liquid crystal display configuration will be described below, for example, but it is not limited thereto. Incidentally, a melted cellulose ester film means an optical film of the present invention. (Visibility side)/melted cellulose ester film/polarizer/melted cellulose ester film/liquid crystal cell/polymer layer/melted cellulose ester film/polarizer/melted cellulose ester film/(backlight) (Visibility side)/melted cellulose ester film/polarizer/melted cellulose ester film/polymer/liquid crystal cell/polymer layer/melted cellulose ester film/polarizer/protective film/(backlight)

In the present invention, since sufficient retardation is possible to be realized by employing an optical film subjected to stretching treatment of the whole support after forming a polymer layer, and as a result, only one optical compensating film having a polymer layer to be used is good enough, whereby this is more preferable in view of retardation stability in an object of the present invention.

A commonly known functional layer such as an anti-static layer, a transparent conductive layer, a hard coat layer, an anti-glare hard coat layer, an anti-reflection layer, an antifouling layer, a lubrication increasing layer, an adhesion increasing layer, an anti-glare layer, a gas barrier layer, or an optical compensating layer may be coated on the melted cellulose ester film on the above-mentioned visibility side.

Although the backlight unit used for the liquid crystal display using the polarizing plate of the present invention may be a sidelight type, a direct illumination type or a combination of both types, preferable is a direct illumination backlight unit provided behind a liquid crystal cell. A specifically preferable backlight unit includes a LED direct illuminating backlight unit for a color LCD provided behind a liquid crystal cell containing Red(R) LEDs, Green(G) LEDs and Blue(B) LEDs, of which peak wavelengths are, for example, 610 nm or more for Red(R), 530±10 nm for Green(G), and 480 nm or less for Blue(B). Examples of Green(G) LED having a peak wavelength in the above range include DG1112H (produced by Stanley Electric Co., Ltd.), UG1112H (produced by Stanley Electric Co., Ltd.), E1L51-3G (produced by TOYODA GOSEI CO., LTD.), E1L49-3G (produced by TOYODA GOSEI CO., LTD.), NSPG500S (produced by Nichia Corp.).

Examples of Red(D) LED include FR1112H (produced by Stanley Electric Co., Ltd.), FR5366X (produced by Stanley Electric Co., Ltd.), NSTM515AS (produced by Nichia Corp.), GL3ZR2D1COS (produced by Sharp Corp.) and GM1JJ35200AE (produced by Sharp Corp.). Examples of Blue (B) LED include DB1112H (produced by Stanley Electric Co., Ltd.), DB5306X (produced by Stanley Electric Co., Ltd.), E1L51-3B (produced by TOYODA GOSEI CO., LTD.), E1L4E-SB1A. (produced by TOYODA GOSEI CO., LTD.), NSPB630S (produced by Nichia Corp.) and NSPB310A (produced by Nichia Corp.).

LEDs of the above three colors may be combined to make a backlight unit or a white LED may be employed.

Direct illumination backlight units are also disclosed in, for example, Japanese Patent O.P.I. Publication No. 2001-281656, Japanese Patent O.P.I. Publication No. 2001-305535 in which dot type LED light source is used, and JP-A No. 2002-311412, however, backlight units are not limited thereto.

According to the present invention, change in visibility caused by heat generation via a LED backlight and the environmental variation is lowered, whereby a liquid crystal display exhibiting excellent color reproducibility can be produced.

EXAMPLE

Next, the present invention will be explained employing examples, but the present invention is not limited thereto.

[Synthesis of Polymers 1-12]

| <Polymer 1> | |
|---|---|
| Methylacrylate | 10 parts by weight |
| 2-hydroxyethylacrylate | 1 part by weight |
| Azobisisobutyronitrile (AIBN) | 1 part by weight |
| Toluene | 30 parts by weight |

The above components were charged into a four necked flask equipped with an inlet, a thermometer, a C, a nitrogen gas introducing pipe, and stirring blades, heated gradually to 80° C., and polymerized for 5 hours while stirring. After polymerization, the polymer solution was charged into a large amount of methanol to precipitate, and the resulting material was further washed by methanol to purify, and then dried to prepare polymer 1 of 5000 in weight average molecular weight (measured by GPC).

| <Polymer 2> | |
|---|---|
| Methylacrylate | 10 parts by weight |
| 2-hydroxyethylacrylate | 1 part by weight |
| AIBN | 2 parts by weight |
| Toluene | 30 parts by weight |

Similarly to polymer 1, polymer 2 of 2000 in weight average molecular weight was prepared via polymerization, precipitation, and purification.

| <Polymer 3> | |
|---|---|
| Methylacrylate | 12 parts by weight |
| azobis (2-hydroxyethylbutyrate) | 2.4 parts by weight |
| Toluene | 30 parts by weight |

Similarly to polymer 1, polymer 3 of 2000 in weight average molecular weight was prepared via polymerization, precipitation, and purification.

| <Polymer 4> | |
|---|---|
| Methylmethacrylate | 10 parts by weight |
| 2-hydroxyethylmethacrylate | 1 part by weight |
| AIBN | 2 parts by weight |
| Toluene | 30 parts by weight |

Similarly to polymer 1, polymer 4 of 2000 in weight average molecular weight was prepared via polymerization, precipitation, and purification.

| <Polymer 5> | |
|---|---|
| Methylacrylate | 6 parts by weight |
| Ethylacrylate | 5 parts by weight |
| 2-hydroxyethylacrylate | 1 part by weight |
| AIBN | 2 parts by weight |
| Toluene | 30 parts by weight |

Similarly to polymer 1, polymer 5 of 2000 in weight average molecular weight was prepared via polymerization, precipitation, and purification.

| <Polymer 6> | |
|---|---|
| Methylmethacrylate | 6 parts by weight |
| Ethylmethacrylate | 5 parts by weight |
| 2-hydroxyethylmethacrylate | 1 part by weight |
| AIBN | 2 parts by weight |
| Toluene | 30 parts by weight |

Similarly to polymer 1, polymer 6 of 2000 in weight average molecular weight was prepared via polymerization, precipitation, and purification.

A mass-polymerizing process was conducted by a polymerization method described in Japanese patent O.P.I. Publication No. 2000-344823. The following methylmethacrylate and ruthenocene were charged into a flask equipped with stirring blades, a nitrogen gas introducing pipe, a thermometer, an inlet, and a refluxing cooling pipe, and the content was heated to 70° C. Next, half the following β-mercaptopropionic acid which was sufficiently nitrogen-gas-substituted was added into the flask while stirring. After adding of β-mercaptopropionic acid, the stirring content in the flask was maintained at 70° C. to polymerize for 2 hours. Further, after adding another half of the β-mercaptopropionic acid, the stirring content was maintained at 70° C. to polymerize for 4 hours. A temperature of the reactant was set back to room temperature, and polymerization was terminated after adding 20 parts by weight of tetrahydrofran solution of 5% by weight of benzoquinone into the reactant. Polymer 7 having 3400 in weight average molecular weight and 50 in hydroxyl value (via the following measuring method) was prepared by removing tetrahydrofran, a residual monomer, and a residual thiol compound while heating the polymerized material gradually to 80° C. under the reduced pressure with an evaporator.

| Methylmethacrylate | 100 parts by weight |
| --- | --- |
| Ruthenocene | 0.05 parts by weight |
| β-mercaptopropionic acid | 12 parts by weight |

(Measuring Method of Hydroxyl Value)

This measurement is based on JIS K 0070 (1992).

When 1 g of a sample is acetylized, a hydroxyl value is defined to be mg of potassium hydrate required to neutralize acetic acid bonded with a hydroxyl group. Specifically, X g of a sample (approximately 1 g) in a flask is weighed, 20 mg of acetylized reagent (Pyridine is added into 20 mg of acetic acid anhydride to make 400 ml) is precisely added into this to be heated in glycerin to 95-100° C., after an air cooling pipe is equipped at an inlet of the flask. After 1.5 hours followed by a cooling process, the acetic acid anhydride is decomposed into acetic acid by adding 1 ml of purified water via air cooling pipe. Next, 0.5 mol/L of a potassium hydrate solution is titrated employing a potentiometric titrator, and an inflexion point of the resulting titration curve is set to a terminal point. Further, a blank test is conducted by titrating with no sample to determine the inflexion point of a titration curve. The hydroxyl value is calculated employing the following formula.

Hydroxyl Value=$[(B-C) \times f \times 28.05/X]+D$ where B is the amount(ml) of a 0.5 mol/L potassium hydrate ethanol solution used for a blank test, C is the amount (ml) of a 0.5 mol/L potassium hydrate ethanol solution used for titration, f is a factor of a 0.5 mol/L potassium hydrate ethanol solution, D is an acid value, and 28.05 indicates one half of 56.11 which is 1 mol quantity of potassium hydrate.

<Polymer 8>

A mass-polymerization process was conducted by a polymerization method described in Japanese Patent O.P.I. Publication No. 2000-128911. The following methylacrylate was charged into a flask equipped with stirring blades, a nitrogen gas introducing pipe, a thermometer, an inlet, and a refluxing cooling pipe, and the following thioglycerol substituted by nitrogen gas introduced into a flask was added. while stirring. After addition of thioglycerol, a polymerization process was conducted for 4 hours while maintaining the content temperature at 60° C. After this, the content temperature returned to room temperature, 20 parts by weight of a benzoquinone 5 wt % tetrahydrofran solution was added into the resulting content to terminate the polymerization. After the content was transfered to an evaporator, and tetrahydrofran, the residual monomer, and the residual thioglycerol were removed under the reduced pressure at 80° C. to prepare polymer 8. The weight average molecular weight and the hydroxyl value were 2100 and 35, respectively.

| Methylacrylate | 100 parts by weight |
| --- | --- |
| Tioglycerol | 5 parts by weight |

<Polymer 9>

Similarly to Polymer 7, methylacrylate and a benzylmethacrylate mixing monomer were polymerized employing ruthenocene and β-mercaptopropionic acid to prepare polymer 9. The weight average molecular weight and the hydroxyl value were 1800 and 35, respectively.

| Methylacrylate | 70 parts by weight |
| --- | --- |
| Benzylmethacrylate | 30 parts by weight |
| Ruthenocene | 0.05 parts by weight |
| β-mercaptopropionic acid | 12 parts by weight |

<Polymer 10>

Similarly to Polymer 10, methylacrylate and a cyclohexylmethacrylate mixing monomer were polymerized employing tioglycerol to prepare polymer 10. The weight average molecular weight and the hydroxyl value were 2200 and 40, respectively.

| Methylacrylate | 65 parts by weight |
| --- | --- |
| Cyclohexylmethacrylate | 35 parts by weight |
| tioglycerol | 5 parts by weight |

<Polymer 11>

Similarly to Polymer 8, a polymerization process was conducted employing a vinyl acetate monomer and tioglycerol to prepare polymer 11. The weight average molecular weight and the hydroxyl value were 1600 and 35, respectively.

| vinyl acetate | 100 parts by weight |
| --- | --- |
| tioglycerol | 5 parts by weight |

<Polymer 12>

Similarly to Polymer 8, a polymerization process was conducted employing a vinyl acetate monomer, a benzoic acid vinyl mixing monomer, and tioglycerol to prepare polymer 12. The weight average molecular weight and the hydroxyl value were 4000 and 47, respectively.

| vinyl acetate | 70 parts by weight |
| --- | --- |
| benzoic acid vinyl | 30 parts by weight |
| tioglycerol | 5 parts by weight |

<Polymer 13>
Polymer 13 was prepared similarly to preparation of polymer 1, except that the amount of azobisisobutyronitrile (AIBN) was replaced to 2.5 parts by weight. The weight average molecular weight was 300.

<Polymer 14>
Polymer 14 was prepared similarly to preparation of polymer 1, except that the amount of azobisisobutyronitrile (AIBN) was replaced to 2.0 parts by weight. The weight average molecular weight was 500.

<Polymer 15>
Polymer 15 was prepared similarly to preparation of polymer 1, except that the amount of azobisisobutyronitrile (AIBN) was replaced to 0.5 parts by weight. The weight average molecular weight was 10000.

<Polymer 16>
Polymer 16 was prepared similarly to preparation of polymer 1, except that the amount of azobisisobutyronitrile (AIBN) was replaced to 0.25 parts by weight. The weight average molecular weight was 15000.

<Polymer 17>
Polymer 17 of the present invention was prepared similarly to preparation of polymer 1, except that the amount of azobisisobutyronitrile (AIBN) was replaced to 0.15 parts by weight. The weight average molecular weight was 30000.

<Polymer 18>
Polymer 18 of a comparative example was prepared similarly to preparation of polymer 1, except that the amount of azobisisobutyronitrile (AIBN) was replaced to 0.10 parts by weight. The weight average molecular weight was 40000.

(Material)

<Cellulose Resin: 90 Parts by Weight>

Cellulose ester 1: cellulose tripropionate having a propyonyl group substitution degree of 2.91, a number average molecular weight of 75000, and a residual sulfuric acid content of 16 ppm (in terms of sulfur element).

Cellulose ester 2: cellulose acetate propionate having an acetyl group substitution degree of 1.90, a propyonyl group substitution degree of 0.75, a number average molecular weight of 80000, and a residual sulfuric acid content of 50 ppm (in terms of sulfur element).

Cellulose ester 3: cellulose acetate propionate having an acetyl group substitution degree of 2.0, a propyonyl group substitution degree of 0.75, a number average molecular weight of 100000, and a residual sulfuric acid content of 25 ppm (in terms of sulfur element).

Cellulose ester 4: cellulose acetate propionate having an acetyl group substitution degree of 2.0, a propyonyl group substitution degree of 0.8, a number average molecular weight of 95000, and a residual sulfuric acid content of 45 ppm (in terms of sulfur element).

Cellulose ester 5: cellulose acetate butyrate having an acetyl group substitution degree of 2.0, a butyryl group substitution degree of 0.70, a number average molecular weight of 120000, and a residual sulfuric acid content of 12 ppm (in terms of sulfur element).

Cellulose ester 6: cellulose acetate propionate having an acetyl group substitution degree of 1.90, a propyonyl group substitution degree of 0.75, a number average molecular weight of 80000, and a residual sulfuric acid content of 75 ppm (in terms of sulfur element).

Cellulose ester 7: cellulose acetate propionate (prepared by removing a residual sulfuric acid after washing cellulose 3 with a 0.01 N sodium hydrate solution) having an acetyl group substitution degree of 2.0, a propyonyl group substitution degree of 0.75, a number average molecular weight of 100000, and a residual sulfuric acid content of 0.1 ppm (in terms of sulfur element).

(Measuring Method of Residual Sulfuric Acid Content)
The residual sulfuric acid content was measured by the following method.

<Pre-treatment>
A weighed sample of 500 mg (M) is placed in a polypropylene vessel, and ultrapure water of 10 ml is added into it.
After the above is dispersed by an ultrasonic cleaner for 30 minutes, it is filtrated with a water-based chrimatodisc (0.45 μm) to prepare a sample.

(Quantitative Determination of $SO_4$)
<Apparatus> Ionchromatography DX-120 produced by DIONEX
<Column> IonPac AG14(4 mm)+IonPac AS14(4 mm).
<Suppressor> ASRS-ULTRAII(4 mm)
<Eluting solution> 3.5 mM-$Na_2CO_3$ 1.0 mM-$NaHCO_3$
<SRS current> 50 mA
<Flow rate> 1.0 ml/min
<Dose> 25 μm
<Conversion method> Content(ppm)=measured value (mg/l)/1000×10/M(mg)×1000000

<Plasticizer>

| | |
|---|---|
| Plasticizer 1: Triphenylphosphate | 10 parts by weight |
| Plasticizer 2: Trimethylolpropane Tribenzoate | 10 parts by weight |
| Plasticizer 3: Polyester plasticizer sample No. 3 (aromatic terminal ester sample) | 10 parts by weight |
| Plasticizer 4: Citric acid ester plasticizer (compound PL-11 described in Japanese Patent O.P.I. Publication No. 2002-62430) | 10 parts by weight |
| Plasticizer 5: Phthalic acid ester plasticizer (The following compound-1) | 10 parts by weight |

Compound-1

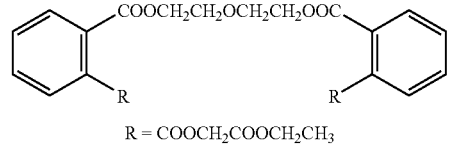

R = $COOCH_2COOCH_2CH_3$

<UV absorbent>

| | |
|---|---|
| UV-1: Tinuvin 109 (at a weight average molecular weight of 486 and a molar absorption coefficient of 6780, produced by Ciba Specialty Chemicals Co., Ltd.) | 2 parts by weight |
| UV-2: Polymer UV Agent P-1 synthesized as below | 2 parts by weight |

(Synthesis Example of Polymer UV Agent P-1)
Exemplified Compound MUV-19, 2(2'-hydroxy-5'-t-butyl-phenyl)-5-carboxylic acid-(2-methacryloyloxy)ethylester-2H-benzotriazol was synthesized based on the method described below.

Dissolved in 160 ml of water was 20.0 g of 3-nitro-4-amino-benzoic acid followed by the addition of 43 ml of concentrated hydrochloric acid. After adding 8.0 g of sodium nitrite which was dissolved in 20 ml of water to the above solution at 20° C., the resulting mixture was stirred for two hours while maintained at 0° C. Into the resulting solution dripped was a solution prepared by dissolving 17.3 g of 4-t-butylphenol in 50 ml of water and 100 ml of methanol at 0° C. while maintained to be alkaline employing potassium carbonate. The resulting solution was stirred at 0° C. for one hour and stirred at room temperature for an additional one hour. The reaction liquid composition was acidified by the addition of hydrochloric acid. The formed precipitates were collected via filtration and were well washed with water.

The precipitates collected by filtration were dissolved in 500 ml of a 1 mol/L aqueous NaOH solution. After adding 35 g of zinc powder to the resulting solution, 110 g of a 40% aqueous NaOH solution was dripped. After dripping, stirring was performed for approximately two hours. The resulting mixture was filtered and washed with water. The resulting filtrate was neutralized by the addition of hydrochloric acid. Deposited precipitates were collected by filtration, washed with water and dried. Thereafter recrystallization was performed employing a mixed solvent of ethyl acetate and acetone, whereby 2(2'-hydroxy-5'-t-butyl-phenyl)-5-carboxylic acid-2H-benzotriazole was obtained.

Subsequently added to 100 ml of toluene were 10.0 g of 2(2'-hydroxy-5'-t-butyl-phenyl)-5-carboxylic acid-2H-benzotriazole, 0.1 g of hydroquinone, 4.6 g of 2-hydroxyethyl methacrylate, and 0.5 g of p-toluenesulfonic acid, the resulting mixture underwent thermal refluxing for 10 hours in a reaction vessel fitted with an ester tube. The reaction solution was poured to water, and deposited crystals were collected via filtration, washed with water, dried, and recrystallized employing ethyl acetate, whereby 2(2'-hydroxy-5'-t-butyl-phenyl)-5-carboxylic acid-(2-methacryloyloxy)ethylester-2H-benzotriazole which was Exemplified compound MUV-19 was obtained.

Subsequently, the copolymer (Polymer UV Agent P-1) of 2(2'-hydroxy-5'-t-butyl-phenyl)-carboxylic acid-(2-methacryloyloxy)ethylester-2H-benzotriazole with methyl methacrylate was synthesized employing the method described below.

Added to 80 ml of tetrahydrofuran were 4.0 g of 2(2'-hydroxy-5'-t-butyl-phenyl)-5-carboxylic acid-(2-methacryloyloxy)ethylester-2H-benzotriazole, which was synthesized in above Synthesis Example 3, and 6.0 g of methyl methacrylate, and then 1.14 g of azoisobutyronitrile. The resulting mixture underwent thermal refluxing in an ambience of nitrogen for 6 hours. After distilling out tetrahydrofuran under vacuum, the resulting products were re-dissolved in 20 ml of tetrahydrofuran, and the resulting solution was dripped into an excessive amount of methanol. The deposited precipitates were collected via filtration and was dried under vacuum at 40° C., whereby 9.1 g of Polymer UV Agent P-1 in the form of gray powders. It was confirmed that the weight average molecular weight of the resulting copolymer was 9,000, employing GPC analysis in which the standard polystyrene was used as a standard. Further, the molar absorption coefficient of the monomer component at 380 nm was 7,320.

The above copolymer was identified as a copolymer of 2(2'-hydroxy-5'-t-butyl-phenyl)-5-carbocylic acid-(2-methacryloyloxy)ethylester-2H-benzotriazol with methyl methacrylate, based on NMR spectra and UV spectra. The composition of the above copolymer was that 2(2'-hydroxy-5'-t-butyl-phenyl)-5-carbocylic acid-(2-methacryloyloxy) ethylester-2H-benzotriazol methyl methacrylate was nearly 40:60.

UV-3: RUVA-100 (at a weight average molecular weight of 494.5 and a molar absorption coefficient at 380 nm of 4,340, produced by Otsuka Chemical Co., Ltd.) 1 part by weight

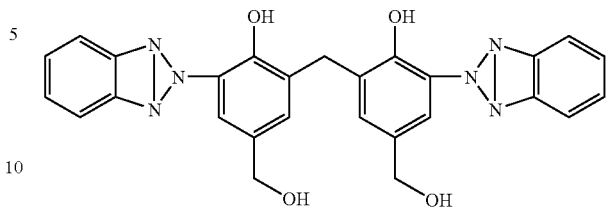

UV-4: LA-31 (at a weight average molecular weight of 658.9 and a molar absorption coefficient at 380 nm of 8,250, produced by Asahi Denka Kogyo Co., Ltd.) 1.6 parts by weight

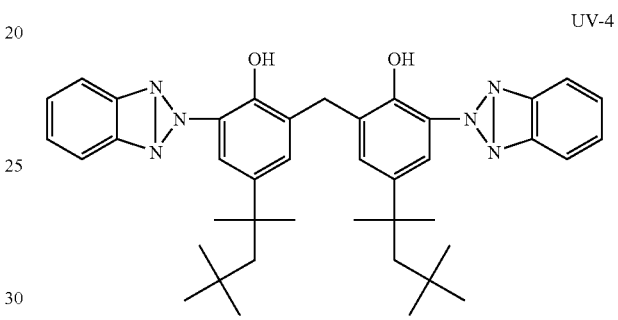

UV-5: PUVA-30M (at a weight average molecular weight of 9,000 and a molar absorption coefficient at 380 nm of 600, copolymer of 3-(2H-1,2,3-benzotriazole-2-yl)-4hydroxyphenetyl methacrylate and methyl methacrylate at a composition ratio of 30:70, produced by Otsuka Chemical Co., Ltd.) 2 parts by weight Further, in cases in which two types of UV absorbents are simultaneously employed, the total added amount was controlled to two parts by weight and the simultaneously employed amount ratio was controlled to be 1:1-(In Table 1, UV-2/3 means that UV-2 and UV-3 were simultaneously employed, and the above description is applied to UV-2/5).

| <Additive> | |
|---|---|
| Additive 1: IRGANOX 1010 (produced by Ciba Specialty Chemicals Co., Ltd.) | 0.2 part by weight |
| Additive 2: Epoxidized Tall Oil (acid capturing agent) | 0.2 part by weight |
| Additive 3: HALS-1 (hindered amine photo-stabilizer) | 0.2 part by weight |

<Matting Agent>

Aerosil 200V (silica particle of 0.016 μm in size, manufactured by Nihon Aerosil Co., Ltd)

Example 1

(Preparation of Support by Melt-casting Method: Optical Films 1-32)

The above cellulose ester 1 was heat treated at 120° C. for 1 hour and cooled to room temperature in a dried air. The plasticizer and UV absorbent other than cellulose ester were added in the amount described below to 90 parts by weight of the dried cellulose resin to have the following composition as shown in Table 1. The resulting composition was mixed in a Henschel mixer, heated in an extruder to prepare pellets and cooled.

Cellulose ester 1: cellulose tripropionate having a propionyl group possessing a substitution degree of 2.91, a number average molecular weight of 7500, and a residual sulfuric acid content

| (in terms of sulfur element) of 16 ppm | 90 parts by weight |
|---|---|
| Plasticizer 1: triphenylphosphate | 10 parts by weight |
| UV-1: Tinuvin-109, produced by Ciba Specialty Chemicals Co., Ltd. (weight average molecular weight: 486, and molar absorbance coefficient at 380 nm: 6780) | 2 parts by weight |

The resulting pellets were dried at 105° C. for 2 hours employing an air-ventilating hot air dryer to remove moisture.

Next, employing a uniaxial extruder equipped with a coat hanger type T-die having a lip width of 1.5 m (90 mm in screw diameter and T-die lip portion material made of tungsten carbide), the foregoing pellets were added by a continuous feeder via an opening portion of an additive hopper provided in the middle of the extruder so as to have 0.05% of matting agent, based on the amount of extrusion, to produce cellulose ester films via melt extrusion. An extruding process was conducted in a clean room having not more than class 10000. under the extrusion condition at a melting temperature of 230° C. and a T-die temperature of 240° C. The resulting film was stretched in the longitudinal direction by a stretching magnification of 1.02, and subsequently stretched in the width direction by a stretching magnification of 1.05 to prepare cellulose ester films having retardation Ro of 5 nm in the in-plane direction, retardation Rt of 38 nm in the thickness direction, 3000 m in length, 75 μm in thickness, and 1.4 m in width.

Next, similarly to preparation of optical film 1, optical films 2-32 were prepared employing the foregoing polymers 1-18 as described in Table 1, cellulose ester 1-7, and each of kinds and quantities of plasticizers, UV absorbents and additives. In addition, 10 parts by weight was used each for polymers 1-18 to 90 parts by weight of a cellulose resin.

Employing resulting optical films 1-32, retardation variations with respect to a humidity change were each measured in consideration of the following retardation value as well as long-term use, and evaluation results are shown in Table 1.

(Retardation Ro and Rt)

A film sample was allowed to stand at 23° C. and 55% RH for 24 hours. The retardation of the resulting film sample at a wavelength of 590 nm was determined at the same ambience as above employing automatic birefringence meter KOBURA-21ADH (produced by Oji Keisoku Co.). The average refractive index of film constituting materials determined employing an Abbe refractometer and film thickness d were inputted and in-plane retardation (Ro) and thickness direction retardation (Rt) were obtained.

$$Ro=(nx-ny)\times d \qquad \text{Formula (i)}$$

$$Rt=\{(nx+ny)/2-nz\}\times d \qquad \text{Formula (ii)}$$

wherein nx represents the refractive index in the delayed phase axis direction in the plane, ny represents the refractive index of the advanced phase axis direction in the plane, nz represents the refractive index of the film in the thickness direction, and d (nm) represents the thickness of the film.

(Retardation Variation with Respect to Humidity Change)

Rt(a) depending on humidity was determined employing the above retardation value measuring method as described below.

After moisturizing a film sample at 23° C. and 20% RH for 24 hours, an Rt value measured under the same condition was set to Rt(b), and after moisturizing the same film sample at 23° C. and 80% RH for 24 hours, an Rt value measured under the same condition was also set to Rt(c). R(a) which is Rt variation with respect to a humidity change was determined by the following formula.

$$Rt(a)=|Rt(b)-Rt(c)|$$

A moisturized sample was further measured again at 23° C. and 55% RH, this variation was confirmed to be a reversible variation.

Components of optical films and acquired results are shown in Table 1.

TABLE 1

| Optical film No. | Cellulose ester No. | Polymer | Plasticizer No. | UV absorbent No. | Additive No. | Melting temperature (° C.) | Ro | Rt(b) | Rt(c) | Rt(a) | *1 |
|---|---|---|---|---|---|---|---|---|---|---|---|
| 1 | 1 | — | 1 | UV-1 | — | 230 | 5 | 38 | 26 | 12 | Comp. |
| 2 | 1 | — | 2 | UV-2 | 1 | 230 | 3 | 35 | 25 | 10 | Comp. |
| 3 | 1 | — | 2 | UV-2 | 1, 2, 3 | 230 | 3 | 31 | 22 | 9 | Comp. |
| 4 | 1 | 1 | 1 | UV-1 | 1, 2, 3 | 230 | 2 | 13 | 6 | 7 | Inv. |
| 5 | 2 | 1 | 2 | UV-2 | 1, 2, 3 | 230 | 1 | 12 | 7 | 5 | Inv. |
| 6 | 3 | 1 | 2 | UV-2 | 1, 2, 3 | 230 | 0 | 5 | 3 | 2 | Inv. |
| 7 | 4 | 1 | 2 | UV-2 | 1, 2, 3 | 230 | 0 | 7 | 4 | 3 | Inv. |
| 8 | 5 | 1 | 2 | UV-2 | 1, 2, 3 | 230 | 1 | 9 | 5 | 4 | Inv. |
| 9 | 3 | 1 | 3 | UV-2 | 1, 2, 3 | 230 | 1 | 7 | 4 | 3 | Inv. |
| 10 | 3 | 1 | 2 | UV-2/3 | 1, 2, 3 | 230 | 0 | 5 | 3 | 2 | Inv. |
| 11 | 3 | 1 | 2 | UV-3/5 | 1, 2, 3 | 230 | 0 | 4 | 2 | 2 | Inv. |
| 12 | 3 | 1 | 4 | UV-3 | 1, 2, 3 | 230 | 1 | 6 | 3 | 3 | Inv. |
| 13 | 3 | 1 | 5 | UV-4 | 1, 2, 3 | 230 | 1 | 8 | 5 | 3 | Inv. |
| 14 | 3 | 2 | 2 | UV-2/5 | 1, 2, 3 | 230 | 0 | 5 | 3 | 2 | Inv. |
| 15 | 3 | 3 | 2 | UV-2/5 | 1, 2, 3 | 200 | 1 | 7 | 5 | 2 | Inv. |
| 16 | 3 | 4 | 2 | UV-2/5 | 1, 2, 3 | 210 | 1 | 6 | 3 | 3 | Inv. |

TABLE 1-continued

| Optical film No. | Cellulose ester No. | Polymer | Plasticizer No. | UV absorbent No. | Additive No. | Melting temperature (° C.) | Ro | Rt(b) | Rt(c) | Rt(a) | *1 |
|---|---|---|---|---|---|---|---|---|---|---|---|
| 17 | 3 | 5 | 2 | UV-2/5 | 1, 2, 3 | 240 | 0 | 5 | 3 | 2 | Inv. |
| 18 | 3 | 6 | 2 | UV-2/5 | 1, 2, 3 | 245 | 0 | 4 | 2 | 4 | Inv. |
| 19 | 3 | 7 | 2 | UV-2/5 | 1, 2, 3 | 230 | 0 | 5 | 3 | 2 | Inv. |
| 20 | 3 | 8 | 2 | UV-2/5 | 1, 2, 3 | 230 | 1 | 7 | 4 | 3 | Inv. |
| 21 | 3 | 9 | 2 | UV-2/5 | 1, 2, 3 | 230 | 2 | 8 | 5 | 3 | Inv. |
| 22 | 3 | 10 | 2 | UV-2/5 | 1, 2, 3 | 230 | 0 | 5 | 3 | 2 | Inv. |
| 23 | 3 | 11 | 2 | UV-2/5 | 1, 2, 3 | 230 | 1 | 6 | 4 | 2 | Inv. |
| 24 | 3 | 12 | 2 | UV-2/5 | 1, 2, 3 | 230 | 1 | 6 | 4 | 2 | Inv. |
| 25 | 6 | 1 | 1 | UV-1 | 1, 2, 3 | 230 | 2 | 21 | 14 | 9 | Comp. |
| 26 | 7 | 1 | 1 | UV-1 | 1, 2, 3 | 230 | 0 | 6 | 3 | 2 | Inv. |
| 27 | 3 | 13 | 2 | UV-2/5 | 1, 2, 3 | 230 | 4 | 28 | 20 | 10 | Comp. |
| 28 | 3 | 14 | 2 | UV-2/5 | 1, 2, 3 | 230 | 2 | 12 | 6 | 6 | Inv. |
| 29 | 3 | 15 | 2 | UV-2/5 | 1, 2, 3 | 230 | 2 | 10 | 7 | 5 | Inv. |
| 30 | 3 | 16 | 2 | UV-2/5 | 1, 2, 3 | 230 | 2 | 11 | 7 | 6 | Inv. |
| 31 | 3 | 17 | 2 | UV-2/5 | 1, 2, 3 | 230 | 2 | 12 | 8 | 6 | Inv. |
| 32 | 3 | 18 | 2 | UV-2/5 | 1, 2, 3 | 230 | 4 | 22 | 15 | 10 | Comp. |

Comp.: Comparative Example,
Inv.: Present Invention,
*1: Remarks

It is to be understood that retardation values in optical films 4-24, 26, 28, 29, 30, and 31 in the present invention as the optical film used for a polarizing plate protective film are appropriately good in comparison with optical films 1-3, 25, 27, and 32, and further variation in retardation value with respect to a humidity change is largely lowered.

It is also to be understood that optical film 4 employing triphenylphosphate as a phosphate ester plasticizer as well as a UV absorbent having a low molecular weight exhibits slightly lowered effects of the present invention.

It is to be understood that optical films lo, 11, 14-24 used in combination with a preferable UV absorbent exhibit any of excellent characteristics.

Example 2

Optical compensating films 1-35 described in Table 2 were prepared after a polymer layer was formed on each of optical films, and stretched by the following method employing optical films 1 and 4-32 produced in Example 1.

A cyclohexane solution of 15% by weight of polyimide having a weight average molecular weight of 59000 synthesized by 2,2'-bis(3,4-dicarboxyphenyl)hexafluoropropane and 2,2'-bis(trifluoromethyl)-4,4'-diaminobiphenyl was coated so as to form a dried thickness of 5 µm on each of optical films, subsequently dried while holding a film at both ends with a tenter, and stretched in the width direction by a magnification of 1.15 to prepare an optical compensating film having 70 nm in Ro and 270 nm in Rt.

(Evaluation)

The following evaluation was carried out employing resulting optical compensating films 1-35.

(Transparency)

Transparency of the resulting optical compensating film was evaluated employing a diaphanometer produced by KOTAKI SEISAKUSHO.
B: No reduced transparency confirmed.
C: Reduced transparency slightly confirmed.
D: Reduced transparency confirmed.

(Flatness: Visual Evaluation)

A sample size of 100 cm in length×90 cm in width was provided, and five 50 W fluorescent lamps were arranged to be placed to fix at the height of 1.5 m so as to illuminate an sample stage at an angle of 45°. Subsequently, each of film samples were placed on the sample stage, and unevenness on the film surface visually observed via reflection was determined as indicated below. Employing this method, the observed wrinkles can be determined.

A: all three fluorescent lamps looked straight
B: fluorescent lamps looked slightly curved
C: fluorescent lamps looked clearly curved
D: fluorescent lamps looked significantly winding (Variation of Retardation Values of Ro and Rt)

Retardation values of the resulting film sample at intervals of one centimeter in the width direction were measured, and the resulting retardation was represented in variation coefficient (CV). In the measurement, wavelength 590 nm birefringence of a sample at intervals of one centimeter in the width direction was automatically determined at 23° C. and 55% RH, employing a 3 dimensional birefringence meter KOBURA-21ADH (produced by Oji Keisoku Co.). The standard deviation of the resulting retardation in the in-plane direction and the thickness direction was obtained employing the (n−1) method. The variation coefficient (CV) of the retardation distribution was obtained and used as an index. In practical measurement, 130-140 were set as n.

Variation Coefficient (CV)=Standard Deviation/Retardation Average Value
A: Variation (CV) is less than 1.5%
B: Variation (CV) is not less than 1.5% and less than 5%
C: Variation (CV) is not less than 5% and less than 10%
D: Variation (CV) is 10% or more.

The above evaluation results are shown in Table 2.

TABLE 2

| Optical compensating film No. | Optical film No. | Polymer formation | Stretching temperature | Transparency | Flatness | Retardation variation | Visibility of liquid crystal display | Remarks |
|---|---|---|---|---|---|---|---|---|
| 1 | 1 | Not formed | 150 | D | D | D | D | Comp. |
| 2 | 1 | Formed | 150 | D | D | D | D | Comp. |
| 3 | 4 | Formed | 150 | C | C | C | B | Inv. |
| 4 | 5 | Formed | 150 | B | C | B | B | Inv. |
| 5 | 6 | Formed | 130 | B | B | B | B | Inv. |
| 6 | 6 | Formed | 140 | B | A | A | B | Inv. |
| 7 | 6 | Formed | 150 | B | A | A | A | Inv. |
| 8 | 6 | Formed | 155 | B | A | A | A | Inv. |
| 9 | 6 | Formed | 160 | B | A | A | A | Inv. |
| 10 | 7 | Formed | 150 | B | A | A | A | Inv. |
| 11 | 8 | Formed | 150 | B | A | A | A | Inv. |
| 12 | 9 | Formed | 150 | B | A | A | A | Inv. |
| 13 | 10 | Formed | 150 | B | A | A | A | Inv. |
| 14 | 11 | Formed | 150 | B | A | A | A | Inv. |
| 15 | 12 | Formed | 150 | B | A | A | A | Inv. |
| 16 | 13 | Formed | 150 | B | A | A | A | Inv. |
| 17 | 14 | Formed | 150 | B | A | A | A | Inv. |
| 18 | 15 | Formed | 160 | B | B | B | B | Inv. |
| 19 | 16 | Formed | 160 | B | A | A | A | Inv. |
| 20 | 17 | Formed | 150 | B | A | A | A | Inv. |
| 21 | 18 | Formed | 145 | B | B | B | B | Inv. |
| 22 | 19 | Formed | 150 | B | A | A | A | Inv. |
| 23 | 20 | Formed | 150 | B | A | A | A | Inv. |
| 24 | 21 | Formed | 150 | B | A | A | A | Inv. |
| 25 | 22 | Formed | 150 | B | A | A | A | Inv. |
| 26 | 23 | Formed | 150 | B | A | A | A | Inv. |
| 27 | 24 | Formed | 150 | B | A | A | A | Inv. |
| 28 | 25 | Formed | 150 | B | C | D | D | Comp. |
| 29 | 26 | Formed | 150 | B | B | A | A | Inv. |
| 30 | 27 | Formed | 150 | B | C | D | D | Comp. |
| 31 | 28 | Formed | 150 | B | B | B | B | Inv. |
| 32 | 29 | Formed | 150 | B | B | B | B | Inv. |
| 33 | 30 | Formed | 150 | B | B | B | B | Inv. |
| 34 | 31 | Formed | 150 | B | B | B | B | Inv. |
| 35 | 32 | Formed | 150 | D | D | C | D | Comp. |

Comp.: Comparative Example,
Inv.: Present Invention

It is to be understood that properties such as transparency, flatness, and retardation variation are entirely excellent in comparison to optical compensating film 1 having no polymer layer provided on a comparative example optical film and optical compensating films 2, 28, 30, and 35 having a polymer layer provided on a comparative example optical film, when optical compensating films of the present invention 3-27, 29, 31, 32, 33, and 34 have a polymer layer coated onto an optical film of the present inventing, and the whole support is stretched.

Example 3

<<Preparation of Polarizing Plate>>

The following hard coat layer and an antireflection layer provided on optical film 11 prepared in Example 1 are formed to prepare an antireflection layer.

<Hard Coat Layer>

The hard coat layer composition described below was coated onto each of Antireflection Films to result in a dried layer thickness of 3.5 μm and subsequently dried at 80° C. for one minute. Subsequently, Curing was conducted at the condition of 150 mJ/cm$^2$ employing a high pressure mercury lamp, whereby a hard coat film incorporating a hard coat layer was prepared. The refractive index of the hard coat layer was 1.50.

| <Hard coat layer composition (C-1)> | |
|---|---|
| Dipentaerythritol hexaacrylate (incorporating approximately 20% of polymer greater than dimmers) | 108 parts by weight |
| IRUGACURE 184 (produced by Ciba Specialty Chemicals Co., Ltd.) | 2 parts by weight |
| Propylene glycol monomethyl ether | 180 parts by weight |
| Ethyl acetate | 120 parts by weight |

<Medium Refractive Index Layer>

The medium refractive index layer composition, described below, was applied onto the hard coat layer of the above hard coat film, employing an extrusion coater and subsequently dried at conditions of 80° C. and 0.1 m/second for one minute. Until finger touch drying completion (such a state that a finger touch results in completion of drying), a non-contact floater was employed. Employed as a non-contact floater was a horizontal floater type air tambar, produced by Bellmatic Co. The star tic pressure in the floater was maintained at 9.8 kPa and conveyance was performed via uniform floating up by approximately 2 mm in the width direction. After drying, curing was performed via exposure to an ultraviolet radiation of 130 mJ/cm$^2$ employing a high pressure mercury lamp (80 W), whereby a medium refractive index film exhibiting a medium refractive index was prepared. The thickness and refractive index of the medium refractive index layer of the resulting medium refractive index film were 84 nm and 1.66, respectively.

<Medium refractive index layer composition>

| | |
|---|---|
| 20% ITO particle dispersion (an average particle diameter of 70 nm and an isopropyl alcohol solution) | 100 g |
| Dipentaerythritol hexaacrylate | 6.4 g |
| IRUGACURE 184 (produced by Ciba Specialty Chemicals Co., Ltd.) | 1.6 g |
| Tetrabutoxytitanium | 4.0 g |
| 10% FZ-2207 (a propylene glycol monomethyl ether solution) | 3.0 g |
| Isopropyl alcohol | 530 g |
| Methyl ethyl ketone | 90 g |
| Propylene glycol monomethyl ether | 265 g |

<High Refractive Index Layer>

The high refractive index layer composition, described below, was applied onto the above medium refractive index layer employing an extrusion coater and subsequently dried at conditions of 80° C. and 0.1 m/second for one minute. During this operation, until finger touch drying completion (such a state that a finger touch results in completion of drying), a on-contact floater was employed. The conditions of the non-contact floater were set to be the same as for the formation of the medium refractive index layer. After drying, curing was performed via exposure to an ultraviolet radiation of 130 mJ/cm$^2$ employing a high pressure mercury lamp (80 W), whereby a high refractive index film incorporating a high refractive index layer was prepared.

<High refractive index layer composition>

| | |
|---|---|
| Tetra (n) butoxytitanium | 95 parts by weight |
| Dimethylpolysiloxane (KF-96-1000CS, produced by Shin-Etstu Chemical Co., Ltd.) | 1 part by weight |
| γ-methacryloxypropyltrimethoxysilane (KBM503, produced by Shin-Etsu Chemical Co., Ltd.) | 5 parts by weight |
| Propylene glycol monomethyl ether | 1750 parts by weight |
| Isopropyl alcohol | 3450 parts by weight |
| Methyl ethyl ketone | 600 parts by weight |

Incidentally, the thickness and refractive index of the refractive index layer of the resulting high refractive index film were 50 μm and 1.82, respectively.

<Low Refractive Index Layer>

At first, silica based particles (hollow particles) were prepared.

(Preparation of Silica Based Particles P-1)

A mixture of 100 g of an average particle diameter 5 nm silica sol at a SiO$_2$ concentration of 20% by weight and 1,900 g of pure water was heated to 80° C. The pH of the above reaction mother liquid composition was 10.5. Simultaneously added to the above composition were 9,000 g of a 98% by weight aqueous sodium silicate solution as SiO$_2$ and 9,000 g of a 1.02% by weight aqueous sodium aluminate solution as Al$_2$O$_3$. During the above addition, the temperature of the reaction liquid composition was maintained at 80° C. The pH of the above reaction liquid composition increased to 12.5 immediately after the above addition and resulted in almost no variation thereafter. After the addition, the reaction liquid composition was cooled to room temperature and washed employing an ultrafiltration membrane, whereby a solid concentration 20% by weight SiO$_2$·Al$_2$O$_3$ nucleolus particle dispersion was prepared (Process (a)).

Added to the resulting-nucleolus particle dispersion was 1,700 g of pure water, and the resulting mixture was heated to 98° C. Whiled maintaining the above temperature, added was 3,000 g of a silicic acid solution (at a SiO$_2$ concentration of 3.5% by weight) which was prepared by dealkalizing an aqueous sodium silicate solution employing an cation exchange resins, whereby a nucleolus particle dispersion, which had been subjected to formation of the first silica coating layer, was obtained (Process (b)).

Subsequently, added to 500 g of the nucleolus particle dispersion which had formed the fist silica coating layer which had been washed employing an ultrafiltration membrane to result in a solid concentration of 13% by weight was 1125 g of pure water. Further, the pH of the resulting mixture was adjusted to 1.0 by dripping concentrated hydrochloric acid (at 35.5%) and treatment to remove aluminum was then performed. While adding 10 L of a hydrochloric acid solution at a pH of 3 and 5 L of pure water, the dissolved aluminum salts were separated employing an ultrafiltration membrane, whereby a SiO$_2$·Al$_2$O$_3$ porous particle dispersion, in which a part of the components forming the first silica coating layer constituting had been removed, was prepared (Process (c)). After heating to 35° C. a mixture of 1,500 g of the above porous particle dispersion, 500 g of pure water, 1,750 g of ethanol, and 626 g of ammonia water, 104 g of ethyl silicate (at 28% by weight of SiO$_2$) was added, whereby the second silica coating layer was formed in such a manner that the surface of the porous particles which had formed the first silica coating layer was coated with the hydrolysis polycondensation products of ethyl silicate. Subsequently, the solvents were replaced with ethanol employing an ultrafiltration membrane, whereby a silica based particle dispersion at a solid concentration of 20% by weight was prepared.

Table 2 shows the thickness of the first silica coating layer, average particle diameter, MO$_x$/SiO$_2$ (at a mol ratio) and refractive index of the above silica based particles. The average particle diameter was determined employing a dynamic light scattering method. The refractive index was determined employing-the method below, while employing Series A, and AA, produced by CARGILL as a standard refractive liquid.

<Measuring Method of Refractive Index of Particle>

(1) A particle dispersion is placed in an evaporator, and the dispersion medium is vaporized.

(2) The resulting material is dried at 120° C., and pulverized to powder.

(3) A couple of droplets of a standard refractive liquid with a known standard refractive index are dripped onto a glass plate, with which the above powder is mixed.

(4) The above operation (3) was performed employing various types of standard refractive liquid. When a mixture became transparent, the refractive index of the standard refractive liquid was designated as refractive index of the colloid particles.

TABLE 3

| No. | Type | Nucleolus particle MO$_x$/SiO$_2$ mol ratio | Silica coating layer First layer thickness (nm) | Silica coating layer Second layer thickness (nm) | Outer shell Thickness (nm) | Silica Based Particle MO$_x$/SiO$_2$ mol ratio | Silica Based Particle Average particle diameter (nm) | Refractive index |
|---|---|---|---|---|---|---|---|---|
| P-1 | Al/Si | 0.5 | 3 | 5 | 8 | 0.0017 | 47 | 1.28 |

(Formation of Low Refractive Index Layer)

Added to a matrix prepared by mixing 95 mol % of Si(OC$_2$H$_5$) and 5 mol % of C$_3$F$_7$—(OC$_3$F$_6$)$_{24}$—O—(CF$_2$)$_2$—C$_2$H$_4$—O—CH$_2$Si(OCH$_3$)$_3$ was 35% by weight of aforesaid Silica Based Particles P-1 at an average particle diameter of 47 nm. Subsequently, a low refractive index coating composition was prepared in such a manner that employing 1.0 N HCl as a catalyst, the above particles were diluted employing solvents. The liquid coating composition was coated onto the foresaid actinic radiation curable resinous layer or high refractive index layer at a coating thickness of 100 nm, employing a die coating method. After drying at 120° C. for one minute, UV radiation was exposed, whereby a low refractive index layer at a refractive index of 1.37 was formed.

Antireflection Films were prepared as described above.

(Preparation of Polarizing Plate)

<Preparation of Polarizing Plate on the Visibility Side>

Subsequently, a 120 μm thick polyvinyl alcohol film was subjected to uniaxial stretching (at 110° C. and at a factor of 5). The resulting film was immersed for 60 seconds in an aqueous solution consisting of 0.075 g of iodine, 5 g of potassium iodide, and 100 g of water and subsequently immersed in an aqueous solution consisting of potassium iodide and 7.5 g of boric acid, and 100 g of water at 68° C. The resulting film was washed with water and dried whereby a polarizing film was obtained.

Thereafter, in accordant with processes 1-5 described below, a polarizing plate was prepared by allowing the polarizing film, the above Antireflection film, and optical film 11 formed in Example 1 to adhere to each other.

Process 1: A film was immersed in a 2 mol/L sodium hydroxide solution at 60° C. for 90 seconds, washed with water and subsequently dried, whereby optical film 11 which underwent saponification on the side which was allowed to adhere to a polarizer was obtained.

Process 2: The above polarizing film was immersed in a 2% by weight solid polyvinyl alcohol adhesive tank for 1-2 seconds.

Process 3: The adhesive which was allowed to excessively adhere to the polarizing film was softly wiped off, and the resulting film was piled on the optical film or the antireflection film processed in process 1 and laminated.

Process 4: The antireflection film sample, optical film 11, the polarizing film, and the antireflection film, laminated in process 3, were allowed to adhere to each other at a pressure 20-30 N/cm$^2$ and a conveying rate of approximately 2 m/minute.

Process 5: The sample which was prepared by allowing the polarizing film, optical film 11 and the antireflection film in Process 4 was dried in a drier at 80° C. for two minutes, whereby a polarizing plate was prepared.

<Preparation of Polarizing Plate on the Backlight Side>

Polarizing plates 1-35 on the backlight side were prepared in accordance with above processes 1-5, employing a polarizing film formed above, each of optical compensating films 1-35 formed in Example 2, and optical film 11 formed on the rear side in Example 1. In addition, the optical compensating film adheres to the polarizing film so as to have a polymer provided on the outer side.

<<Preparation of Liquid Crystal Display Devices>>

A liquid crystal panel was prepared as described below, and characteristics as a liquid crystal display device were evaluated.

A polarizing plate on the backlight side of an liquid crystal cell of a 30 inch AQUOS liquid crystal display produced by Sharp Corp. and a polarizing plate on the visibility side were peeled off, and each of Polarizing Plates was allowed to adhere to the liquid crystal cell via an adhesive layer so as to provide an liquid crystal cell on the side of optical compensating films 1-35 to adjust a polarizing axis of the polarizing plate adhered in advance, and so as to provide an liquid crystal cell on the side of optical film 11 of the polarizing plate on a visibility side, to prepare 30 inch liquid crystal displays 1-35. In addition, the direct backlight method is used for this display.

(Evaluation)

<Visibility>

After a durability test of a prepared liquid crystal display was conducted at 60° C. and 90% RH for 1000 hours while lighting a direct backlight, further 5 hours after lighting the backlight at room temperature, black screen was displayed to observe visually, and the evaluation was made introducing the following rankings.

A: Black is crisp and sharp, and no color unevenness is noted.
B: Black is crisp and sharp, but slight color unevenness is noted
C: Black is not crisp and sharp slightly, and color unevenness is noted,
D: Black is not crisp and sharp, and color unevenness is fairly annoying.

Table 2 shows the results.

It is to be understood in Table 2 that visibility of liquid crystal displays 3-27, 29, 31, and 32-34 of the present invention is excellent in comparison to comparative examples 1, 2, 28, 30, and 35 even after lighting a direct backlight at high temperature and high humidity.

An liquid crystal display, in which a stretching temperature is within the range of the present invention, and an optical compensating film used in combination with a preferable UV absorbent for the present invention are employed, exhibits excellent properties of transparency, flatness, retardation variation, and visibility.

Effect of the Present Invention

In the present invention, provided can be an optical film in which retardation variation is less even after a long period of duration of use, an optical compensating film in which transparency and flatness are not deteriorated in a stretching process by using the foregoing film as a support, and also a polarizing plate and a liquid crystal display exhibiting not only reduced visibility variation caused by heat generation of an optical LED backlight and environmental variations, but also excellent color reproducibility.

A high performance optical film manufactured without using a halogenated solvent having high environmental load can also be provided.

What is claimed is:

1. A method of manufacturing an optical film, comprising the step of:
   melt-casting a composition comprising a cellulose resin and a plasticizer to form the optical film,
   wherein the cellulose resin has a residual sulfuric acid content of 0.1-50 ppm in terms of sulfur element, and the composition contains a polymer having a weight average molecular weight of 500-30000 prepared via polymerization of ethylenic unsaturated monomers, or an acrylic polymer having a weight average molecular weight of 500-30000,
   the method further comprising the step of:
   conducting a stretching process for the optical film,
   wherein stretching temperature B in the stretching process is expressed in the following Formula (I):
   Formula (I): Melting temperature A—100° C.≦Stretching temperature B≦ Melting temperature A—40° C., where melting temperature A represents a temperature during melt-casting of the optical film.

2. The method of claim 1, wherein the cellulose resin is a mixed fatty acid ester having a total acyl substitution degree of 2.5-2.9, and a number average molecular weight of 70000-200000.

3. The method of claim 1, wherein the plasticizer is at least one kind selected from the group consisting of a polyvalent alcohol ester type plasticizer, a polyester type plasticizer, a citrate ester type plasticizer, a phthalate ester type plasticizer.

4. The method of claim 1, wherein the residual sulfuric acid content is within the range of 0.1-45 ppm in terms of sulfur element.

5. The method of claim 1, wherein the composition contains a UV absorbent, and the UV absorbent has a weight average molecular weight of 490-50000.

6. The method of claim 1, wherein the composition contains 0.01-5% by weight of a hindered amine compound or a hindered phenol compound.

7. A method of manufacturing an optical compensating film, comprising the step of:
   melt-casting a composition comprising a cellulose resin and a plasticizer to form an optical film,
   wherein the cellulose resin has a residual sulfuric acid content of 0.1-50 ppm, and the composition contains a polymer having a weight average molecular weight of 500-30000 prepared via polymerization of ethylenic unsaturated monomers, or an acrylic polymer having a weight average molecular weight of 500-30000,
   the method further comprising the step of:
   conducting a stretching process after providing a polymer layer on the optical film to manufacture the optical compensating film,
   wherein stretching temperature B in the stretching process is expressed in the following Formula (I):
   Formula (I): Melting temperature A—100° C.≦Stretching temperature B≦Melting temperature A—40° C., where melting temperature A represents a temperature during melt-casting of the optical film.

8. The method of claim 7, wherein the polymer layer is made of at least one kind selected from the group consisting of polyetherketone, polyamide, polyester, polyimide, polyamideimide, and polyesterimide.

9. A method of manufacturing a polarizing plate, wherein an optical film or an optical compensating film is provided on at least one surface of a polarizer, comprising the method of manufacturing an optical film of claim 1 or the method of manufacturing an optical compensation film of claim 7.

10. A method of manufacturing a liquid crystal display comprising a liquid crystal cell, a polarizing plate, and a backlight, wherein the polarizing plate is provided on at least one surface of the liquid crystal cell, and an optical film or an optical compensating film is provided on at least one surface of a polarizer, comprising the method of manufacturing an optical film of claim 1 or the method of manufacturing an optical compensation film of claim 7.

11. The method of claim 10, wherein the backlight is an LED.

* * * * *